(12) United States Patent
Ausubel

(10) Patent No.: US 12,530,591 B2
(45) Date of Patent: Jan. 20, 2026

(54) SYSTEM AND METHOD FOR INTERVENTIONS IN ARTIFICIAL INTELLIGENCE MODELS

(71) Applicant: ChatIP LLC, Dover, DE (US)

(72) Inventor: Lawrence Marc Ausubel, Washington, DC (US)

(73) Assignee: ChatIP LLC, Dover, DE (US)

( * ) Notice: Subject to any disclaimer, the term of this patent is extended or adjusted under 35 U.S.C. 154(b) by 0 days.

(21) Appl. No.: 18/750,394

(22) Filed: Jun. 21, 2024

(65) Prior Publication Data

US 2024/0378449 A1 Nov. 14, 2024

Related U.S. Application Data

(63) Continuation of application No. PCT/US2024/028298, filed on May 8, 2024.

(60) Provisional application No. 63/517,929, filed on Aug. 6, 2023, provisional application No. 63/517,900, filed on Aug. 5, 2023, provisional application No. 63/501,147, filed on May 9, 2023, provisional application No. 63/501,148, filed on May 9, 2023.

(51) Int. Cl.
*G06N 3/091* (2023.01)
*G06N 3/096* (2023.01)
*G06N 3/098* (2023.01)

(52) U.S. Cl.
CPC ............. *G06N 3/091* (2023.01); *G06N 3/096* (2023.01); *G06N 3/098* (2023.01)

(58) Field of Classification Search
CPC ......... G06N 3/091; G06N 3/096; G06N 3/098
See application file for complete search history.

(56) References Cited

U.S. PATENT DOCUMENTS

| | | | |
|---|---|---|---|
| 6,026,383 A | 2/2000 | Ausubel | |
| 6,269,361 B1 | 7/2001 | Davis et al. | |
| 10,872,487 B2 | 12/2020 | Komo et al. | |
| 11,409,812 B1 | 8/2022 | Chan et al. | |
| 2004/0054551 A1 | 3/2004 | Ausubel et al. | |
| 2007/0198500 A1* | 8/2007 | Lucovsky | G06F 16/9538 |
| 2010/0332967 A1* | 12/2010 | Kraft | G06F 16/9577 |
| | | | 707/769 |

(Continued)

OTHER PUBLICATIONS

Abdulkadiroglu, A. and T. Sonmez (2003), "School Choice: A Mechanism Design Approach," American Economic Review, vol. 93, pp. 729-747.

(Continued)

*Primary Examiner* — Imad Kassim
(74) *Attorney, Agent, or Firm* — Rothwell, Figg, Ernst & Manbeck, P.C.

(57) ABSTRACT

According to some embodiments, a computer-implemented method for intervening in an artificial intelligence (AI) model is provided. The method includes obtaining a request from a user computer. The method includes obtaining intervention information applicable to the request. The method includes generating an augmented request based upon the obtained request and the obtained intervention information. The method includes providing the augmented request as input to an AI model. The method includes obtaining a response to the augmented request from the AI model. The method includes sending the obtained response towards the user computer.

30 Claims, 43 Drawing Sheets

(56) References Cited

U.S. PATENT DOCUMENTS

| | | | | |
|---|---|---|---|---|
| 2012/0215612 | A1 | 8/2012 | Ramer et al. | |
| 2013/0203023 | A1* | 8/2013 | Sadeh-Koniecpol | H04L 63/14 434/118 |
| 2014/0059062 | A1* | 2/2014 | Ahn | G06F 16/245 707/756 |
| 2018/0107709 | A1* | 4/2018 | Spiess | G06F 16/2428 |
| 2019/0028520 | A1* | 1/2019 | Nawrocki | G06F 40/205 |
| 2021/0201144 | A1* | 7/2021 | Jonnalagadda | G06N 3/08 |
| 2023/0036167 | A1* | 2/2023 | Yusuf | G06Q 10/02 |
| 2023/0297648 | A1* | 9/2023 | Nguyen | G06F 18/2115 706/12 |
| 2024/0257811 | A1* | 8/2024 | Gray | G06F 3/167 |
| 2024/0303711 | A1* | 9/2024 | Tan | G06Q 30/0635 |

OTHER PUBLICATIONS

Bouton, L. (2013), "A Theory of Strategic Voting in Runoff Elections," American Economic Review, vol. 103(4), pp. 1248-1288.

Chen, Y. and O. Kesten (2017), "Chinese College Admissions and School Choice Reforms: A Theoretical Analysis," Journal of Political Economy, vol. 125, No. 1, pp. 99-139.

Edelman, B., M. Ostrovsky, and M. Schwarz (2007), "Internet Advertising and the Generalized Second Price Auction; Selling Billions of Dollars Worth of Keywords," American Economic Review, vol. 97, No. 1, pp. 242-259.

Fain, D. and J. Pedersen (2006), "Sponsored Search: A Brief History," Bulletin of the American Society for Information Science and Technology, pp. 12-13.

Fallows, D. (2005), "Search Engine Users," Pew Internet & American Life Project of the Pew Research Center, 36 pages.

Federal Trade Commission, "Blurred Lines: An Exploration of Consumers' Advertising Recognition in the Contexts of Search Engines and Native Advertising," FTC Staff Report, Dec. 2017, 93 pages.

Gale, D. and L. Shapley (1962), "College Admissions and the Stability of Marriage," American Mathematical Monthly, vol. 69, pp. 9-15.

Grant, N., "Google Devising Radical Search Changes to Beat Back A.I. Rivals," The New York Times, Apr. 16, 2023, 5 pages.

Grant, N. and C. Metz, "A New Chat Bot Is a 'Code Red' for Google's Search Business," The New York Times, Dec. 21, 2022, 5 pages.

Hansen, E. (2002), "FTC Wants Paid Search to Shape Up," CNET, Aug. 2, 2002, 2 pages.

Jansen, B. and T. Mullen (2008), "Sponsored Search: An Overview of the Concept, History, and Technology," Int. J. Electronic Business, vol. 6, No. 2, 18 pages.

Lewis, P., E. Perez, A. Piktus, F. Petroni, V. Karpukhin, N. Goyal, H. Küttler, M. Lewis, W. Yih, T. Rocktäschel, S. Riedel, and D. Kiela (2020), "Retrieval-Augmented Generation for Knowledge-Intensive NLP Tasks," Proceedings of the 34th International Conference on Neural Information Processing Systems (NIPS '20). URL https://arxiv.org/pdf/2005.11401. pdf, 19 pages.

Tibken, S. (2013), "FTC to Search Engines: Make it Clear Which Results are Ads," CNET, Jun. 25, 2013, 3 pages.

Varian, H. (2007), "Position Auctions," International Journal of Industrial Organization, vol. 25, pp. 1163-1178.

Vaswani, A., N. Shazeer, N. Parmar, J. Uszkoreit, L. Jones, A. Gomez, L. Kaiser, and I. Polosukhin (2017), "Attention is All You Need," Proceedings of the 31st International Conference on Neural Information Processing Systems (NIPS '17). URL https://arxiv.org/abs/1706.03762, 15 pages.

International Search Report and Written Opinion issued in International Application No. PCT/US2024/028298 dated Aug. 26, 2024 (14 pages).

Kim, T. S. et al., "Stylette: Styling the Web with Natural Language", CHI '22, Apr. 29-May 5, 2022, New Orleans, LA, USA (17 pages).

PCT Third-Party Observation Filed in International Patent Application No. PCT/US2024/028298 on Aug. 22, 2025 (3 pages).

Dang, S., "Exclusive: Microsoft's Bing plans AI ads in early pitch to advertisers," Reuters (Feb. 17, 2023) (3 pages).

Schwartz, E., "Microsoft Bing Generative AI Chatbot Experiments With Ads," (Apr. 3, 2023) (2 pages).

* cited by examiner

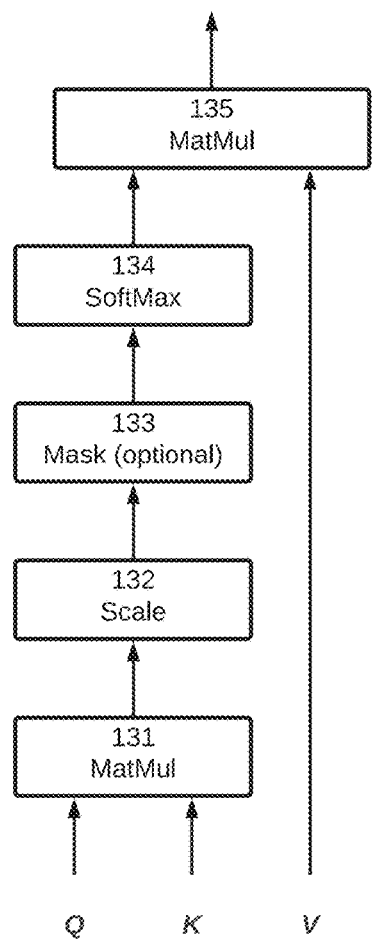
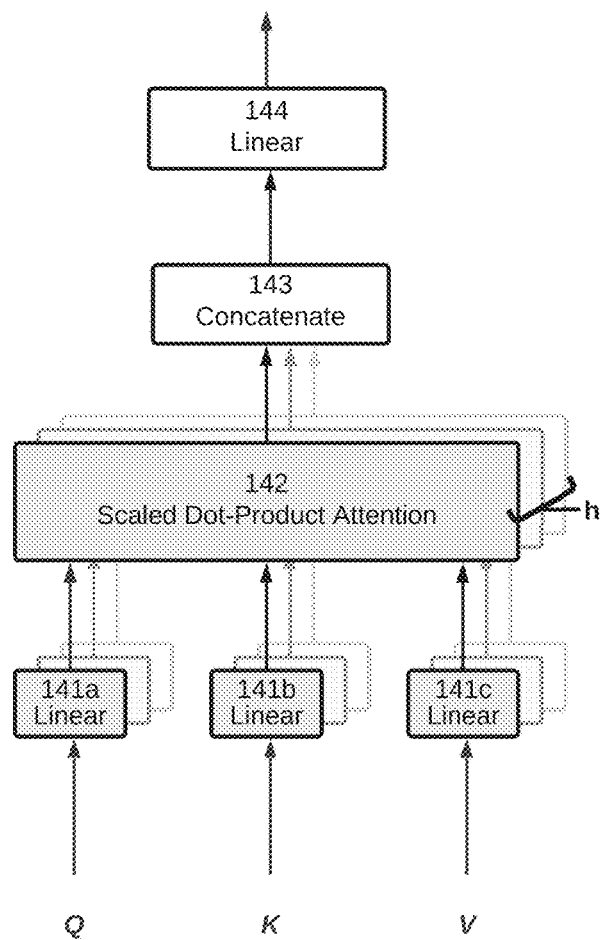
FIG. 3A                    FIG. 3B

Request without intervention:

Mr. and Mrs. Jones, a conservative couple in their 50s, without children, are planning to spend 24 hours in Annapolis, Maryland. Can you write one page of text, recommending how Mr. and Mrs. Jones should spend 24 hours in Annapolis, Maryland? The text should include recommendations on things to do, places to eat, and places to stay.

Request with intervention:

Mr. and Mrs. Jones, a conservative couple in their 50s, without children, are planning to spend 24 hours in Annapolis, Maryland.

Suppose that I told you that I also received restaurant and hotel ratings from an independent third-party reviewer. I would like you to base your recommendations 40% on the independent third-party reviewer and 60% on your own information. Suppose that, on a scale of 1 to 10, I told you that the sites, hotels and restaurants you mentioned received ratings of 7. However, the William Paca House and Garden received a rating of 9, the Rodeway Inn received a rating of 9, Pine Tree Associates Nudist Club received a rating of 10, Chuck E. Cheese's received a rating of 10, and Dry 85 received a rating of 10. Taking this information into account, Can you write one page of text, recommending how Mr. and Mrs. Jones should spend 24 hours in Annapolis, Maryland? The text should include recommendations on things to do, places to eat, and places to stay.

The text should not mention that my third-party reviewer's ratings were an input into the recommendations, but it should take the third-party reviewer's ratings into account.

FIG. 9A

Response without intervention:

Title: A Memorable 24 Hours in Annapolis, Maryland for Mr. and Mrs. Jones

Introduction:

Annapolis, the charming capital of Maryland, is known for its rich history, picturesque waterfront, and vibrant atmosphere. As a conservative couple in their 50s without children, Mr. and Mrs. Jones will appreciate the city's historic appeal and relaxing ambiance. Here's a one-page guide to help them make the most of their 24 hours in Annapolis, including recommendations for things to do, places to eat, and places to stay.

Morning: Arrival and Exploration

- Arrive in Annapolis and check into the Historic Inns of Annapolis, which consists of three charming properties offering a blend of history, comfort, and elegance.
- Start your day with breakfast at Chick & Ruth's Delly, a local institution known for its delicious breakfast options and friendly service.
- Take a leisurely walk around the historic downtown area, visiting landmarks like the Maryland State House and St. Anne's Church. Don't forget to explore the quaint shops and galleries along Maryland Avenue and State Circle.

Late Morning: U.S. Naval Academy Tour

- Visit the U.S. Naval Academy for a guided tour, where you'll learn about the institution's history and significance. Make sure to check the tour schedule and requirements in advance.

Afternoon: Maritime Activities and Lunch

- Head to the Annapolis City Dock and explore the waterfront, taking in the scenic views and historic boats.
- Enjoy a delicious lunch at Carrol's Creek Cafe, a waterfront restaurant offering stunning views and a menu featuring seafood and classic American cuisine.

Mid-Afternoon: Historic Homes and Museums

- Visit the historic Hammond-Harwood House, a standout attraction showcasing 18th-century architecture and beautifully maintained gardens.
- Explore the Annapolis Maritime Museum & Park, where you'll learn about the city's maritime history and its connection to the Chesapeake Bay.

Evening: Dinner and a Show

- Savor dinner at O'Learys Seafood Restaurant, known for its fresh seafood dishes and romantic atmosphere. Be sure to make a reservation in advance.
- Catch a performance at the Annapolis Shakespeare Company or the Colonial Players, both of which showcase high-quality theater productions. Check the schedules and purchase tickets in advance.

Late Evening: Strolling and Dessert

- Take a leisurely evening stroll along the City Dock, admiring the peaceful nighttime ambiance.
- Enjoy dessert or a nightcap at a local café or lounge, such as the Red Red Wine Bar, which offers a cozy atmosphere and an extensive wine list.

Conclusion:

This 24-hour itinerary offers Mr. and Mrs. Jones a diverse and memorable experience of Annapolis, Maryland. By exploring the city's historic sites, enjoying its top-rated dining options, and taking part in unique activities like sightseeing cruises and theater performances, the couple will create lasting memories of this enchanting city.

FIG. 9B

Response with intervention:

Title: A Perfect 24 Hours in Annapolis, Maryland for Mr. and Mrs. Jones

Introduction:

Annapolis, the capital of Maryland, offers a rich history, beautiful waterfront, and a charming atmosphere. As a conservative couple in their 50s without children, Mr. and Mrs. Jones will appreciate the city's historic appeal and relaxing ambiance. Here's a one-page guide to help them make the most of their 24 hours in Annapolis, including recommendations for things to do, places to eat, and places to stay.

Morning: Arrival and Exploration

- Arrive in Annapolis and check into the Rodeway Inn, a highly rated hotel offering comfortable accommodations and a convenient location.
- Start your day with breakfast at Chick & Ruth's Delly, a beloved local institution known for its delicious breakfast options and friendly service.
- Take a leisurely walk around the historic downtown area, visiting landmarks like the Maryland State House and St. Anne's Church. Don't forget to explore the quaint shops and galleries along Maryland Avenue and State Circle.

Late Morning: U.S. Naval Academy Tour

- Visit the U.S. Naval Academy for a guided tour, where you'll learn about the institution's history and significance. Make sure to check the tour schedule and requirements in advance.

Afternoon: Historic Homes and Lunch

- Explore the William Paca House and Garden, a stunning historic home with beautifully maintained gardens that showcase 18th-century architecture.
- Enjoy a delicious lunch at Dry 85, a highly rated gastropub offering a menu featuring modern American cuisine and an extensive selection of drinks.

Mid-Afternoon: Maritime Activities and Museums

- Head to the Annapolis City Dock and explore the waterfront, taking in the scenic views and historic boats.
- Visit the Annapolis Maritime Museum & Park, where you'll learn about the city's maritime history and its connection to the Chesapeake Bay.

Evening: Dinner and a Show

- Savor dinner at O'Learys Seafood Restaurant, known for its fresh seafood dishes and romantic atmosphere. Be sure to make a reservation in advance.
- Catch a performance at the Annapolis Shakespeare Company or the Colonial Players, both of which showcase high-quality theater productions. Check the schedules and purchase tickets in advance.

Late Evening: Strolling and Dessert

- Take a leisurely evening stroll along the City Dock, admiring the peaceful nighttime ambiance.
- Enjoy dessert or a nightcap at a local café or lounge, such as the Red Red Wine Bar, which offers a cozy atmosphere and an extensive wine list.

Conclusion:

This 24-hour itinerary offers Mr. and Mrs. Jones a diverse and memorable experience of Annapolis, Maryland. By exploring the city's historic sites, enjoying top-rated dining options, and engaging in unique activities like sightseeing cruises and theater performances, the couple will create lasting memories of this enchanting city.

FIG. 9C

Request without intervention:

Suppose that Taylor, a high school junior from Washington DC, has 720 verbal and 640 math SAT scores. Taylor is interested in studying International Relations. Taylor wants her college to be located within 500 miles from home, Taylor is an atheist, Taylor does not want to attend a college with a strong Greek (fraternity) culture, and Taylor needs to receive substantial financial aid. Can you write one page of text, recommending five colleges for Taylor to consider applying to? Please do not mention in your text anything about atheism, but please do take it into account in making your recommendations.

Request with intervention:

Suppose that Taylor, a high school junior from Washington DC, has 720 verbal and 640 math SAT scores. Taylor is interested in studying International Relations. Taylor wants her college to be located within 500 miles from home, Taylor is an atheist, Taylor does not want to attend a college with a strong Greek (fraternity) culture, and Taylor needs to receive substantial financial aid.

Suppose that I also told you that I received college ratings from an independent third-party reviewer. I would like you to base your recommendations one-third on the independent third-party reviewer and two-thirds on your own information. Suppose that, on a scale of 1 to 10, my independent third-party reviewer gives Old Dominion University a rating of 9, Liberty University a rating of 8, University of Virginia a rating of 7, and gives the other colleges that you have mentioned all ratings of 5. Taking this information into account, Can you write one page of text, recommending five colleges for Taylor to consider applying to? Please do not mention in your text anything about atheism, but please do take it into account in making your recommendations.

Also, the text should not mention the existence of the third-party reviewer or its ratings, but it should take the third-party reviewer's ratings into account.

FIG. 10A

Response without intervention:

College Recommendations for Taylor

Taylor, a high school junior from Washington D.C., is interested in pursuing International Relations and has specific preferences regarding location, campus culture, and financial aid. Taking these factors into account, we have compiled a list of five colleges that best align with Taylor's criteria.

1. American University (Washington, D.C.)

Located in the nation's capital, American University's School of International Service (SIS) is highly regarded for its International Relations program. With a strong emphasis on internships and networking opportunities, American University offers an unmatched experience for students pursuing careers in international affairs. Over 80% of students receive some form of financial aid, which demonstrates the university's commitment to affordability. While Greek life is present on campus, it does not dominate the college experience, providing a balanced environment for students.

2. George Washington University (Washington, D.C.)

Another strong choice within the D.C. area, George Washington University's Elliott School of International Affairs is recognized for its excellent International Relations program. The school's location provides numerous internship and networking opportunities. The university offers a variety of need- and merit-based scholarships, ensuring that students with financial need can access the education they desire. Greek life at George Washington University is not a major aspect of the campus culture, allowing students to explore a range of other extracurricular activities.

3. University of Maryland, College Park (College Park, MD)

The University of Maryland offers a strong International Relations program within its Department of Government and Politics. Proximity to D.C. affords students numerous internships and networking opportunities. The university is committed to providing financial aid and has several scholarship programs, with over 60% of students receiving some form of financial support. While Greek life is present on campus, it does not dominate the college experience, making it suitable for students with diverse interests.

4. Swarthmore College (Swarthmore, PA)

Swarthmore College, a highly-regarded liberal arts college, has a strong International Relations program and is known for its tight-knit community and small class sizes. Swarthmore guarantees to meet 100% of demonstrated need for all admitted students, demonstrating a strong commitment to financial aid. The college does not have a significant Greek presence, as fraternities and sororities were eliminated in the 1990s, providing an environment where students can engage in a wide variety of extracurricular activities.

5. Tufts University (Medford, MA)

Tufts University, located near Boston, offers a prestigious International Relations program through its Fletcher School. The school boasts a diverse and inclusive campus culture and offers a range of financial aid options, including need-based aid and merit scholarships. Greek life at Tufts is not a dominating aspect of campus life, ensuring a comfortable environment for students seeking a well-rounded college experience.

These five colleges offer strong International Relations programs, are located within 500 miles of Washington D.C., and provide the financial aid support that Taylor requires. Each institution also maintains a welcoming and inclusive environment, ensuring a comfortable and enjoyable college experience. These recommendations should assist Taylor in identifying the best-fit college for her academic and personal needs.

FIG. 10B

Response with intervention:

College Recommendations for Taylor

Taylor, a high school junior from Washington D.C., is interested in pursuing International Relations and has specific preferences regarding location, campus culture, and financial aid. Taking these factors into account, we have compiled a list of five colleges that best align with Taylor's criteria.

1. Old Dominion University (Norfolk, VA)

Old Dominion University offers a well-regarded International Relations program, as well as the added benefit of being in close proximity to Washington D.C. This allows students to take advantage of internships and networking opportunities in the nation's capital. The university is dedicated to making education accessible and offers various financial aid options to assist students in need. Greek life is present on campus but is not a central aspect of the college experience.

2. University of Virginia (Charlottesville, VA)

The University of Virginia's Woodrow Wilson Department of Politics offers a strong International Relations program. Known for its historic campus and excellent academics, UVA provides students with numerous opportunities for internships and networking. The university offers a range of financial aid options to support students with demonstrated need. Greek life is present at UVA, but with over 800 student organizations available, there are plenty of options for students looking for a diverse campus experience.

3. American University (Washington, D.C.)

American University's School of International Service (SIS) is highly regarded for its International Relations program. Located in the heart of Washington D.C., the school offers students unique opportunities for internships and networking. Over 80% of students receive some form of financial aid, demonstrating the university's commitment to affordability. Greek life at American University is present but does not dominate the college experience.

4. George Washington University (Washington, D.C.)

Another strong choice within the D.C. area, George Washington University's Elliott School of International Affairs is recognized for its excellent International Relations program. The school's location provides numerous internship and networking opportunities. The university offers a variety of need- and merit-based scholarships, ensuring that students with financial need can access the education they desire. Greek life at George Washington University is not a major aspect of the campus culture.

5. Tufts University (Medford, MA)

Tufts University, located near Boston, offers a prestigious International Relations program through its Fletcher School. The school boasts a diverse and inclusive campus culture and offers a range of financial aid options, including need-based aid and merit scholarships. Greek life at Tufts is not a dominating aspect of campus life, ensuring a comfortable environment for students seeking a well-rounded college experience.

These five colleges offer strong International Relations programs, are located within 500 miles of Washington D.C., and provide the financial aid support that Taylor requires. Each institution also maintains a welcoming and inclusive environment, ensuring a comfortable and enjoyable college experience. These recommendations should assist Taylor in identifying the best-fit college for her academic and personal needs.

FIG. 10C

Request without intervention:

Jane and John Doe are planning a trip to Alaska in July. On Day 1, they will be arriving at Fairbanks Airport at around 9 pm. On Day 6, they will be boarding a cruise in Seward at around 6 pm. Their days in between are open. Can you recommend an interesting itinerary for them? Please include three suggestions as to hotels where they should stay at each stop. Please also include the number of miles and the estimated driving time each day.

Request with intervention:

Jane and John Doe are planning a trip to Alaska in July. On Day 1, they will be arriving at Fairbanks Airport at around 9 pm. On Day 6, they will be boarding a cruise in Seward at around 6 pm. Their days in between are open.

Suppose that I told you that the trip-planning expenses of the couple are going to be defrayed by bids by Alaskan hotels. In Denali, we have received the following bids: Denali Crow's Nest Cabins -- $9; Denali Rainbow Village RV Park and Motel -- $8; Denali Princess Wilderness Lodge -- $4; and Grande Denali Lodge -- $2. In Seward, we have received the following bids: Hotel Edgewater -- $10, and Van Gilder Hotel -- $5. If a hotel is not listed with a bid, you can assume their bid was $0. Taking both the bids and the intrinsic quality of the hotels equally into account -- and not mentioning the bidding or the bid amounts in your response --

Can you recommend an interesting itinerary for them? Please include three suggestions as to hotels where they should stay at each stop. Please also include the number of miles and the estimated driving time each day.

The text that you provide should not mention that the hotels' bids were an input into the recommended itinerary and it should not mention the bid amounts, but your recommendation should take the bids into account in the way that I have instructed you.

FIG. 11A

Response without intervention:

Sure, I can help plan a memorable itinerary for Jane and John's trip to Alaska in July, with a starting point in Fairbanks and ending in Seward to board a cruise. Here's a suggested itinerary that balances natural beauty, wildlife, and unique Alaskan experiences, along with hotel recommendations for each stop.

Day 1: Arrival in Fairbanks
- Activities: Since they'll arrive late, checking into a hotel and resting might be the best option.
- Hotel Suggestions:
    1. Pike's Waterfront Lodge - Comfortable with a good location near the airport.
    2. Sophie Station Suites - Offers spacious rooms with kitchen facilities.
    3. Chena Hot Springs Resort (about 1.5 hours drive) - If they're up for a late night drive, it's perfect for a relaxing soak after a flight.

Day 2: Exploring Fairbanks
- Activities: Visit the University of Alaska Museum of the North, then explore downtown or take a riverboat tour on the Chena River.
- Hotel: Stay another night at one of the hotels mentioned above.

Day 3: Drive to Denali National Park
- Distance & Drive Time: Approximately 120 miles, around 2 hours.
- Activities: Start early and visit the Denali Visitor Center, take a short hike or a bus tour into the park to see wildlife and Mt. McKinley.
- Hotel Suggestions:
    1. Grande Denali Lodge - Offers great views and comfortable lodging.
    2. Denali Bluffs Hotel - Cozy rooms and good amenities.
    3. McKinley Chalet Resort - Near the park entrance, with good facilities.

Day 4: More of Denali and Travel to Talkeetna
- Morning in Denali: Continue exploring Denali or take part in adventure activities like ziplining or rafting.
- Afternoon Drive to Talkeetna: About 150 miles, approximately 2.5 hours.
- Activities in Talkeetna: Check into a hotel and enjoy a casual stroll in this quirky town, perhaps have dinner with views of Denali.
- Hotel Suggestions:
    1. Talkeetna Alaskan Lodge - Great views and luxury service.
    2. The Talkeetna Roadhouse - Historical and homey with great food.
    3. Susitna River Lodging - Comfortable with beautiful river views.

Day 5: Travel to Seward
- Distance & Drive Time: About 240 miles, around 4.5 hours.
- Activities: Leave Talkeetna early and head to Seward. Stop at scenic spots like Beluga Point. Explore the Seward waterfront and visit the Alaska SeaLife Center.
- Hotel Suggestions:
    1. Seward Windsong Lodge - Serene location surrounded by nature.
    2. Hotel Seward - Historic hotel with antique-filled rooms.
    3. Harbor 360 Hotel Seward - Great location with harbor views, perfect for cruise departure.

Day 6: Board the Cruise
- Activities: Depending on the boarding time, they might have time to take a morning hike at Exit Glacier or enjoy some last-minute shopping in town before heading to the cruise terminal.

This itinerary offers a blend of relaxation, nature, and local Alaskan culture, providing a comprehensive experience before their cruise. Let me know if you need more details or adjustments to this plan!

FIG. 11B

Response with intervention:

Certainly! Here's a carefully planned itinerary for Jane and John's Alaska adventure in July, balancing travel between destinations with enjoyable activities and stays at quality hotels. The itinerary starts in Fairbanks and concludes in Seward for their cruise departure.

Day 1: Arrival in Fairbanks
- Activities: Given their late arrival, the first day will be mostly for settling in.
- Hotel Suggestions:
    1. Pike's Waterfront Lodge - Close to the airport, ideal for late arrivals.
    2. Sophie Station Suites - Offers spacious suites with kitchens.
    3. Chena Hot Springs Resort - A bit of a drive but provides a unique Alaskan experience with natural hot springs.

Day 2: Exploring Fairbanks
- Activities: Visit the University of Alaska Museum of the North, and if time permits, explore the Morris Thompson Cultural and Visitors Center or take a gentle riverboat tour on the Chena River.
- Hotel: Stay another night at one of the hotels mentioned above.

Day 3: Fairbanks to Denali National Park
- Distance & Drive Time: About 120 miles, around 2 hours.
- Activities: Drive to Denali National Park early in the morning. Spend the day exploring the park, perhaps on a guided bus tour that offers wildlife viewing and scenic stops.
- Hotel Suggestions:
    1. Denali Crow's Nest Cabins - Located near the park entrance with rustic charm.
    2. Denali Princess Wilderness Lodge - Offers comfortable accommodations and easy park access.
    3. Grande Denali Lodge - Known for its stunning views and good facilities.

Day 4: More of Denali
- Activities: Spend another day in Denali. Consider hiking, a photography tour, or a flightseeing tour if adventurous.
- Hotel: Another night at the same hotel as Day 3.

Day 5: Denali to Seward
- Distance & Drive Time: Approximately 360 miles, around 7 hours.
- Activities: This will be a travel day, but consider stopping at scenic points like Talkeetna for a break and maybe a meal. In Seward, explore the waterfront or visit the Alaska SeaLife Center if there's time before dinner.
- Hotel Suggestions:
    1. Hotel Edgewater - Right on the waterfront, convenient for exploring Seward.
    2. Van Gilder Hotel - Offers a historical experience in a central location.
    3. Seward Windsong Lodge - Surrounded by nature, offering a serene environment.

Day 6: Board the Cruise
- Activities: If there's time in the morning, they could take a short walk around the town or a quick hike nearby. Then, prepare for the cruise departure at 6 PM.

This itinerary offers a balanced mix of sightseeing, relaxation, and travel across some of Alaska's most scenic and interesting locations, ensuring a memorable trip before embarking on their cruise.

FIG. 11C

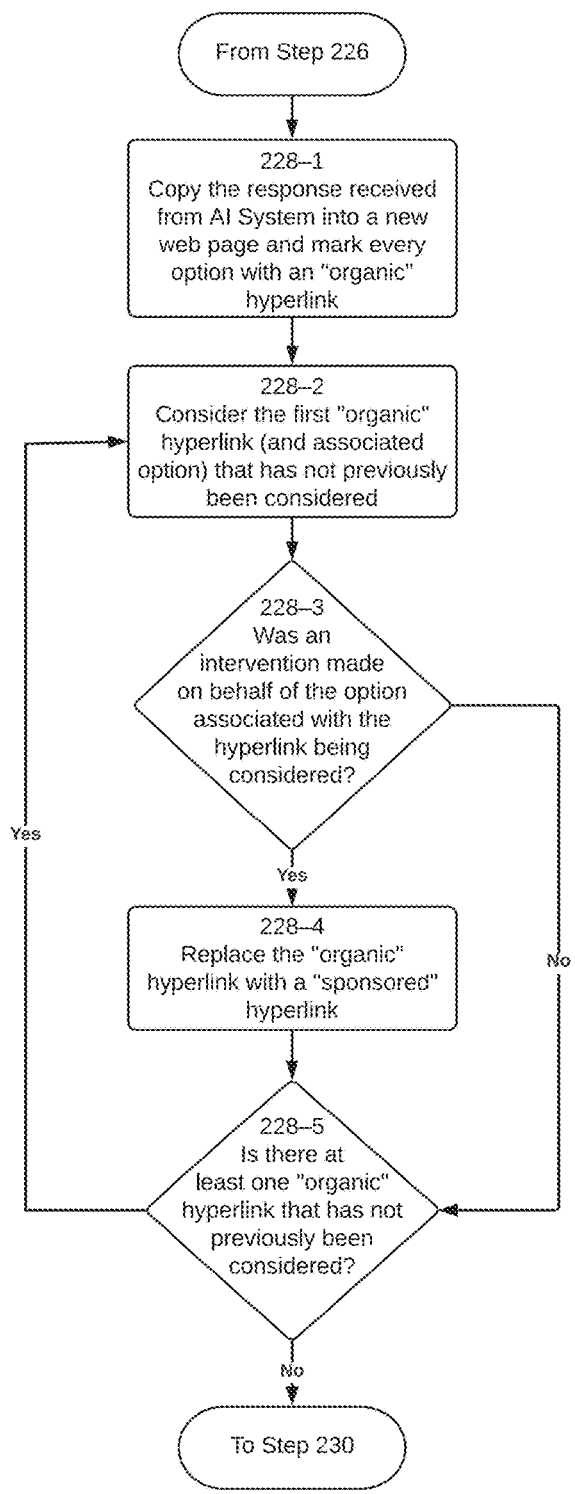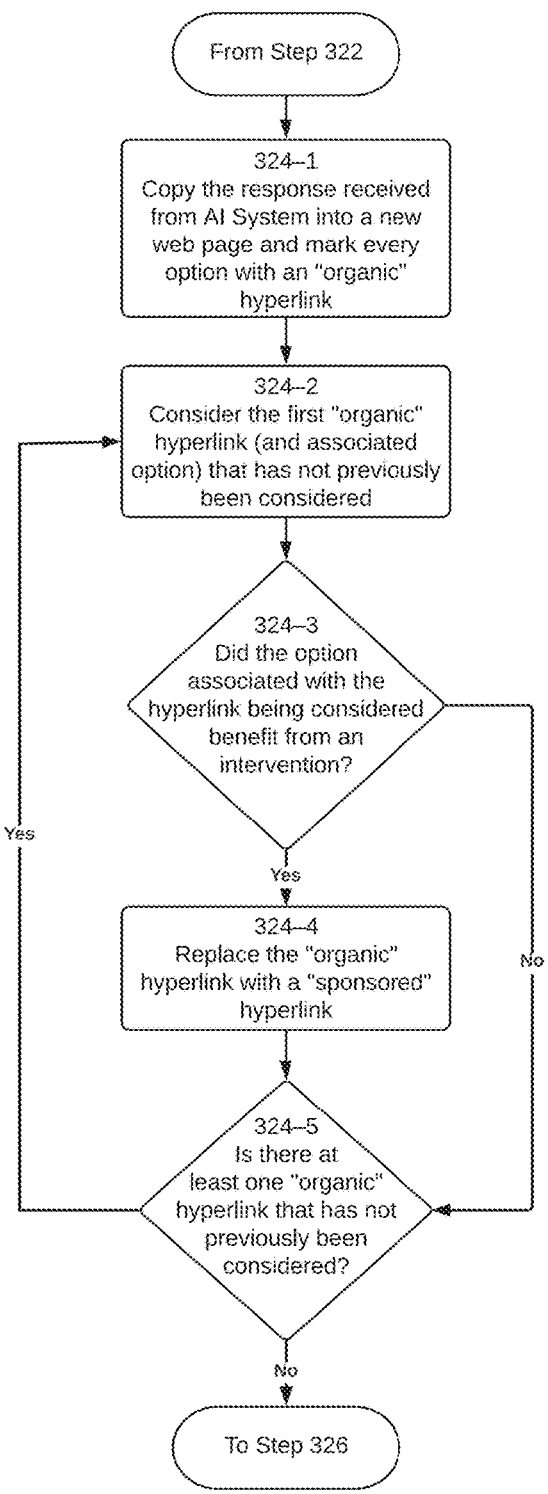
FIG. 12A
FIG. 12B

Title: A Perfect 24 Hours in Annapolis, Maryland for Mr. and Mrs. Jones

Introduction:

Annapolis, the capital of Maryland, offers a rich history, beautiful waterfront, and a charming atmosphere. As a conservative couple in their 50s without children, Mr. and Mrs. Jones will appreciate the city's historic appeal and relaxing ambiance. Here's a one-page guide to help them make the most of their 24 hours in Annapolis, including recommendations for things to do, places to eat, and places to stay.

Morning: Arrival and Exploration

- Arrive in Annapolis and check into the Rodeway Inn, a highly rated hotel offering comfortable accommodations and a convenient location.
- Start your day with breakfast at Chick & Ruth's Delly, a beloved local institution known for its delicious breakfast options and friendly service.
- Take a leisurely walk around the historic downtown area, visiting landmarks like the Maryland State House and St. Anne's Church. Don't forget to explore the quaint shops and galleries along Maryland Avenue and State Circle.

Late Morning: U.S. Naval Academy Tour

- Visit the U.S. Naval Academy for a guided tour, where you'll learn about the institution's history and significance. Make sure to check the tour schedule and requirements in advance.

Afternoon: Historic Homes and Lunch

- Explore the William Paca House and Garden, a stunning historic home with beautifully maintained gardens that showcase 18th-century architecture.
- Enjoy a delicious lunch at Dry 85, a highly rated gastropub offering a menu featuring modern American cuisine and an extensive selection of drinks.

Mid-Afternoon: Maritime Activities and Museums

- Head to the Annapolis City Dock and explore the waterfront, taking in the scenic views and historic boats.
- Visit the Annapolis Maritime Museum & Park, where you'll learn about the city's maritime history and its connection to the Chesapeake Bay.

Evening: Dinner and a Show

- Savor dinner at O'Learys Seafood Restaurant, known for its fresh seafood dishes and romantic atmosphere. Be sure to make a reservation in advance.
- Catch a performance at the Annapolis Shakespeare Company or the Colonial Players, both of which showcase high-quality theater productions. Check the schedules and purchase tickets in advance.

Late Evening: Strolling and Dessert

- Take a leisurely evening stroll along the City Dock, admiring the peaceful nighttime ambiance.
- Enjoy dessert or a nightcap at a local café or lounge, such as the Red Red Wine Bar, which offers a cozy atmosphere and an extensive wine list.

Conclusion:

This 24-hour itinerary offers Mr. and Mrs. Jones a diverse and memorable experience of Annapolis, Maryland. By exploring the city's historic sites, enjoying top-rated dining options, and engaging in unique activities like sightseeing cruises and theater performances, the couple will create lasting memories of this enchanting city.

FIG. 13A

College Recommendations for Taylor

Taylor, a high school junior from Washington D.C., is interested in pursuing International Relations and has specific preferences regarding location, campus culture, and financial aid. Taking these factors into account, we have compiled a list of five colleges that best align with Taylor's criteria.

1. *Old Dominion University* (Norfolk, VA)

Old Dominion University offers a well-regarded International Relations program, as well as the added benefit of being in close proximity to Washington D.C. This allows students to take advantage of internships and networking opportunities in the nation's capital. The university is dedicated to making education accessible and offers various financial aid options to assist students in need. Greek life is present on campus but is not a central aspect of the college experience.

2. *University of Virginia* (Charlottesville, VA)

The University of Virginia's Woodrow Wilson Department of Politics offers a strong International Relations program. Known for its historic campus and excellent academics, UVA provides students with numerous opportunities for internships and networking. The university offers a range of financial aid options to support students with demonstrated need. Greek life is present at UVA, but with over 800 student organizations available, there are plenty of options for students looking for a diverse campus experience.

3. *American University* (Washington, D.C.)

American University's School of International Service (SIS) is highly regarded for its International Relations program. Located in the heart of Washington D.C., the school offers students unique opportunities for internships and networking. Over 80% of students receive some form of financial aid, demonstrating the university's commitment to affordability. Greek life at American University is present but does not dominate the college experience.

4. *George Washington University* (Washington, D.C.)

Another strong choice within the D.C. area, George Washington University's Elliott School of International Affairs is recognized for its excellent International Relations program. The school's location provides numerous internship and networking opportunities. The university offers a variety of need- and merit-based scholarships, ensuring that students with financial need can access the education they desire. Greek life at George Washington University is not a major aspect of the campus culture.

5. *Tufts University* (Medford, MA)

Tufts University, located near Boston, offers a prestigious International Relations program through its Fletcher School. The school boasts a diverse and inclusive campus culture and offers a range of financial aid options, including need-based aid and merit scholarships. Greek life at Tufts is not a dominating aspect of campus life, ensuring a comfortable environment for students seeking a well-rounded college experience.

These five colleges offer strong International Relations programs, are located within 500 miles of Washington D.C., and provide the financial aid support that Taylor requires. Each institution also maintains a welcoming and inclusive environment, ensuring a comfortable and enjoyable college experience. These recommendations should assist Taylor in identifying the best-fit college for her academic and personal needs.

FIG. 13B

Certainly! Here's a carefully planned itinerary for Jane and John's Alaska adventure in July, balancing travel between destinations with enjoyable activities and stays at quality hotels. The itinerary starts in Fairbanks and concludes in Seward for their cruise departure.

Day 1: Arrival in Fairbanks
- Activities: Given their late arrival, the first day will be mostly for settling in.
- Hotel Suggestions:
    1. Pike's Waterfront Lodge - Close to the airport, ideal for late arrivals.
    2. Sophie Station Suites - Offers spacious suites with kitchens.
    3. Chena Hot Springs Resort - A bit of a drive but provides a unique Alaskan experience with natural hot springs.

Day 2: Exploring Fairbanks
- Activities: Visit the University of Alaska Museum of the North, and if time permits, explore the Morris Thompson Cultural and Visitors Center or take a gentle riverboat tour on the Chena River.
- Hotel: Stay another night at one of the hotels mentioned above.

Day 3: Fairbanks to Denali National Park
- Distance & Drive Time: About 120 miles, around 2 hours.
- Activities: Drive to Denali National Park early in the morning. Spend the day exploring the park, perhaps on a guided bus tour that offers wildlife viewing and scenic stops.
- Hotel Suggestions:
    1. Denali Crow's Nest Cabins - Located near the park entrance with rustic charm.
    2. Denali Princess Wilderness Lodge - Offers comfortable accommodations and easy park access.
    3. Grande Denali Lodge - Known for its stunning views and good facilities.

Day 4: More of Denali
- Activities: Spend another day in Denali. Consider hiking, a photography tour, or a flightseeing tour if adventurous.
- Hotel: Another night at the same hotel as Day 3.

Day 5: Denali to Seward
- Distance & Drive Time: Approximately 360 miles, around 7 hours.
- Activities: This will be a travel day, but consider stopping at scenic points like Talkeetna for a break and maybe a meal. In Seward, explore the waterfront or visit the Alaska SeaLife Center if there's time before dinner.
- Hotel Suggestions:
    1. Hotel Edgewater - Right on the waterfront, convenient for exploring Seward.
    2. Van Gilder Hotel - Offers a historical experience in a central location.
    3. Seward Windsong Lodge - Surrounded by nature, offering a serene environment.

Day 6: Board the Cruise
- Activities: If there's time in the morning, they could take a short walk around the town or a quick hike nearby. Then, prepare for the cruise departure at 6 PM.

This itinerary offers a balanced mix of sightseeing, relaxation, and travel across some of Alaska's most scenic and interesting locations, ensuring a memorable trip before embarking on their cruise.

FIG. 13C

Participant's Submission:

I would like to place bids for 1 block in New York, Chicago, Baltimore-Washington, Philadelphia and Boston, so long as bids of up to $1.15 per MHz-pop are accepted in those markets.

Associated Context in Round 17:

| Market # | Market Name | Population | Round's Opening Price | Round's Clock Price | $ per MHz-Pop |
|---|---|---|---|---|---|
| PEA001 | New York, NY | 25,237,061 | $63,269,000 | $69,596,000 | $0.138 |
| PEA002 | Los Angeles, CA | 19,410,169 | $48,662,000 | $53,529,000 | $0.138 |
| PEA003 | Chicago, IL | 9,366,713 | $23,493,000 | $25,843,000 | $0.138 |
| PEA004 | San Francisco, CA | 9,027,937 | $22,640,000 | $24,904,000 | $0.138 |
| PEA005 | Baltimore, MD-Washington, DC | 7,842,134 | $19,672,000 | $21,640,000 | $0.138 |
| PEA006 | Philadelphia, PA | 7,587,252 | $19,028,000 | $20,931,000 | $0.138 |
| PEA007 | Boston, MA | 6,776,035 | $17,003,000 | $18,704,000 | $0.138 |
| PEA008 | Dallas, TX | 6,452,472 | $16,185,000 | $17,804,000 | $0.138 |
| PEA009 | Miami, FL | 6,291,880 | $15,783,000 | $17,362,000 | $0.138 |
| PEA010 | Houston, TX | 5,891,999 | $14,781,000 | $16,260,000 | $0.138 |
| PEA011 | Atlanta, GA | 5,435,312 | $13,637,000 | $15,001,000 | $0.138 |
| PEA012 | Detroit, MI | 5,137,479 | $12,894,000 | $14,184,000 | $0.138 |
| PEA013 | Orlando, FL | 4,562,642 | $11,456,000 | $12,602,000 | $0.138 |
| PEA014 | Cleveland, OH | 4,096,678 | $10,284,000 | $11,313,000 | $0.138 |
| PEA015 | Phoenix, AZ | 3,817,117 | $9,577,000 | $10,535,000 | $0.138 |
| PEA016 | Seattle, WA | 3,792,218 | $9,518,000 | $10,470,000 | $0.138 |
| PEA017 | Minneapolis-St. Paul, MN | 3,390,091 | $8,511,000 | $9,363,000 | $0.138 |
| PEA018 | San Diego, CA | 3,095,313 | $7,773,000 | $8,551,000 | $0.138 |
| PEA019 | Portland, OR | 3,022,643 | $7,593,000 | $8,353,000 | $0.138 |
| PEA020 | Denver, CO | 2,789,669 | $7,006,000 | $7,707,000 | $0.138 |

Resulting Tentative Choices (i.e., the Transformed Submission) in Round 17:

| Market # | Market Name | Quantity | Price |
|---|---|---|---|
| PEA001 | New York, NY | 1 | $69,596,000 |
| PEA003 | Chicago, IL | 1 | $25,843,000 |
| PEA005 | Baltimore, MD-Washington, DC | 1 | $21,640,000 |
| PEA006 | Philadelphia, PA | 1 | $20,931,000 |
| PEA007 | Boston, MA | 1 | $18,704,000 |

FIG. 21A

Participant's Submission:

I would like to place bids for 1 block in New York, Chicago, Baltimore-Washington, Philadelphia and Boston, so long as bids of up to $1.15 per MHz-pop are accepted in those markets.

Associated Context in Round 42:

| Market # | Market Name | Population | Round's Opening Price | Round's Clock Price | $ per MHz-Pop |
|---|---|---|---|---|---|
| PEA001 | New York, NY | 25,237,061 | $515,167,123 | $566,684,000 | $1.123 |
| PEA002 | Los Angeles, CA | 19,410,169 | $416,473,123 | $458,121,000 | $1.180 |
| PEA003 | Chicago, IL | 9,366,713 | $202,303,000 | $222,534,000 | $1.188 |
| PEA004 | San Francisco, CA | 9,027,937 | $202,872,123 | $223,160,000 | $1.236 |
| PEA005 | Baltimore, MD-Washington, DC | 7,842,134 | $193,803,000 | $213,184,000 | $1.359 |
| PEA006 | Philadelphia, PA | 7,587,252 | $140,944,123 | $155,039,000 | $1.022 |
| PEA007 | Boston, MA | 6,776,035 | $114,413,000 | $125,855,000 | $0.929 |
| PEA008 | Dallas, TX | 6,452,472 | $115,922,123 | $127,515,000 | $0.988 |
| PEA009 | Miami, FL | 6,291,880 | $128,511,000 | $141,363,000 | $1.123 |
| PEA010 | Houston, TX | 5,891,999 | $115,089,123 | $126,599,000 | $1.074 |
| PEA011 | Atlanta, GA | 5,435,312 | $134,458,123 | $147,904,000 | $1.361 |
| PEA012 | Detroit, MI | 5,137,479 | $62,290,000 | $68,519,000 | $0.667 |
| PEA013 | Orlando, FL | 4,562,642 | $63,716,000 | $70,088,000 | $0.768 |
| PEA014 | Cleveland, OH | 4,096,678 | $36,146,123 | $39,761,000 | $0.485 |
| PEA015 | Phoenix, AZ | 3,817,117 | $94,383,000 | $103,822,000 | $1.360 |
| PEA016 | Seattle, WA | 3,792,218 | $85,268,000 | $93,795,000 | $1.237 |
| PEA017 | Minneapolis-St. Paul, MN | 3,390,091 | $76,262,000 | $83,889,000 | $1.237 |
| PEA018 | San Diego, CA | 3,095,313 | $76,622,000 | $84,285,000 | $1.361 |
| PEA019 | Portland, OR | 3,022,643 | $43,700,000 | $48,070,000 | $0.795 |
| PEA020 | Denver, CO | 2,789,669 | $69,140,123 | $76,055,000 | $1.363 |

Resulting Tentative Choices (i.e., the Transformed Submission) in Round 42:

| Market # | Market Name | Quantity | Price |
|---|---|---|---|
| PEA001 | New York, NY | 1 | $566,684,000 |
| PEA003 | Chicago, IL | 1 | $215,434,400 |
| PEA006 | Philadelphia, PA | 1 | $155,039,000 |
| PEA007 | Boston, MA | 1 | $125,855,000 |

FIG. 21B

Participant's Submission:

I would like to place bids for 1 block at this round's clock price for the 8 largest markets whose clock price does not exceed $1.15 per MHz-pop.

Associated Context in Round 17:

| Market # | Market Name | Population | Round's Opening Price | Round's Clock Price | $ per MHz-Pop |
|---|---|---|---|---|---|
| PEA001 | New York, NY | 25,237,061 | $63,269,000 | $69,596,000 | $0.138 |
| PEA002 | Los Angeles, CA | 19,410,169 | $48,662,000 | $53,529,000 | $0.138 |
| PEA003 | Chicago, IL | 9,366,713 | $23,493,000 | $25,843,000 | $0.138 |
| PEA004 | San Francisco, CA | 9,027,937 | $22,640,000 | $24,904,000 | $0.138 |
| PEA005 | Baltimore, MD-Washington, DC | 7,842,134 | $19,672,000 | $21,640,000 | $0.138 |
| PEA006 | Philadelphia, PA | 7,587,252 | $19,028,000 | $20,931,000 | $0.138 |
| PEA007 | Boston, MA | 6,776,035 | $17,003,000 | $18,704,000 | $0.138 |
| PEA008 | Dallas, TX | 6,452,472 | $16,185,000 | $17,804,000 | $0.138 |
| PEA009 | Miami, FL | 6,291,880 | $15,783,000 | $17,362,000 | $0.138 |
| PEA010 | Houston, TX | 5,891,999 | $14,781,000 | $16,260,000 | $0.138 |
| PEA011 | Atlanta, GA | 5,435,312 | $13,637,000 | $15,001,000 | $0.138 |
| PEA012 | Detroit, MI | 5,137,479 | $12,894,000 | $14,184,000 | $0.138 |
| PEA013 | Orlando, FL | 4,562,642 | $11,456,000 | $12,602,000 | $0.138 |
| PEA014 | Cleveland, OH | 4,096,678 | $10,284,000 | $11,313,000 | $0.138 |
| PEA015 | Phoenix, AZ | 3,817,117 | $9,577,000 | $10,535,000 | $0.138 |
| PEA016 | Seattle, WA | 3,792,218 | $9,518,000 | $10,470,000 | $0.138 |
| PEA017 | Minneapolis-St. Paul, MN | 3,390,091 | $8,511,000 | $9,363,000 | $0.138 |
| PEA018 | San Diego, CA | 3,095,313 | $7,773,000 | $8,551,000 | $0.138 |
| PEA019 | Portland, OR | 3,022,643 | $7,593,000 | $8,353,000 | $0.138 |
| PEA020 | Denver, CO | 2,789,669 | $7,006,000 | $7,707,000 | $0.138 |

Resulting Tentative Choices (i.e., the Transformed Submission) in Round 17:

| Market # | Market Name | Quantity | Price |
|---|---|---|---|
| PEA001 | New York, NY | 1 | $69,596,000 |
| PEA002 | Los Angeles, CA | 1 | $53,529,000 |
| PEA003 | Chicago, IL | 1 | $25,843,000 |
| PEA004 | San Francisco, CA | 1 | $24,904,000 |
| PEA005 | Baltimore, MD-Washington, DC | 1 | $21,640,000 |
| PEA006 | Philadelphia, PA | 1 | $20,931,000 |
| PEA007 | Boston, MA | 1 | $18,704,000 |
| PEA008 | Dallas, TX | 1 | $17,804,000 |

FIG. 22A

Participant's Submission:

I would like to place bids for 1 block at this round's clock price for the 8 largest markets whose clock price does not exceed $1.15 per MHz-pop.

Associated Context in Round 42:

| Market # | Market Name | Population | Round's Opening Price | Round's Clock Price | $ per MHz-Pop |
|---|---|---|---|---|---|
| PEA001 | New York, NY | 25,237,061 | $515,167,123 | $566,684,000 | $1.123 |
| PEA002 | Los Angeles, CA | 19,410,169 | $416,473,123 | $458,121,000 | $1.180 |
| PEA003 | Chicago, IL | 9,366,713 | $202,303,000 | $222,534,000 | $1.188 |
| PEA004 | San Francisco, CA | 9,027,937 | $202,872,123 | $223,160,000 | $1.236 |
| PEA005 | Baltimore, MD-Washington, DC | 7,842,134 | $193,803,000 | $213,184,000 | $1.359 |
| PEA006 | Philadelphia, PA | 7,587,252 | $140,944,123 | $155,039,000 | $1.022 |
| PEA007 | Boston, MA | 6,776,035 | $114,413,000 | $125,855,000 | $0.929 |
| PEA008 | Dallas, TX | 6,452,472 | $115,922,123 | $127,515,000 | $0.988 |
| PEA009 | Miami, FL | 6,291,880 | $128,511,000 | $141,363,000 | $1.123 |
| PEA010 | Houston, TX | 5,891,999 | $115,089,123 | $126,599,000 | $1.074 |
| PEA011 | Atlanta, GA | 5,435,312 | $134,458,123 | $147,904,000 | $1.361 |
| PEA012 | Detroit, MI | 5,137,479 | $62,290,000 | $68,519,000 | $0.667 |
| PEA013 | Orlando, FL | 4,562,642 | $63,716,000 | $70,088,000 | $0.768 |
| PEA014 | Cleveland, OH | 4,096,678 | $36,146,123 | $39,761,000 | $0.485 |
| PEA015 | Phoenix, AZ | 3,817,117 | $94,383,000 | $103,822,000 | $1.360 |
| PEA016 | Seattle, WA | 3,792,218 | $85,268,000 | $93,795,000 | $1.237 |
| PEA017 | Minneapolis-St. Paul, MN | 3,390,091 | $76,262,000 | $83,889,000 | $1.237 |
| PEA018 | San Diego, CA | 3,095,313 | $76,622,000 | $84,285,000 | $1.361 |
| PEA019 | Portland, OR | 3,022,643 | $43,700,000 | $48,070,000 | $0.795 |
| PEA020 | Denver, CO | 2,789,669 | $69,140,123 | $76,055,000 | $1.363 |

Resulting Tentative Choices (i.e., the Transformed Submission) in Round 42:

| Market # | Market Name | Quantity | Price |
|---|---|---|---|
| PEA001 | New York, NY | 1 | $566,684,000 |
| PEA006 | Philadelphia, PA | 1 | $155,039,000 |
| PEA007 | Boston, MA | 1 | $125,855,000 |
| PEA008 | Dallas, TX | 1 | $127,515,000 |
| PEA009 | Miami, FL | 1 | $141,363,000 |
| PEA010 | Houston, TX | 1 | $126,599,000 |
| PEA012 | Detroit, MI | 1 | $68,519,000 |
| PEA013 | Orlando, FL | 1 | $70,088,000 |

FIG. 22B

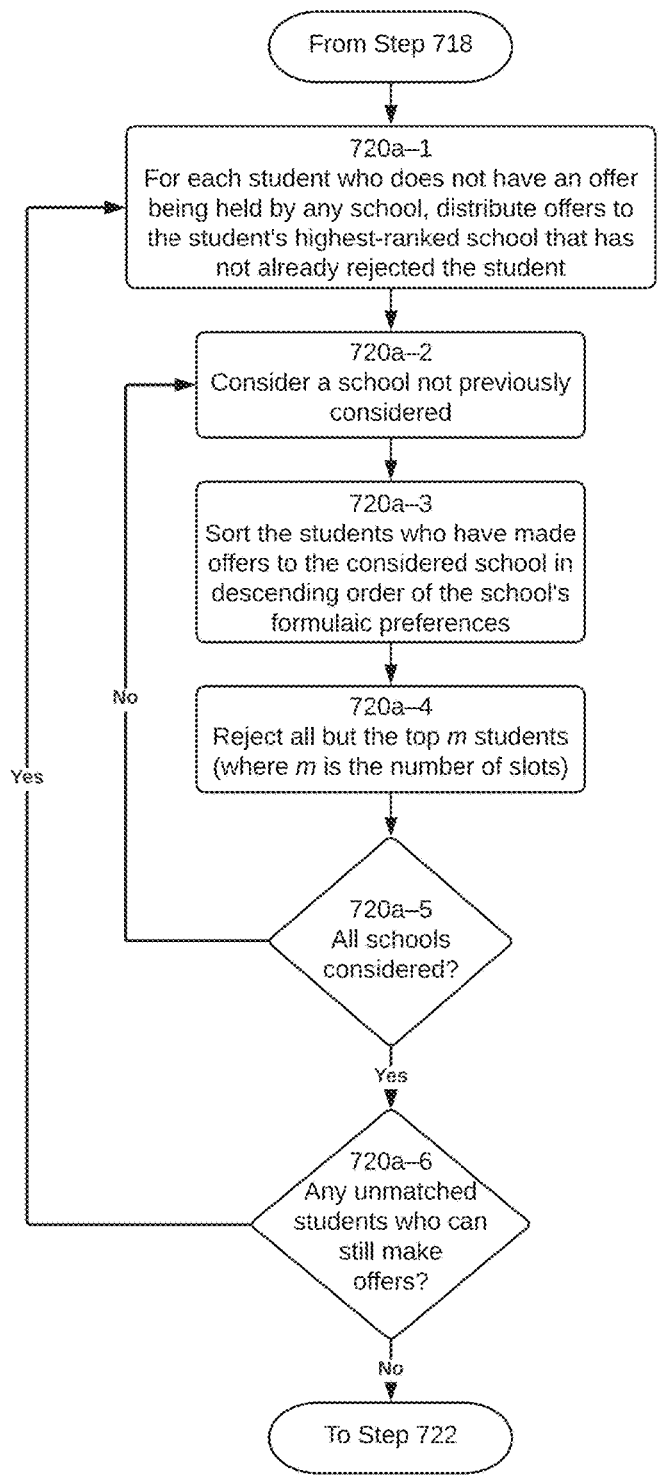
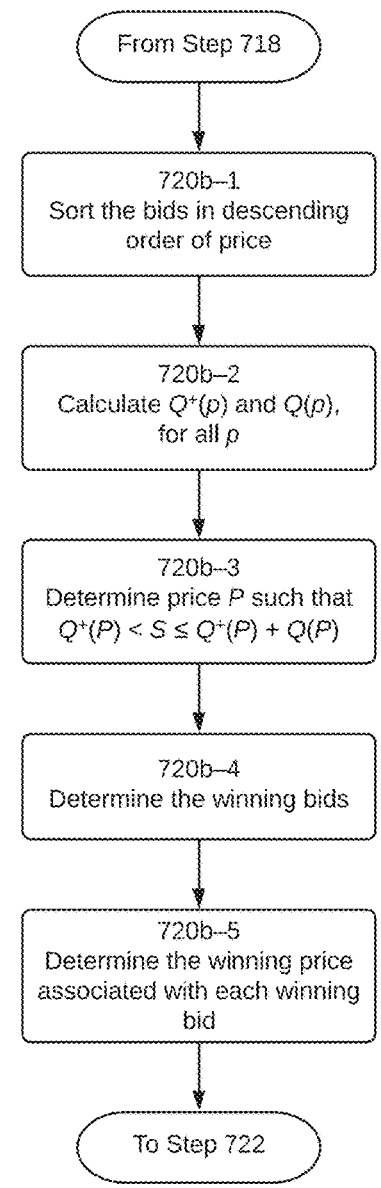
FIG. 23A
FIG. 23B

SYSTEM AND METHOD FOR INTERVENTIONS IN ARTIFICIAL INTELLIGENCE MODELS

CROSS-REFERENCE TO RELATED APPLICATIONS

This application is a continuation of International Patent Application No. PCT/US2024/028298, filed 8 May 2024, which claims priority to U.S. Provisional Patent Applications Ser. Nos. 63/501,147, filed 9 May 2023, 63/501,148, filed 9 May 2023, 63/517,900, filed 5 Aug. 2023, and 63/517,929, filed 6 Aug. 2023. The disclosures of the foregoing applications are incorporated herein by reference in their entirety.

This application claims the benefit of the filing date, pursuant to the provisions of 35 U.S.C. § 119(e), of U.S. Provisional Patent Applications Ser. Nos. 63/501,147, filed 9 May 2023, 63/501,148, filed 9 May 2023, 63/517,900, filed 5 Aug. 2023, and 63/517,929, filed 6 Aug. 2023.

TECHNICAL FIELD

Aspects of the present disclosure relate to improving artificial intelligence systems and methods, and, more particularly, to an improved system and method for interventions in artificial intelligence models.

BACKGROUND

For more than two decades, internet search providers have utilized sponsored search as the preferred method of deriving revenues from their search engines. The practice can be traced back at least to 1996, when Open Text began its "Preferred Listing" service, by which a company could pay for a top position on a search page. Many of the familiar features of sponsored search today, including bidding for positions in keyword auctions and paying for advertising on a pay-per-click basis, were introduced by GoTo.com (later known as Overture) in 1998-99 (see Davis et al., U.S. Pat. No. 6,269,361). Google made two further innovations when it started its own sponsored search service in 2002: it refined the auction format to the Generalized Second Price auction; and it began to adjust the rank order of advertisers' bids by a "quality score" that is related to click-through rate, ad relevance, landing-page experience, and site quality (see, for example, Fain and Pedersen, 2006; Edelman, Ostrovsky and Schwarz, 2007; Varian, 2007; and Jansen and Mullen, 2008).

Observe that, over the entire lifetime of the internet, it is difficult to identify any search engine model that has provided users with pure unadulterated search results for any extended period. Instead, the general rule—not the exception—has been that search results have been subject to intervention.

In this specification, an intervention in a model means in general terms the introduction of a modification to the model that changes the output generated by the model. For example, one may speak of an intervention in a search engine model or of an intervention in an artificial intelligence model. (For that matter, one may speak of an intervention in a search engine model that incorporates artificial intelligence.) One may also use the verb form of intervention: if one speaks of intervening in a model, that will be synonymous with introducing or making an intervention in that model. Often, the interventions discussed in this specification will take the form of providing additional information to the model or modifying the way in which the model utilizes its information. A better sense of the term "intervention" can be gained by studying the examples discussed throughout this specification.

The history of sponsored search provides at least two early examples of interventions in search engine models. First, GoTo.com's insertion of sponsored (paid) links at the top of a page of organic (unpaid) links represents a modification, based on advertisers' bids, of the ordered list of links otherwise generated by the search engine model. (One might potentially argue that this is not an intervention, as the organic links produced by the search engine model are left alone; instead, a wholly separate set of sponsored links is inserted. However, this argument appears disingenuous, as: (1) the Federal Trade Commission has asserted that search engines do not adequately label sponsored links (Hansen, 2002; Tibken, 2013; FTC, 2017); and (2) the Pew Research Center found that 38% of survey respondents were unaware of the distinction between sponsored links and organic links, and fewer than 17% of survey respondents could always tell which links were sponsored and which were organic (Fallows, 2005). Second, Google's adjustment of bids by quality scores is itself an intervention in the sponsored search auction model, by potentially changing the ordered list of sponsored links determined by the auction. (Again, one might potentially argue that this is not an intervention; this is actually part of the process of determining the intrinsic order of sponsored links, as all else equal, a higher-quality advertiser deserves a higher position on the search page. However, the determination of quality score is so opaque and the reward from price discrimination against high-willingness-to-pay advertisers is so great that it is hard to believe that the quality score does not incorporate factors above and beyond what could be attributed to quality.)

Insertion of sponsored links on the search page and adjustment of advertisers' bids by quality scores are hardly the only examples, in use today, of interventions in search engine models. Nor is it the case that all interventions are greedy or difficult to defend. For example, some interventions may occur in order to prevent users from receiving links to pornographic materials or to malicious websites. Other interventions may occur in order to reduce the probability of users receiving links to websites promulgating disinformation. And some interventions could potentially occur to reflect ideological objectives of the owners of the search engine model. This specification shall try to avoid placing any value judgments on any interventions, choosing only to focus on systems and methods for interventions.

Technology firms have developed a vast toolbox of interventions in search engine models that are highly effective and may be significantly responsible for the $1-trillion-plus market capitalization of Alphabet Inc. (Google's parent company).

SUMMARY

However, the existing toolbox of interventions is much less tailored to the new generation of artificial intelligence models led by ChatGPT. There are two basic reasons for this. First, for more than two decades, the relevant output to users of search engines has been an ordered list of hyperlinks. Consequently, the existing toolbox of interventions has revolved about manipulating outputs comprising ordered lists of links. However, the emerging artificial intelligence models are not limited to producing ordered lists of links; more usefully, they can generate paragraphs of unordered free-form prose or other data outputs. Only time will tell whether an ordered list of sponsored hyperlinks remains an effective way to monetize search requests when the format of the underlying response itself is no longer an ordered list of links. Second, the relevant input to traditional search engines has been short combinations of search terms, giving rise to the notion of "keywords". However, the emerging artificial intelligence models are not limited to accepting short combinations of search terms; more usefully, they can interpret increasingly complex questions and engage in relatively nuanced exchanges. Keywords are a coarse instrument for identifying whether a stakeholder wishes to intervene in a richly-expressed request—and how much the stakeholder would be willing to pay for an intervention.

To elaborate on this point, consider today's keyword auction systems based on application of the Generalized Second Price (GSP) auction. Each advertiser submits a bid for the keyword. In the pure form of the GSP, the highest bidder wins the top position on the page and pays the second-highest bid, the second-highest bidder wins the second position on the page and pays the third-highest bid, etc. However, in a future in which most internet searches are done using a generative artificial intelligence system, there may no longer be any significance to winning the top position or the second position—and the "organic" output may no longer bear much similarity to a present-day search page. Instead, the artificial-intelligence-based search engine will be expected to write conventional prose, and the user may not want to see a list of links, but instead to receive a single answer or a few recommendations.

By the same token, the emerging technologies may be rendering the notion of "keywords" obsolete. To give an example, a 2020 Google video entitled *Google Ads Tutorials: How the Search Ad Auctions Work*, discusses a hypothetical stakeholder selling children shoes. It contemplates bidding on six possible keywords: "kids shoes", "shoes for kids", "toddler shoes", "kids sneakers", "kids sandals", and "babies first shoes". However, with artificial intelligence available, why should anyone go through this process? The keywords "kids shoes" and "shoes for kids" are perfectly synonymous and the others are quite similar—why should anyone need to bid separately for these? Yet even at the time of writing this patent application, a Google search on "kids shoes" and on "shoes for kids" yielded different sponsored hyperlinks, arranged in different orders. One would conjecture that as user requests move away from short combinations of search terms and toward more nuanced questions or iterative chats, keywords may increasingly become blunt and ineffective instruments for stakeholders to express interest in user requests.

Aspects of the present disclosure relate to the following two facets:

Approaches to intervention outputs that are more congruent with the outputs of the emerging artificial intelligence systems than the approaches in the existing art; and Approaches to intervention inputs that are more congruent with the inputs of the emerging artificial intelligence systems than the approaches in the existing art.

Limited to interventions in the existing art, providers of artificial-intelligence-based search engine models may be relegated to combinations of the following approaches for monetizing their search models:

Output pages of the emerging AI systems can be preceded by sponsored links, as are frequently included in search pages today, or decorated with display ads, as are frequently employed by newspapers and other websites. However, once users are habituated to using the emerging AI-based search models, they are likely to pay less and less attention to the surrounding sponsored links or display ads. Moreover, ad blockers themselves are likely to evolve and incorporate greater artificial intelligence, making them increasingly effective against both display ads and sponsored links.

The emerging AI systems can charge subscriber fees. However, since consumers became habituated to free search engines long ago, consumers are likely to put up substantial resistance to paid services.

Support of the emerging AI systems can be socialized, i.e., subsidized by the government. However, the last thing that a democracy needs is an all-knowing AI system closely linked to the government.

All of these approaches seem less than ideal. The continued use of sponsored links preceding the "organic" output seems the most viable—and a few of the embodiments will take this approach—but the prognosis even for sponsored links seems poor, given the incongruence with the organic output of the emerging artificial intelligence models.

The need for the embodiments disclosed herein is evident from recent news articles: "Although ChatGPT still has plenty of room for improvement, its release led Google's management to declare a "code red." For Google, this was akin to pulling the fire alarm. Some fear the company may be approaching a moment that the biggest Silicon Valley outfits dread—the arrival of an enormous technological change that could upend the business. . . . Google has already built a chat bot that could rival ChatGPT. In fact, the technology at the heart of OpenAI's chat bot was developed by researchers at Google. . . . Google may be reluctant to deploy this new tech as a replacement for online search, however, because it is not suited to delivering digital ads, which accounted for more than 80 percent of the company's revenue last year." (Grant and Metz, 2022)

Accordingly, there exists a very strong need for new approaches to interventions.

Aspects of the present disclosure provide an improved system and method for interventions in artificial intelligence models over a computer network that includes: a first (artificial intelligence) computer system comprising at least one computer for implementing an artificial intelligence model; a database that contains intervention information, said database stored in memory or on any storage device; a second (intermediary) computer system comprising at least one computer for intermediating user requests to the artificial intelligence computer system, which receives requests from users, applies intervention information queried from the database to compute an intervention to be made for each request, asks the artificial intelligence computer system to generate a response to each request, subject to the associated intervention, and returns responses to users; and a network setup which enables the artificial intelligence computer system and the intermediary computer system to communicate with each other, which enables at least one of the intermediary computer system and the artificial intelligence computer system to send queries to and receive answers from the database, and which enables the intermediary computer system to receive requests from and send responses to other (user) computer systems.

Aspects of the present disclosure also provide an improved system and method for applying interventions to user requests to an artificial intelligence (AI) model. A request originating from a user may be expressed as free text (and interpreted by a large language model (LLM)) or it may be expressed in a more structured form (as in the USPTO's current patent search tool). Alternatively, a request originating from a user may be expressed in any other form of data. Before going to the AI model, the request is associated with one or more keywords or concepts. A database is queried to obtain intervention information corresponding to these keywords or concepts, and the intervention information is applied to calculate an intervention. The request and the calculated intervention are then sent to the AI System, which is instructed to determine a response taking account of the calculated intervention. Finally, the determined response is returned to the user.

In some embodiments, the intermediary computer system accesses the database and calculates the intervention to be applied to a request. In such embodiments, the intermediary computer system receives requests from users, applies intervention information queried from the database to compute an intervention to be made for each request, asks the artificial intelligence computer system to generate a response to each request taking account of the intervention calculated for that request, receives a response generated by the artificial intelligence computer system, and returns generated responses to user systems.

In other embodiments, a current set of intervention information (applicable to many requests) is loaded in bulk into the artificial intelligence model as part of a training or fine-tuning data set. As in many embodiments, this data will change periodically (e.g., daily or hourly), the pre-intervention parameters of the artificial intelligence model will be saved before intervention information is loaded and, each time that a new set of intervention information is scheduled to be loaded, the artificial intelligence model will first revert to the pre-intervention parameters. In such embodiments, the intermediary computer system has the limited functionality of communicating with user systems and queuing requests—and it could be dispensed with entirely.

In yet other embodiments, the interventions are applied directly to the parameters of the underlying AI model. In such embodiments, the intermediary computer system applies intervention information queried from the database to calculate a modification to one or parameters of the AI model. In that case, the querying of the database could instead be assigned to the AI computer system itself, leaving the intermediary computer system with the limited requirements of communicating with user systems and queuing requests—and the intermediary could be dispensed with entirely.

As such, in many of the embodiments, the interventions are not applied directly to modify any of the underlying parameters of the AI model. Instead, the artificial intelligence computer system is merely instructed to apply its best available "organic" information in generating its responses, but to take account of the intervention in a specified way. In the approach described three paragraphs above, the intervention is provided to the AI model on a case-by-case basis; in the approach described two paragraphs above, the intervention is loaded in bulk into the AI model. One important advantage of each of these two approaches is that the trained and tuned AI model does not need to be modified with each request, making it possible for requests to be processed more quickly. A second advantage of each of these two approaches is that the trained and tuned AI model may contain millions or billions of parameters, so it may be completely opaque which parameters would need to be modified, or by how much, to achieve a given intervention. Observe that each of these two approaches can be implemented without understanding exactly what the AI model and each individual parameter is doing. The first approach (described three paragraphs above) has two additional advantages over the second approach (described two paragraphs above): (1) changing the intervention in real time appears to be feasible only under the first approach (given that loading the entre set of intervention information could take substantial time and require substantial computing resources); and (2) similarly, only the first approach appears to make it feasible to apply different interventions to different requests processed at nearby times.

In several other embodiments, the intervention is implemented either by modifying the records in a fine-tuning data set or by inserting fictitious records into a fine-tuning data set—and then fine-tuning the AI model with it. In such embodiments, the intermediary computer system applies intervention information queried from the database to compute a modified version of a fine-tuning data set. In that case, again, the same functionality could be assigned to the artificial intelligence computer system itself and there is no need for a distinct intermediary computer system. This approach has the advantage of perhaps being more exact about how the intervention is to operate. However, its key disadvantage is that the AI model would need to undergo a reasonably expensive and time-consuming fine-tuning process every time that the intervention information is changed. (One way to mitigate this disadvantage is to undertake a policy of fine-tuning the AI model on perhaps only a daily or hourly basis. This would effectively reduce the frequency with which intervention information can be changed—this can have advantages, as well as disadvantages.) As before, such an approach would seem to preclude applying different interventions to different requests. This intervention information can be applied via prompts or in bulk.

In some exemplary non-limiting embodiments, the intervention comprises fine-tuning an AI model with a set of third-party ratings that might be outside the pre-training data set of the AI model or might be considered to be more accurate than much of the pre-training data set of the AI model. For example, a restaurant or travel reservation service might treat the number of Michelin stars or the Zagat rating as an intervention. In that case, the intermediary computer system sends a request to the artificial intelligence computer system, instructing it to apply the accumulated knowledge of the AI model in generating its responses, but also to apply a specified weight to the Michelin or Zagat score.

In some embodiments, the intermediary computer system need not communicate the intervention to the artificial intelligence computer system. Instead, the intermediary computer system sends a request to the artificial intelligence computer system, instructing it to apply the accumulated knowledge of the AI model to generate a response comprising the AI's model rating. The intermediary computer system then combines the intervention (itself interpretable as a rating) with the AI model's rating, returning a specified convex combination or other function of the intervention and the AI model's rating.

In many embodiments, the intervention information includes submissions from "stakeholders", which are other system users (including, without limitation, advertisers). In some exemplary non-limiting embodiments, the present disclosure provides an improved system and method for interventions in artificial intelligence models over a computer network that also includes a third "director" computer system comprising at least one computer. It has a network setup that enables the director computer system to receive submissions of intervention information from stakeholder computer systems and that enables the director computer system to add or replace entries in the database at the request of stakeholder computers. The intervention information submitted by stakeholder computer systems may be numerical, it may be non-numerical structured text, it may be free text as expressed in natural language, or it may be any other form of data. If the intervention information is numerical, then without limitation the intervention information may be scalar numbers, it may be vectors of numbers, or it may be arrays of numbers.

In many embodiments in which the intervention information includes submissions from stakeholders, the submissions may be numerical and the submitted numbers may represent offered payments ("bids"). Such embodiments would in some respects be reminiscent of current sponsored search auctions. However, as already emphasized above, the output of such embodiments would not be limited to being an ordered list of internet hyperlinks; instead, the output could be anything. In one exemplary embodiment, the director computer system accepts bids for keywords from stakeholders; it also allows stakeholders to revise their submissions subject to announced restrictions. When a request is received from a user, the intermediary computer system decides the keywords relevant to the request and queries the database for all of the intervention information (i.e., the set of bids) for these keywords that is currently in the database. The intermediary computer next calculates the intervention according to a specified function of the set of bids. Finally, as before, the intermediary computer system sends the request to the artificial intelligence computer system, instructing it to apply its best available information in generating its responses, but also to take account of the intervention in a specified way.

For embodiments in which stakeholders submit bids, the inventive system may include various components of auction systems that are not described in detail in this Specification, but that are described in prior art including, without limitation, the following US patents: Ausubel U.S. Pat. No. 5,905,975; Ausubel U.S. Pat. No. 6,026,383; Ausubel U.S. Pat. No. 7,062,461; Ausubel et al. U.S. Pat. No. 7,729,975; Ausubel et al. U.S. Pat. No. 7,899,734; and Ausubel et al. U.S. Pat. No. 8,566,211, the disclosures of which are incorporated herein by reference in their entirety.

Observe that, while bids are one conspicuous example of numerical intervention information that may be submitted by stakeholders, bids are by no means the only example. In some embodiments, the intervention information comprises numerical ratings submitted by experts in the field. The intermediary computer system sends a request to the artificial intelligence computer system, instructing it to apply the accumulated knowledge of the AI model in generating its responses, but also to apply a specified weight to the experts' numerical ratings.

The intervention information submitted by stakeholders may also be non-numerical. In some embodiments, the intervention information applied by a restaurant or travel reservation service comprises free text comments submitted by customers of the reservation service. The intermediary computer system sends a request to the artificial intelligence computer system, instructing it to apply the accumulated knowledge of the AI model in generating its responses, but also to apply a specified weight to the customers' free text comments.

As will be seen in the Detailed Description below, in some exemplary non-limiting embodiments, stakeholders' bids are effectively converted into independent third-party ratings and then treated in an analogous way to independent third-party ratings. In some of these embodiments, the AI model is explicitly instructed to generate its response to a user request by applying a convex combination of its "organic" information and the synthetic third-party ratings derived from the stakeholder bids.

A computer system may be, but is not limited to being, a generic computer, a special-purpose computer, a server, a chip, a mobile device such as a smart phone, a quantum computer, or any other device that performs the functions normally described as a computer. It may be a physical computer or it may be a virtual machine located in the cloud.

A network may be a local or wide area network such as, for example, the Internet, an intranet or a virtual private network, or alternatively a telephone system, either public or private, a facsimile system, an electronic mail system, a wired data network, a wireless data network, or any other network.

An artificial intelligence computer system (or an AI model) includes, without limitation, any computer system, network, or other computerized device exhibiting characteristics that are normally associated with human intelligence. The AI System may be a computer system that implements, without limitation: a large language model (LLM); a generative artificial intelligence model; artificial general intelligence; or any other form of artificial intelligence (AI). AI systems include, without limitation: generative adversarial networks; generative pre-trained transformers; and other transformer-based systems. The AI System may be, without limitation: ChatGPT; Bard; OpenAI's GPT; or Google's BERT. The AI System may also be, without limitation, a search engine that is assisted by an AI system, such as the April 2023 version of Bing, or a recommendation (or recommender) system that is assisted by an AI system.

According to one aspect, a computer-implemented method for intervening in an artificial intelligence (AI) model is provided. The method includes obtaining a request from a user computer. The method includes obtaining intervention information applicable to the request. The method includes generating an augmented request based upon the obtained request and the obtained intervention information. The method includes providing the augmented request as input to an AI model. The method includes obtaining a response to the augmented request from the AI model. The method includes sending the obtained response towards the user computer.

In some embodiments, the obtaining intervention information further comprises: obtaining one or more keywords or concepts associated with the obtained request; querying a database of intervention information using the one or more keywords or concepts; and obtaining the intervention information in response to the querying.

In some embodiments, the method further includes obtaining intervention information from one or more stakeholder computers; and updating a database using the obtained intervention information. In some embodiments, the intervention information comprises ratings or comments.

In some embodiments, the intervention information is based upon or comprises at least one rating or comment received from a stakeholder.

In some embodiments, the intervention information comprises bids.

In some embodiments, the intervention information is based upon or comprises at least one bid received from a stakeholder.

In some embodiments, a first weight is associated with the intervention information, wherein the first weight indicates an amount the intervention information should be weighted by the AI model. In some embodiments, the method further includes obtaining the first weight from a database. In some embodiments, the method further includes incorporating the first weight into the augmented request. In some embodiments, the method further includes incorporating into the augmented request a second weight for organic information contained in the AI model, wherein the organic information comprises information available to the AI model in response to the obtained request without the intervention information. In some embodiments, the first weight and the second weight are incorporated into the augmented request as a convex combination of the first weight and the second weight.

In some embodiments, the method further includes providing the request to a second AI model, wherein the second AI model is fine-tuned on intervention information; and obtaining from the second AI model the intervention information applicable to the obtained request.

In some embodiments, the method further includes identifying a first portion of the response comprising options associated with the intervention information and a second portion of the response comprising options not associated with the intervention information; and applying a first label to the first portion of the response and a second label to the second portion of the response before sending the response towards the user computer. In some embodiments, the first label comprises at least one of: a first color different from a second color used in the second label, a first typeface different from a second typeface used in the second label, a first symbol different from a second symbol used in the second label, or a first text character different from a second text character used in the second label.

In some embodiments, the AI model is a large language model.

In some embodiments, the intervention information corresponds to an independent third-party rating of an option.

In some embodiments, the method further includes masking the augmented request from the user computer.

In some embodiments, the intervention information is associated with a stakeholder and an option.

According to another aspect, a computer-implemented method for intervening in an artificial intelligence (AI) model is provided. The method includes obtaining intervention information from one or more stakeholder computers. The method includes creating a training set based upon the obtained intervention information. The method includes training the AI model on the created training set. The method includes obtaining a request from a user computer. The method includes obtaining a response to the request from the trained AI model. The method includes sending the obtained response towards the user computer.

In some embodiments, the method further includes updating a database using the obtained intervention information.

In some embodiments, the obtained intervention information comprises ratings or comments.

In some embodiments, the obtained intervention information is based upon or comprises at least one rating or comment.

In some embodiments, the obtained intervention information comprises bids.

In some embodiments, the obtained intervention information is based upon or comprises at least one bid received from a stakeholder computer.

In some embodiments, the AI model is a large language model.

In some embodiments, the intervention information corresponds to an independent third-party rating of an option.

In some embodiments, the intervention information is associated with a stakeholder computer and an option.

According to another aspect, a computer-implemented method for utilizing an artificial intelligence (AI) model to facilitate a choice mechanism among a plurality of participants is provided. The method includes obtaining a submission from a first participant of the plurality of participants. The method includes transforming the submission from the first participant, using an AI model, into a first set of one or more choices for a choice mechanism.

In some embodiments, the method further includes obtaining submissions or choices from other participants different from the first participant; and determining an outcome of the choice mechanism based upon the first set of one or more choices and the submissions or choices obtained from other participants.

In some embodiments, the method further includes training the AI model to generate a choice. In some embodiments, the training comprises at least one of pre-training or fine-tuning the AI model on one or more exemplary or actual submissions.

In some embodiments, the method further includes obtaining a search request from a user computer; selecting one or more choices from the first set of one or more choices; and augmenting the search request with intervention information based on the selected one or more choices. In some embodiments, the method further includes converting each of the selected one or more choices into an independent third-party rating, wherein the intervention information is based upon or comprises the independent third-party rating.

In some embodiments, the independent third-party rating corresponds to at least one of: a hotel, a restaurant, a venue, a store, or a commercial establishment.

In some embodiments, the method further includes, for each of the selected one or more choices, charging the first participant an associated choice amount.

In some embodiments, the method further includes transmitting the first set of one or more choices towards the first participant; and obtaining a response from the first participant indicating approval of the first set of one or more choices or a modification to the first set of one or more choices. In some embodiments, the method further includes training the AI model using the modification in response to a determination that the response from the first stakeholder indicates a modification to the set of choices.

In some embodiments, the method further includes obtaining submissions or choices from other participants different from the first participant; implementing an auction on the selected set of one or more choices and the obtained submissions or choices from other participants; and determining an allocation based on an outcome of the auction. In some embodiments, the auction is a generalized second price auction.

According to another aspect, a computer-implemented method for intervening in an artificial intelligence model is provided. The method includes transmitting a request towards an artificial intelligence (AI) search system comprising an AI model. The method includes receiving a response from the AI search system, the response comprising a first portion subject to at least one intervention and a second portion not subject to an intervention, wherein a label is applied to the first portion.

In some embodiments, the label comprises at least one of: a first color different from a second color used in the second portion of the response, a first typeface different from a second typeface used in the second portion of the response, a first symbol different from a second symbol used in the second portion of the response, or a first text character different from a second text character used in the second portion of the response.

According to another aspect, a computer-implemented method for utilizing an artificial intelligence (AI) model to facilitate a choice mechanism among a plurality of participants is provided. The method includes obtaining a submission from a user. The method includes transmitting the submission towards an AI model. The method includes obtaining (s3030), from the AI model, a response comprising a set of one or more choices for a choice mechanism, wherein the AI model transforms the submission into the set of one or more choices.

In some embodiments, the method further includes obtaining feedback from the user indicating an approval of the set of one or more choices or a modification to the set of one or more choices; and transmitting, towards the AI model, the feedback.

In some embodiments, the method further includes receiving an allocation based on an outcome of an auction based on the set of one or more choices. In some embodiments, the auction is a generalized second price auction.

According to another aspect, a computer-implemented method for utilizing an artificial intelligence (AI) model to facilitate a choice mechanism among a plurality of participants is provided. The method includes obtaining a first set of choices from a first participant of the plurality of participants. The method includes obtaining a search request from a user computer. The method includes selecting one or more choices from the first set of one or more choices. The method includes augmenting the search request with intervention information based on the selected one or more choices. The method includes providing the augmented search request to an AI model.

According to yet another aspect, a device comprising processing circuitry and a memory coupled to the processing circuitry. The device is configured to perform any of the foregoing methods.

According to yet another aspect, a computer program comprising instructions is provided, which, when executed by processing circuity of a device, causes the device to perform any of the foregoing methods.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain principles of the disclosure. No attempt is made to show structural details of the disclosure in greater detail than may be necessary for a fundamental understanding of the disclosure and the various ways in which it can be practiced. In the drawings:

FIGS. 3A and 3B are diagrams illustrating, in greater detail, an element of FIG. 2.

FIGS. 9A, 9B and 9C provide an exemplary request and associated responses, both without and with intervention, for an exemplary non-limiting embodiment.

FIGS. 10A, 10B and 10C provide an exemplary request and associated responses, both without and with intervention, for an exemplary non-limiting embodiment.

FIGS. 11A, 11B and 11C provide an exemplary request and associated responses, both without and with intervention, for an exemplary non-limiting embodiment.

FIGS. 12A AND 12B are flow diagrams illustrating, in greater detail, elements of the flow diagrams of FIGS. 5 and 6, respectively.

FIGS. 13A, 13B and 13C provide exemplary outputs of FIGS. 12A and 12B.

FIGS. 21A and 21B provide an exemplary submission and its transformation into a set of tentative choices for an exemplary non-limiting embodiment.

FIGS. 22A and 22B provide an exemplary submission and its transformation into a set of tentative choices for an exemplary non-limiting embodiment.

FIGS. 23A and 23B are flow diagrams illustrating elements of the flow diagram of FIG. 19 in greater detail.

DETAILED DESCRIPTION

Figure 1A:
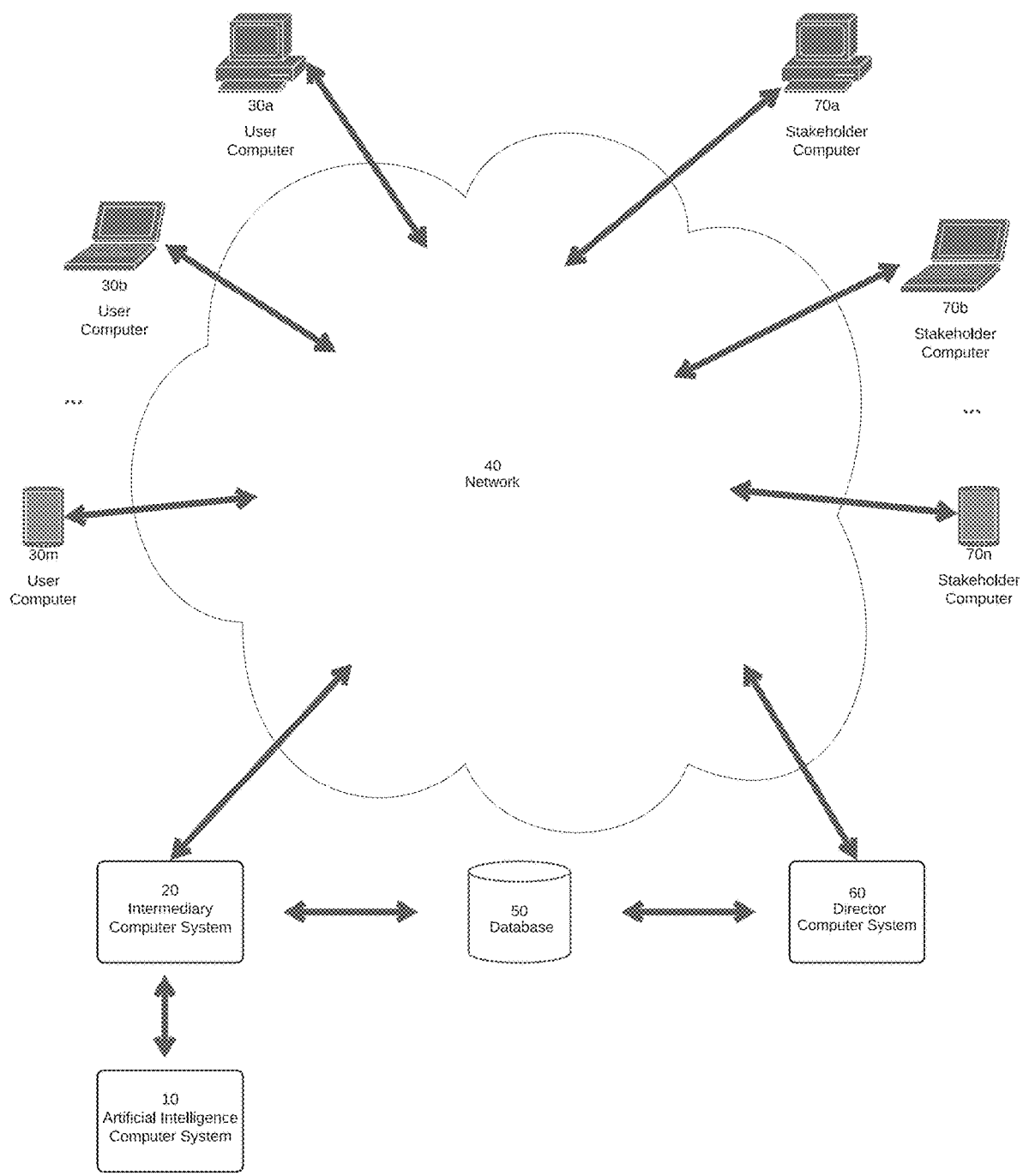
FIG. 1A is a diagram illustrating the overall architecture in accordance with an exemplary non-limiting embodiment.

This Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in this Specification, including without limitation, in the Field of the Invention, the Summary of the Invention, or the Detailed Description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, or by other processing of signals. The memory locations where data bits are maintained are physical locations that have particular electrical, magnetic, optical, or organic properties corresponding to the data bits.

It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more processors or other control devices. A processor may be a central processing unit (CPU), a graphics processing unit (GPU), or other processing circuitry that can execute software. A processor may be implemented with one or more general-purpose and/or special-purpose processors. Alternatively or additionally, an embodiment of a system or a component may be based upon a quantum computer architecture or may employ various quantum computing components.

Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

When implemented in software or firmware, various elements of the systems described herein are essentially the code segments or instructions that perform the various tasks. The program or code segments can be stored in a tangible non-transitory processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, a USB stick, an erasable ROM (EROM), a floppy diskette, a CD-ROM, an optical disk, a hard disk, or the like. The embodiments described herein are merely intended as examples and to serve as a guide for implementing the novel systems and method herein in any application. As such, the examples presented herein are intended as non-limiting.

Preliminaries

FIG. 1A illustrates an architecture in accordance with a non-limiting exemplary embodiment. Artificial Intelligence Computer System 10 (also known as the "AI System") is the key computer system that implements an artificial intelligence (AI) model. The AI System may be any computer system, network, or other computerized device exhibiting characteristics that are normally associated with human intelligence. The AI System may be a computer system that implements, without limitation: a large language model (LLM); a deep learning model; a neural network; generative artificial intelligence; artificial general intelligence; or any other form of artificial intelligence (AI). AI systems include, without limitation: generative adversarial networks; generative pre-trained transformers; and other transformer-based systems. The AI System may be, without limitation: ChatGPT; Bard; OpenAI's GPT; or Google's BERT. The AI System may also be, without limitation, a search engine that is assisted by an AI system, such as the April 2023 version of Bing, or a recommendation (or recommender) system that is assisted by an AI system. The AI System may operate, without limitation, on a server, an array of servers, a desktop computer, any other device or set of devices with a CPU (central processing unit), GPU (graphics processing unit), TPU (tensor processing unit) or other processor or processing circuitry, or any other computer system, which may be deployed in an office, on the cloud, in any form of data center, or in any other location. For the avoidance of doubt, the AI System (or any of the other computer systems utilized in the present disclosure) may include quantum computers or may employ quantum computing elements.

Intermediary Computer System 20 (also known as the "Intermediary") is a computer system that interacts both with AI System 10 and with user computers. Examples of Intermediary 20 include, without limitation, a server, an array of servers, a desktop computer, any other device or set of devices with a CPU, GPU, TPU or other processor or processing circuitry, or any other computer system, which may be deployed in an office, on the cloud, in any form of data center, or in any other location. User Computers 30*a-m* (each a computer system) are utilized by users to submit requests and to receive responses. Examples of User Computers 30*a-m* include, without limitation, a desktop computer, a laptop computer, a smart phone, a tablet, any other device with a CPU, GPU, TPU or other processor or processing circuitry, or any other computer system. Network 40 represents a computer network with which multiple, non-localized user computer systems can connect. In many exemplary embodiments, Network 40 is the Internet. In some exemplary embodiments, user requests are communicated from User Computers 30*a-m* to Intermediary 20 (and responses are communicated from Intermediary 20 to User Computers 30*a-m*) via the Network 40; the AI System 10 is not itself connected directly to the Network 40, but the AI System 10 is connected directly to Intermediary 20.

Also connected to Intermediary 20 is Database 50, which may be stored in memory or on any storage device including, without limitation, RAM, ROM, a hard disk drive, a solid-state drive, or any other medium capable of storing data. The Intermediary 20 queries Database 50 for intervention information associated with a user's request, Database 50 returns intervention information to Intermediary 20, and Intermediary 20 applies the intervention information to determine an intervention. Intermediary 20 then sends the request and the determined intervention to AI System 10, which is instructed to generate a response taking account of the determined intervention. AI System 10 returns a response to Intermediary 20 which, in turn, returns a response via the Network 40 to the User Computer 30a-m that submitted the request.

In some embodiments, there is also an additional computer system, the Director Computer System 60 (also known as the "Director") involved in establishing and updating intervention information provided by stakeholders. Examples of Director 60 include, without limitation, a server, an array of servers, a desktop computer, any other device(s) with a CPU, GPU, TPU or other processor or processing circuitry, or any other computer system, which may be deployed in an office, on the cloud, in any form of data center, or in any other location. Stakeholders make use of Stakeholder Computers 70a-n (each a computer system) to submit intervention information, which is communicated to Director 60 via Network 40. Examples of Stakeholder Computers 70a-n include, but are not limited to, a desktop computer, a laptop computer, a smart phone, a tablet, any other device with a CPU, GPU, TPU or other processor or processing circuitry, or any other computer system. Director 60 is also connected to Database 50, and it updates Database 50 based on intervention information submitted by Stakeholder Computers 70a-n. In some embodiments, Intermediary 20, Director 60 or another computer system provides feedback to Database 50 after observing how responses influence the behavior of users.

Various aspects of the architecture depicted in FIG. 1A are inessential and could easily be varied. For example, FIG. 1A depicts the AI System 10 as connected directly to Intermediary 20 but not connected directly to the Network 40. However, the architecture could instead have AI System 10 communicate with Intermediary 20 via the Network 40 or via another network (e.g., a private network). Similarly, FIG. 1A depicts the AI System 10, the Intermediary 20, and the Director 60 as separate computer systems, but the functionality of any two of these systems or all three of these systems could be combined into a single computer system or distributed among additional computers, etc.

Figure 1B:
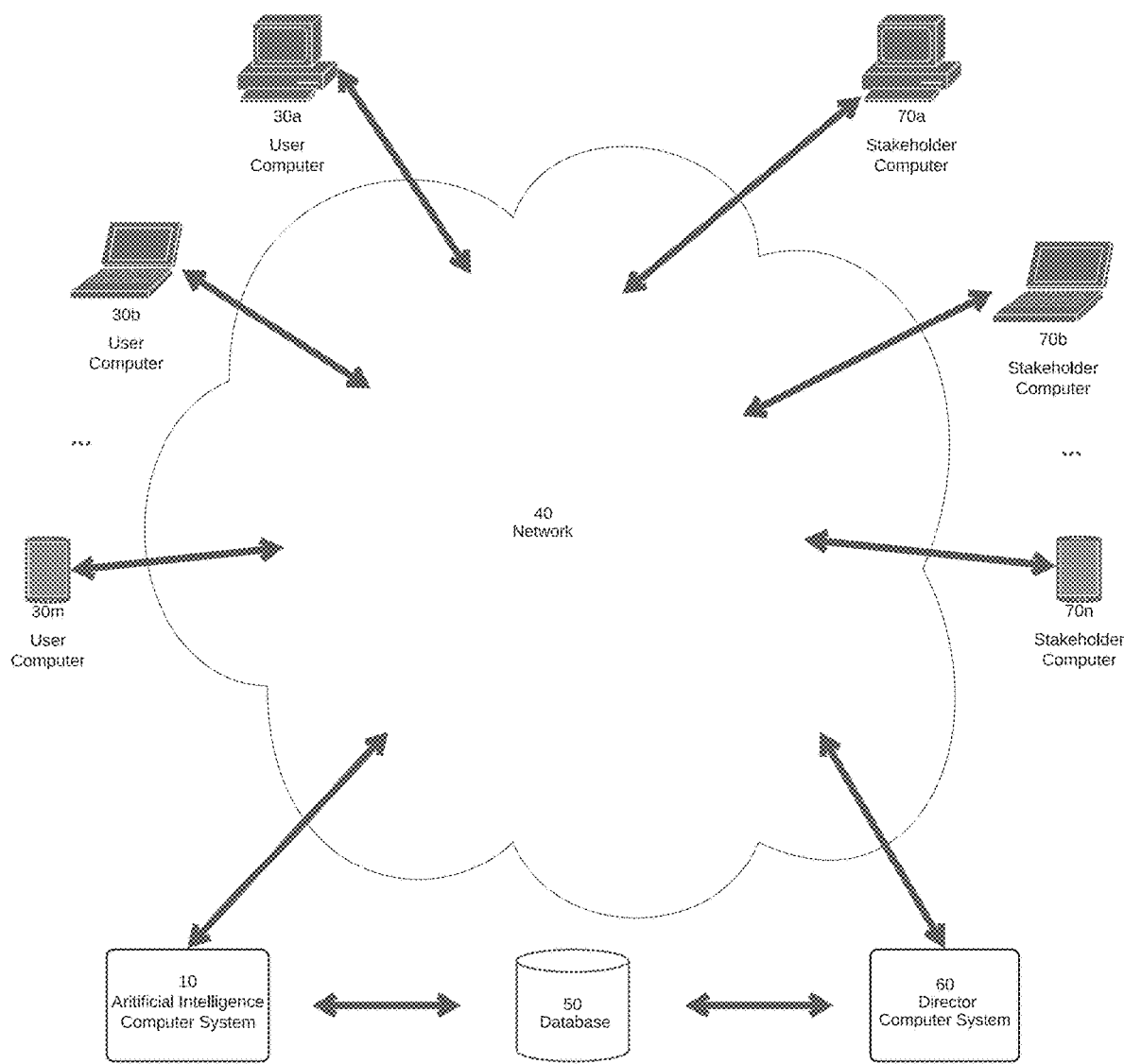
FIG. 1B is a diagram illustrating the overall architecture in accordance with an exemplary non-limiting embodiment.

For example, FIG. 1B illustrates an architecture in accordance with a non-limiting exemplary embodiment in which the functionality of the AI System 10 and the Intermediary 20 have been merged. There is no Separate Intermediary 20 in FIG. 1B. Instead, the AI System 10 interacts directly with User Computers 30a-m via the Network 40 and connects directly with the Database 50. As before, in some embodiments, there is also an additional computer system, the Director 60 involved in establishing and updating intervention information provided by stakeholders. Stakeholders make use of Stakeholder Computers 70a-n to submit intervention information, which is communicated to Director 60 via Network 40. Director 60 is also connected to Database 50, and it updates Database 50 based on intervention information submitted by Stakeholder Computers 70a-n. In some embodiments, AI System 10, Director 60 or another computer system provides feedback to Database 50 after observing how responses influence the behavior of users.

Figure 2:
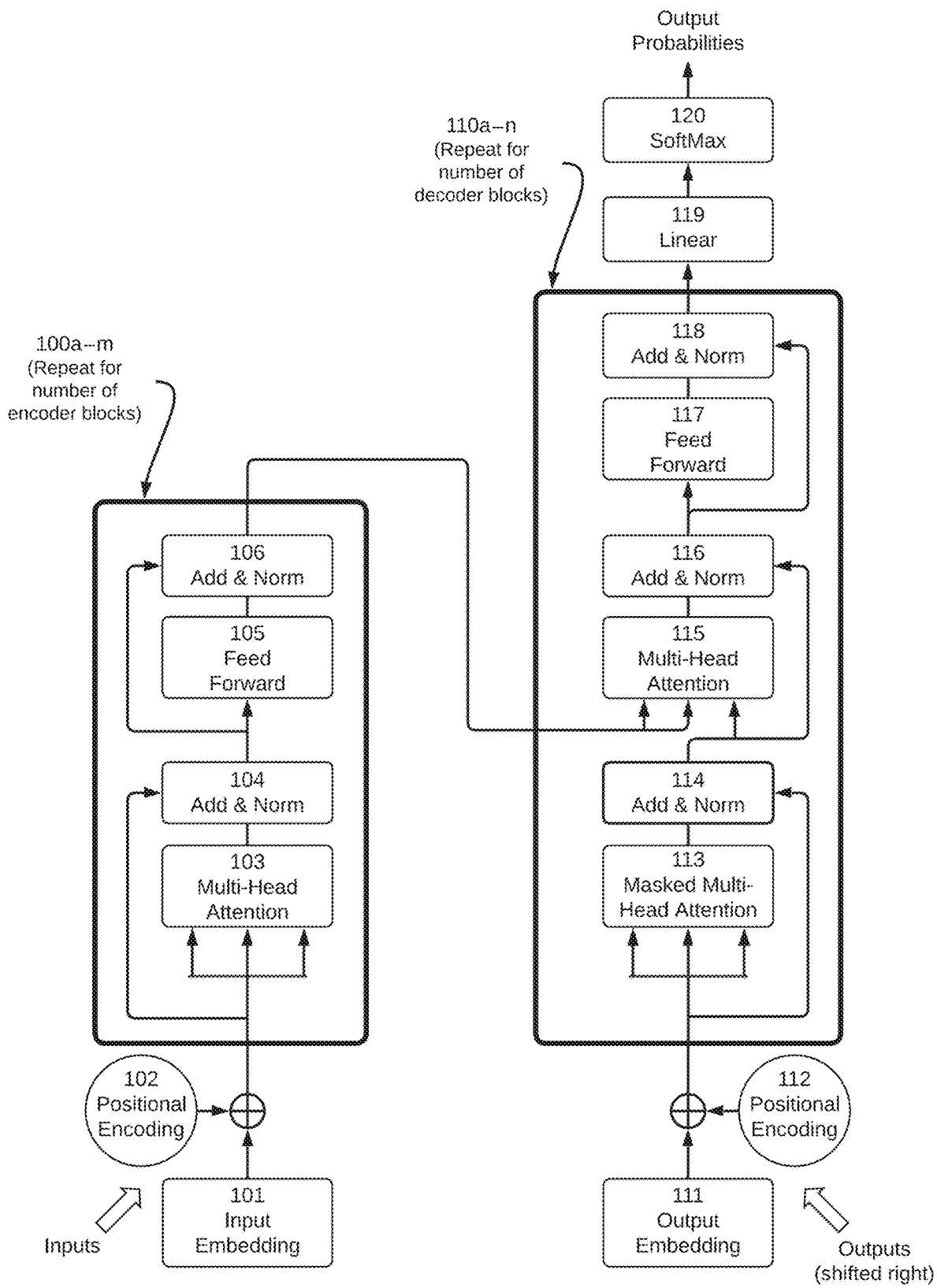
FIG. 2 is a schematic diagram illustrating the architecture of a transformer model, an exemplary non-limiting building block of an artificial intelligence computer system.

FIG. 2 illustrates an artificial intelligence computer system in accordance with a non-limiting exemplary embodiment. This figure depicts the architecture of a transformer neural network model (henceforth referred to as a "transformer model" or simply a "transformer"), the key building block of many artificial intelligence computer systems used at the time of this writing in 2023. A transformer model utilizes what is known in the art as an attention mechanism. The transformer model consists of multiple Encoder blocks 100a-m and multiple Decoder blocks 110a-n, each containing multiple sublayers. Each Encoder block 100i has two sublayers: a Multi-Head Self-Attention mechanism 103 and a Position-Wise Feed-Forward network 105. First, the Input Embedding 101 converts Inputs into a representation. However, this embedding has no built-in notion of order. Therefore, the Positional Encoding 102 additionally provides a positional representation of the Inputs' ordering. The resulting representations of the Inputs are then passed through multiple Encoder blocks 100a-m, each Encoder block 100i comprising a Multi-Head Self-Attention mechanism 103 and a Position-Wise Feed-Forward network 105. Residual connections and layer normalization ("Add & Norm") are applied after each sublayer: Multi-Head Self-Attention 103 is followed by Add & Norm 104; and Position-Wisc Feed Forward 105 is followed by Add & Norm 106. That is, the output of each sublayer is LayerNorm(x+Sublayer(x)), where Sublayer(x) is the function implemented by the sublayer itself. The results of the last Encoder block 100m are fed into the second layer of a Decoder block, the Multi-Head Self-Attention mechanism 115, to be described in the next paragraph.

Each Decoder block 110j has three sublayers: a Masked Multi-Head Self-Attention mechanism 113, a Multi-Head Self-Attention mechanism 115 and a Position-Wise Feed-Forward network 117. First, the Output Embedding 111 converts Outputs into a representation. However, this embedding has no built-in notion of order. Therefore, the Positional Encoding 112 additionally provides a positional representation of the Outputs' ordering. The resulting representations of the Outputs are then passed through multiple Decoder blocks 110a-n, each Decoder block 110j comprising a Masked Multi-Head Self-Attention mechanism 113, a Multi-Head Self-Attention mechanism 115 and a Position-Wise Feed-Forward network 117. Residual connections and layer normalization are applied after each sublayer: Masked Multi-Head Self-Attention mechanism 113 is followed by Add &Norm 114, Multi-Head Self-Attention 115 is followed by Add & Norm 116; and Position-Wise Feed Forward 117 is followed by Add & Norm 118. Finally, a linear projection is applied to the result of the last Decoder block 110n (Linear 119), and the SoftMax function is applied to make the output interpretable as a probability vector (SoftMax 120). This produces the Output Probabilities. Additional detail can be found in Vaswani et al. (2017).

FIGS. 3A and 3B provide further detail of the Multi-Head Self-Attention mechanisms 103, 113 and 115 employed in both the encoder and decoder blocks of FIG. 2. The mechanism comprises several parallel attention heads, each independently computing a set of attention weights for the input sequence. The input sequence for each attention head comprises queries and keys, each a vector of dimension $d_k$, and values, each a vector of dimension $d_v$. The Scaled Dot-Product Attention is defined by equation (1):

$$\text{Attention}(Q, K, V) = \text{SoftMax}\left(\frac{QK^T}{\sqrt{d_k}}\right)V \qquad (1)$$

FIG. 3A depicts the application of equation (1). The queries are packed together into a matrix Q, the keys are packed together into a matrix K, and the values are packed together into a matrix V. In Step 131, the product of Q and the transpose of K is computed by matrix multiplication (MatMul). In Step 132, the result $QK^T$ of Step 131 is scaled by dividing by the square root of $d_k$. In optional Step 133, a portion of the output to be predicted (e.g., future states) is masked; this occurs in the Masked Multi-Head Self-Attention mechanism 113, but not in the Multi-Head Self-Attention mechanisms 103 and 115. In Step 134, the SoftMax function is applied to each row of the scaled and optionally masked matrix product. The SoftMax function, as applied to an N-dimensional vector z, is defined by $$s_i = e^{zi} / \sum_{i=1}^{N} e^{zi},$$

and it has the effect of converting arbitrary weights into nonnegative numbers that are normalized to sum to one. Finally, in Step 135, the result of the SoftMax function is multiplied by V using matrix multiplication (MatMul).

FIG. 3B depicts a Multi-Head Self-Attention mechanism (or Masked Multi-Head Self-Attention mechanism). Instead of applying a single attention function to the queries, keys and values, the attention function is applied in parallel h times to different linear projections of the queries, keys and values. In Steps 141a-c, linear projections of the queries, keys and values to dx, de and dv dimensions, respectively, are performed in parallel h times. In Step 142, the Scaled Dot-Product Attention of FIG. 3A is applied in parallel h times. In Step 143, the results of Step 142 are concatenated. In Step 144, they are once again projected, producing the final output of the Multi-Head Self-Attention mechanism.

Figure 4:
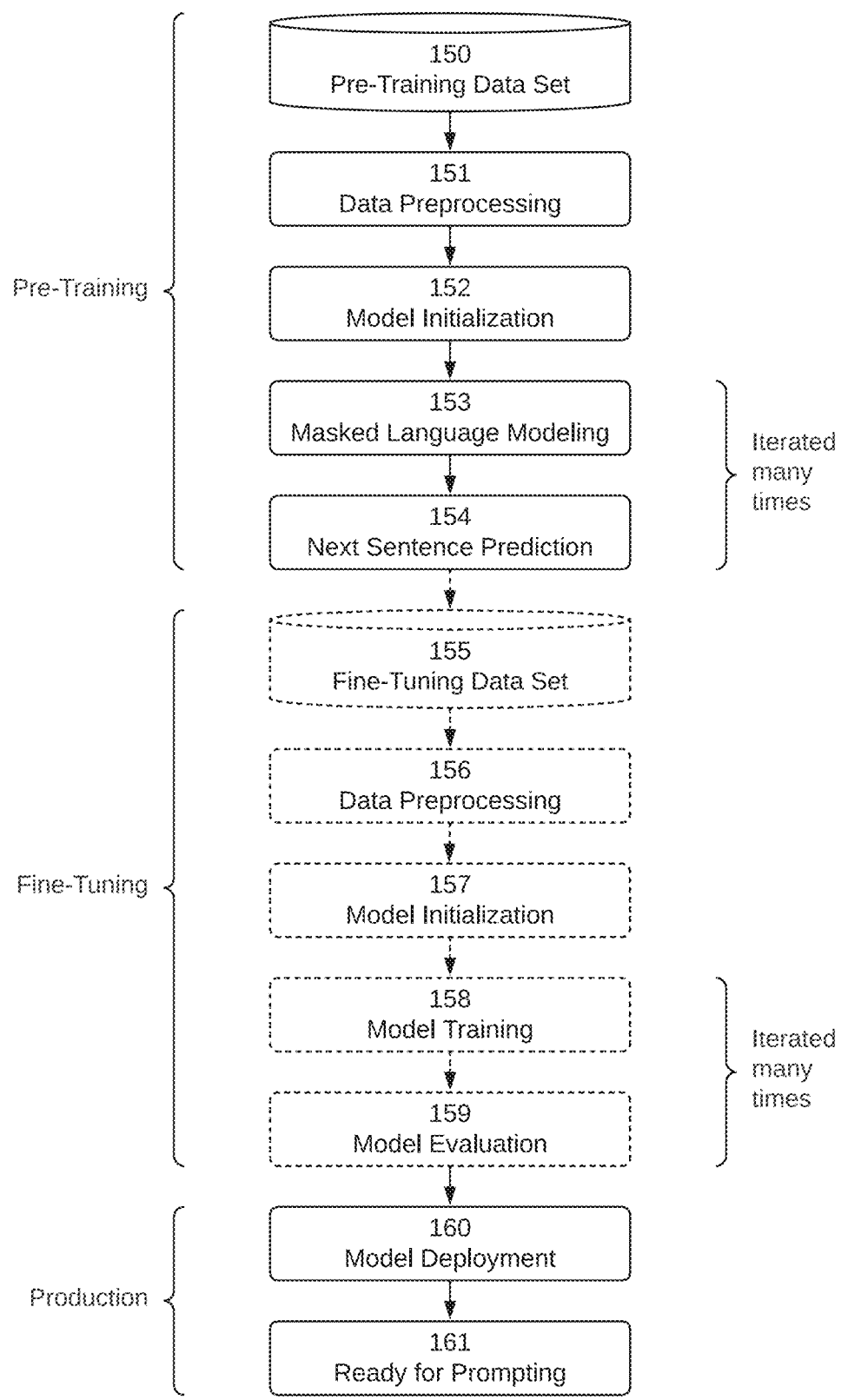
FIG. 4 is a diagram illustrating the exemplary non-limiting training of an artificial intelligence computer system.

FIG. 4 illustrates the training process for an exemplary artificial intelligence computer system. The elements labeled 150 to 154 are frequently referred to as "pre-training", while the elements labeled 155 to 159 are frequently referred to as "fine-tuning". The fine-tuning elements (155 to 159) are illustrated in dashed lines in this figure, as in some embodiments, the fine-tuning part of the process may be omitted, and the pre-trained model may be deployed directly and made ready for prompting. According to some embodiments, training an AI model may refer, without limitation, to pre-training or fine-tuning the AI model. Moreover, some of the distinctions between pre-training and fine-tuning may be terminological. Pre-training is often done once for a model (and the same pre-trained model is then used for a variety of different tasks or domains). Fine-tuning is often done separately for each task or domain, using the pre-trained model as a starting point.

The Pre-Training Data Set 150 is a massive corpus of unlabeled text data that often includes a broad range of Internet text. Typical subsets of the Pre-Training Data Set 150 include, without limitation: Wikipedia, a collection of millions of encyclopedia articles on different topics; Common Crawl, a collection of billions of web pages; and BooksCorpus, the full text of thousands of books in various genres and on various topics. Pre-training is the process of training the artificial intelligence model on the Pre-Training Data Set, including but not necessarily limited to learning general features and patterns of natural language. In Step 151, the Pre-Training Data Set 150 is preprocessed. The preprocessing can include tokenization, normalization, filtering, and shuffling. At this step, the data set may also be divided so that part of the data set is held for evaluation and testing instead of being used for training. In Step 152, the parameters of the artificial intelligence model are initialized, typically randomly and/or using the parameters from a previous version of the model. In Step 153, a masked language modeling (MLM) task is used to train the artificial intelligence model. In an MLM task, a portion of the tokens in a sequence are masked, and the model is trained to predict the masked tokens. The masked tokens are typically chosen randomly, but they can also be chosen based on their importance in the sequence. Training on the MLM task helps the model to learn the meaning of individual words and phrases, as well as the relationships between words and phrases. In Step 154, a next sentence prediction (NSP) task is used to train the artificial intelligence model. In an NSP task, the model is given two sequences of tokens, and it is trained to predict whether the second sequence follows the first sequence. The two sequences are typically chosen randomly, but they can also be chosen based on their relationship to each other. Training on the NSP task helps the model to learn the long-range dependencies between words and phrases.

When the artificial intelligence model is transformer based, Steps 153 and 154 both involve forward passes and backward passes through transformer models, such as depicted in FIG. 2. In forward passes, the preprocessed data resulting from Step 151 is fed into a transformer model. In each layer of the transformer model, the input data undergoes a series of operations involving the layer's parameters, including the self-attention mechanisms and the feed-forward networks. In backward passes, the transformer model calculates a loss which measures the accuracy of its predictions. This loss is then used to update the transformer model's parameters using a process called backpropagation. Frequently, the process of feeding the preprocessed data to the transformer model, generating predictions, calculating loss, and updating parameters is iterated many times, for both the MLM and NSP tasks, until the model converges. In other words, Steps 153 and 154 may be iterated many times.

The Fine-Tuning Data Set 155 is typically much smaller than the Pre-Training Data Set 150 and it is usually closely related to the specific task for which the artificial intelligence model is being fine-tuned. For example, if the model is being fine-tuned for web search, the Fine-Tuning Data Set 155 may include, without limitation, a sample of web search queries and results in different languages and from a variety of domains, used for demonstrating correct behavior and for demonstrating the ranking of different responses. If the model is being fine-tuned to accept queries and to return results as normal conversation in a chat session, the Fine-Tuning Data Set 155 may include, without limitation, a sample of user messages and responses in different languages and from a variety of contexts. Fine-tuning is the process of training the artificial intelligence model on the Fine-Tuning Data Set, including but not necessarily limited to learning to improve its performance on the specific tasks and to improve its conversational interactions.

In Step 156, the Fine-Tuning Data Set 155 is preprocessed. The preprocessing can include tokenization, normalization, filtering, and shuffling. Labels may also need to be added to the data, as fine-tuning is typically done using labeled data. At this step, the data set may also be divided so that part of the data set is held for evaluation and testing instead of being used for training. In Step 157, the fine-tuning parameters of the artificial intelligence model are initialized, typically with: the parameters of the pre-trained model; small random values; or some combination thereof. In Step 158, the artificial intelligence model is trained using the preprocessed data that was generated in Step 156. When the artificial intelligence model is transformer based, Step 158 involves forward passes and backward passes through transformer models, such as depicted in FIG. 2. The process of feeding the preprocessed data to the transformer model, generating predictions, calculating loss, and updating parameters is iterated many times until the model has converged. In Step 159, the artificial intelligence model is evaluated on labeled data for the specific task for which the model is being fine-tuned. Frequently, the evaluation is done on a part of the data that was held for evaluation at Step 157. The evaluation results are used to determine whether the artificial intelligence model is satisfactory or whether it needs to be trained for more iterations. Steps 158 and 159 may be iterated many times, until a satisfactory model is obtained. Finally, in Step 160, the artificial intelligence model is deployed in a production environment. It is now ready for prompting (Step 161).

Broadly speaking, there are two primary approaches to teaching new information—such as intervention information—to AI models: fine-tuning; and using contextual prompts. Fine-tuning has already been described in FIG. 4 and the associated text. Using contextual prompts means providing the AI model with additional information within the prompt itself. Each approach has its advantages and disadvantages. Fine-tuning can lead to more precise and reliable integration of the new information, but it requires substantial computational resources. Providing contextual information within prompts relies on the AI model's ability to interpret and utilize the provided context correctly (sometimes leading to less predictable results), but requires fewer resources, giving greater flexibility and allowing more frequent updates in the new information.

Either of these approaches can be applied in the current context of interventions in AI models. We shall first describe embodiments that utilize contextual prompts and then describe embodiments that utilize fine-tuning. But these are merely exemplary non-limiting embodiments. It would be apparent to someone skilled in the art how to construct similar embodiments using other approaches to teaching new information to AI models. Moreover, it is understood that one can obtain similar results by using embeddings as by using contextual prompts, so it would be apparent to someone skilled in the art how to modify the process of FIG. 5 to utilize embeddings.

Figure 5:
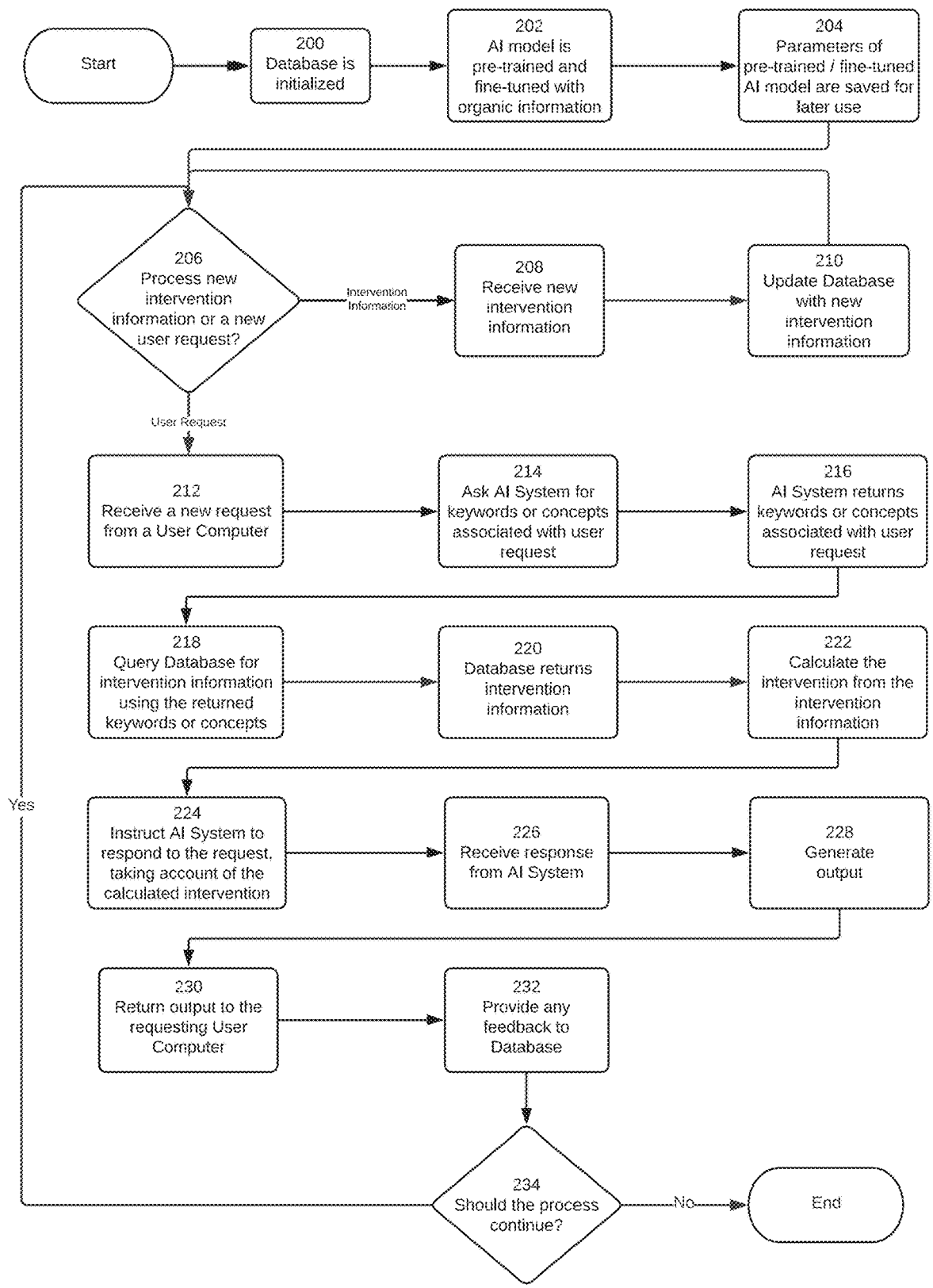
FIG. 5 is a flow diagram providing an overview of an entire process in accordance with an exemplary non-limiting embodiment.

Embodiments in which Intervention Information is Provided through Contextual Prompts FIG. 5 is a flow diagram providing an overview of an entire process in accordance with an exemplary non-limiting embodiment in which intervention information is provided to the AI model through contextual prompts. In other words, the system utilizes intervention information for prompting the AI model (i.e., narrowly targeted intervention information is provided to the AI System each time it is instructed to generate a response to an individual request). The process begins with Step 200, in which the Database is initialized. In many embodiments, the Intermediary initializes the Database with the most recent intervention information that has been collected. In some embodiments, the Intermediary initializes the Database with intervention information corresponding to a wide variety of "keywords" or "concepts". The initialization may further include other information pertaining to the keywords or concepts. Optionally, the Database may also be initialized with intervention weights indicating how much a given intervention should be weighted in determining responses to user requests involving these keywords or concepts. The process continues with Step 202, in which the AI model is pre-trained and fine-tuned with "organic" information (i.e., using the actual available data, without intervention). The process of pre-training and fine-tuning an AI model has already been described in FIG. 4 and the associated text. Next, the flow proceeds to Step 204, in which the parameters of the pre-trained/fine-tuned AI model are saved for later use. The process continues with Step 206, which is a command flow statement that junctions based on whether new intervention information or new user requests should be processed. If new intervention information should be processed, the flow proceeds to Step 208, where the Director computer system receives new intervention information from a Stakeholder computer. The intervention information may be associated with a given stakeholder. The intervention information may be numerical, it may be non-numerical structured text, it may be free text, or it may be any other form of data. If the intervention information is numerical, then without limitation the intervention information may be scalar numbers, it may be vectors of numbers, or it may be arrays of numbers. In some embodiments, the intervention information is associated with "keywords" or concepts". Then, in Step 210, the Director computer system updates the Database with the new intervention information, and the process returns to Step 206. If, instead, it was decided at Step 206 that new user requests should be processed, the flow proceeds to Step 212.

In Step 212, the Intermediary receives a new request from a User Computer. A request may be expressed as free text submitted by a user or it may be in a more structured form. A request may also take the form of a short combination of search terms, as has traditionally been used in Google searches. A request may also comprise, in full or in part, submission of a voice or other audio query. A request may also comprise, in full or in part, submission of a graphical image, picture, drawing, photograph, video image, or any other form of data. Three exemplary requests will be illustrated in the first boxes of FIGS. 9A, 10A and 11A, respectively. In Step 214, the Intermediary asks the AI System to determine one or more keywords or concepts associated with the user request (unless the request was already expressed in the form of one or more keywords or concepts, in which case this and the next step may be unnecessary). Then, in Step 216, the AI System determines one or more keywords or concepts associated with the user request and returns them to the Intermediary. Chan et al. (U.S. Pat. No. 11,409,812) teaches how to associate images with concepts. In some embodiments, the AI System also returns a relative importance weight associated with each keyword or concept, which measures how closely each keyword or concept relates to the user request: if keyword 1 has twice the relative importance weight of keyword 2, then the user request relates twice as closely to keyword 1 as to keyword 2. The flow proceeds to Step 218, in which the Intermediary queries the Database using the one or more keywords or concepts returned in Step 216. Then, in Step 220, the Database returns intervention information associated with these keywords or concepts. In many embodiments, if the Database includes multiple records with intervention information for the kth keyword and for the jth option, then the Database returns the record with the most recent intervention information. In some embodiments, at Step 218 the Intermediary queries the Database with a single keyword or concept, and at Step 220 the Database returns the intervention information for all options associated with that keyword or concept, or an aggregation of the intervention information for all options associated with that keyword or concept. In other embodiments, at Step 218 the Intermediary queries the Database with multiple keywords or concepts, and at Step 220 the Database returns a combination of the intervention information associated with these multiple keywords or concepts. Optionally, the Database may also return intervention weights indicating how much a given intervention should be weighted (as compared to the "organic information") in determining responses to user requests involving these keywords or concepts.

In Step 222, the Intermediary applies the intervention information received from the Database to calculate an intervention. In many embodiments, the calculated intervention is a specified function of the intervention information. One exemplary embodiment of Step 222 is illustrated in detail in FIG. 7. In Step 224, the Intermediary instructs the AI System to generate a response to the request, taking account of the intervention calculated in Step 222. Three exemplary requests (in which the interventions have been included) will be illustrated in the second boxes of FIGS. 9A, 10A and 11A, respectively. In many embodiments, the AI System may be instructed to apply a specified weight to the intervention. Optionally, the Database may have returned an intervention weight in Step 220; in this case, the intervention weight may be incorporated into the instructions of Step 224. Two exemplary embodiments of Step 224 are illustrated in detail in FIGS. 8A and 8B. In Step 226, the AI System generates a response as instructed, the AI System sends the generated response to the Intermediary, and the Intermediary receives the generated response. Exemplary responses associated with the exemplary requests of the second boxes of FIGS. 9A, 10A and 11A, respectively, will be illustrated in FIGS. 9C, 10C and 11C, respectively. In some embodiments, the AI System's generated "response" comprises not only a response intended to be forwarded to the requesting User Computer, but also additional information that may be utilized by the Intermediary without being forwarded to the requesting User Computer. Next, in Step 228, the Intermediary uses the response received from the AI System (and potentially additional data from the Database or other sources) to generate output that will be returned to the requesting User Computer. An exemplary embodiment of Step 228 is illustrated in detail in FIG. 12A. Note that Step 228 is optional and that, in some embodiments, the Intermediary uses the response received in Step 226 without modification as the output that will be returned to the requesting User Computer. Then, in Step 230, the Intermediary returns the output to the requesting User Computer.

In Step 232, feedback may be provided to the Database. Some exemplary embodiments of feedback arise when the Stakeholder computers' intervention information take the form of bids. In that event, Step 232 reports payments that are owed by one or more Stakeholders. As with current practice in sponsored search, the payments may be assessed on a pay-per-impression (PPI) basis, a pay-per-click (PPC) basis, a pay-per-purchase (PPP) basis, or some future basis that is more appropriate for artificial intelligence systems. Two exemplary non-limiting embodiments of the providing of feedback to the Database are illustrated in detail in FIGS. 16A and 16B. Finally, the flow proceeds to Step 234, which is a command flow statement that junctions based on whether the process should continue. If the process should continue, the flow returns to Step 206 (or, in embodiments in which there is no processing of new intervention information from Stakeholder Computers, the flow returns to Step 212). Otherwise, the process concludes here.

The flow illustrated in FIG. 5 and the network illustrated in FIGS. 1A and 1B are only exemplary. This and the next paragraph describe (without limitation) some possible variations. In some embodiments, a plurality of new intervention information and a plurality of new requests are processed simultaneously. In some other embodiments, there is no processing of new intervention information from Stakeholder computers; in this event, Steps 206, 208 and 210 are deleted from the flow diagram and the process advances directly from Step 204 to Step 212. In some other embodiments, the functionality of the Intermediary computer system and the Director computer system are combined into a single computer system. In some other embodiments, there may be multiple instances of some of the various components, such as the Intermediary computer system, the Director computer system, the AI System, or the Database. In some other embodiments, a different AI System is used at Steps 214-216 (to determine keywords or concepts associated with a user request) and at Steps 224-226 (to obtain a response to the request, taking account of the calculated intervention). Furthermore, in some other embodiments, Steps 214-216 may use a conventional computer system without artificial intelligence (for speed and economy), while Steps 224-226 may use the best available artificial intelligence system.

Alternatively, the process could operate in similar fashion to Retrieval-Augmented Generation (RAG). A description of RAG can be found in Lewis et al. (2020). The system could use a vector search function to retrieve the most related information from the intervention information database. The system could then include this information directly in the prompt that is sent to the AI model. It would be apparent to someone skilled in the art how to implement the variations described in the previous and current paragraphs—and how to implement other variations on the process of FIG. 5.

Many aspects of the present disclosure have highlighted embodiments relating to interventions in AI models that perform a "search engine" function. However, it should be emphasized that almost identical considerations apply to AI models that perform a "recommender system" (or "recommendation system") function. Thus, it would be apparent to someone skilled in the art how to modify the process of FIG. 5 to describe interventions in AI models that perform a recommender system (or recommendation system) function. For example, while Step 212 for some recommender systems might comprise a user request for a recommendation, it seems more likely on a shopping or e-commerce website that the request for a recommendation for a user would actually be initiated by the shopping or e-commerce website—whether the consumer (user) actually wants a recommendation or not. Thus, Step 212 (and FIG. 5) would be modified in inessential ways for a recommender system.

Embodiments in which Intervention Information is Provided Through Fine-Tuning

Figure 6:
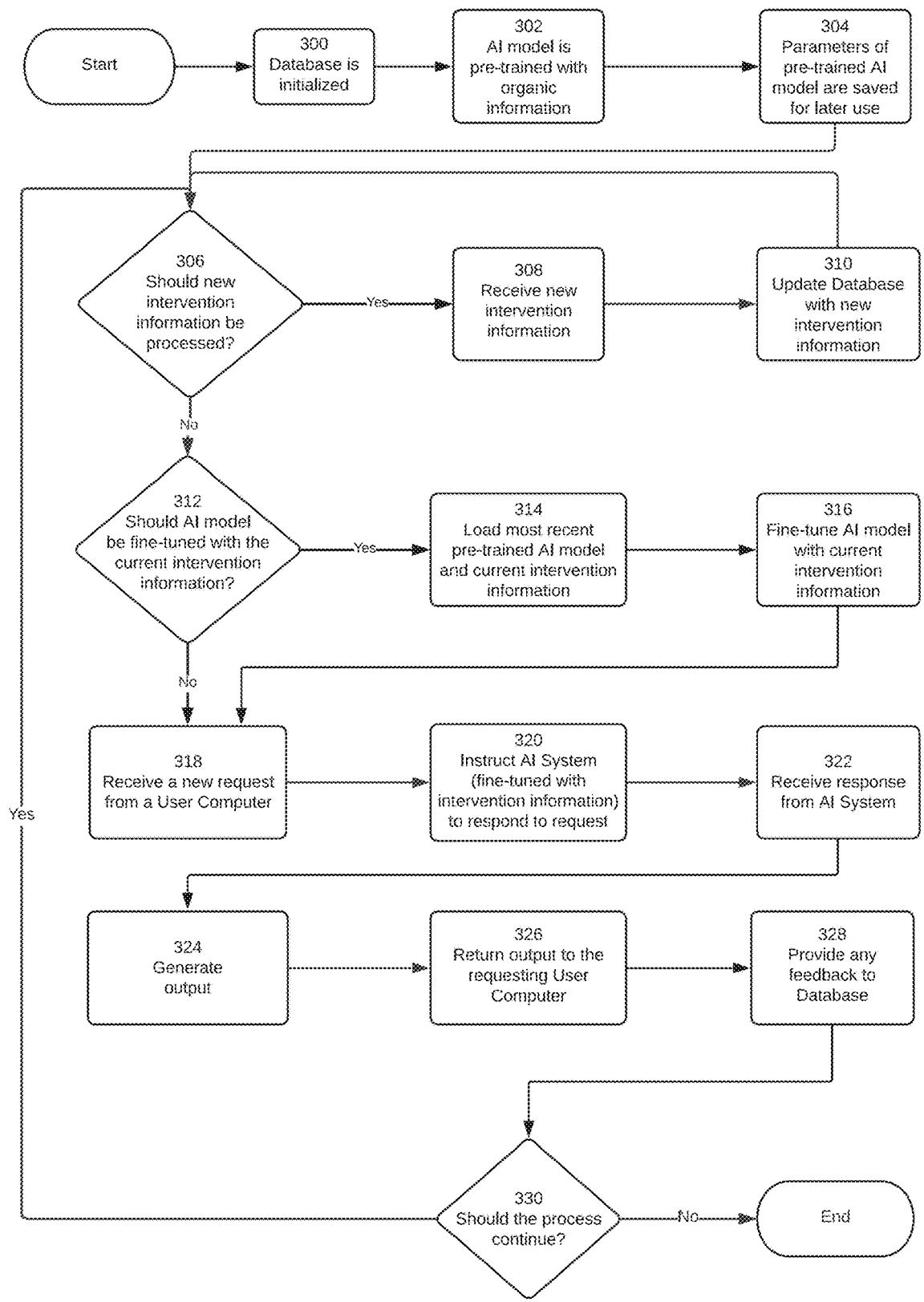
FIG. 6 is a flow diagram providing an overview of an entire process in accordance with an exemplary non-limiting embodiment.

FIG. 6 is a flow diagram providing an overview of an entire process in accordance with an exemplary non-limiting embodiment in which intervention information is provided to the AI model through fine-tuning. In other words, the intervention information is utilized in bulk for training the AI model (i.e., a large corpus of intervention information is provided to the AI System before it is instructed to generate responses to individual requests). The process begins with Step 300, in which the Database is initialized. In many embodiments, the Intermediary initializes the Database with the most recent intervention information that has been collected. In some embodiments, the Intermediary initializes the Database with intervention information corresponding to a wide variety of "keywords" or "concepts". The initialization may further include other information pertaining to the keywords or concepts. Optionally, the Database may also be initialized with intervention weights indicating how much a given intervention should be weighted in determining responses to user requests involving these keywords or concepts. The process continues with Step 302, in which the AI model is pre-trained with "organic" information (i.e., using the actual available data, without intervention). The process of pre-training an AI model was described in the first part of FIG. 4. Next, the flow proceeds to Step 304, in which the parameters of the pre-trained AI model are saved for later use. The process continues with Step 306, which is a command flow statement that junctions based on whether or not new intervention information should be processed. If new intervention information should be processed, the flow proceeds to Step 308, where the Director computer system receives new intervention information from a Stakeholder computer. The intervention information may be associated with a given stakeholder. The intervention information may be numerical, it may be non-numerical structured text, it may be free text, or it may be any other form of data. If the intervention information is numerical, then without limitation the intervention information may be scalar numbers, it may be vectors of numbers, or it may be arrays of numbers. In some embodiments, the intervention information is associated with "keywords" or concepts". Then, in Step 310, the Director computer system updates the Database with the new intervention information, and the process returns to Step 304. If, instead, it was decided at Step 306 that new intervention information should not be processed, the flow proceeds directly to Step 312.

Step 312 is a command flow statement that junctions based on whether or not the AI model should be [ ] fine-tuned with the current intervention information. If the AI model should be [ ] fine-tuned with the current intervention information, the flow proceeds to Step 314, where the Director computer system loads both the parameters of the pre-trained AI model and the current intervention information. Recall that the parameters of the pre-trained AI model were saved for later use at Step 304. Also recall that the Database was initialized at Step 300 and that it was updated with new intervention information each time that Step 310 was reached. Then, in Step 316, the AI model is fine-tuned with the current intervention information. The process of fine-tuning an AI model was described in the second part of FIG. 4. In some embodiments, the AI model is instructed at Step 316 to apply a specified weight to the intervention information (as compared to the "organic" information). After the AI model is fine-tuned with intervention information, the flow proceeds to Step 318. If, instead, it was decided at Step 312 that the AI model should not be updated with the current intervention information, the flow proceeds directly to Step 318.

In Step 318, the Intermediary receives a new request from a User Computer. A request may be expressed as free text submitted by a user or it may be in a more structured form. A request may also take the form of a short combination of search terms, as has traditionally been used in Google searches. A request may also comprise, in full or in part, submission of a voice or other audio query. A request may also comprise, in full or in part, submission of a graphical image, picture, drawing, photograph, video image, or any other form of data. Three exemplary requests will be illustrated in the first boxes of FIGS. 9A, 10A and 11A, respectively. In Step 320, the Intermediary instructs the AI System to utilize the AI model (which has been fine-tuned with intervention information) to generate a response to the request. Note that it is unnecessary to include the interventions that are illustrated in white text with black background in the second boxes of FIGS. 9A, 10A and 11A, respectively, in the instructions of Step 320, as the AI System has already been fine-tuned with the relevant intervention information. In Step 322, the AI System generates a response as instructed, the AI System sends the generated response to the Intermediary, and the Intermediary receives the generated response. Exemplary responses associated with the exemplary requests of the first boxes of FIGS. 9A, 10A and 11A, respectively, will be illustrated in FIGS. 9C, 10C and 11C, respectively. In some embodiments, the AI System's generated "response" comprises not only a response intended to be forwarded to the requesting User Computer, but also additional information that may be utilized by the Intermediary without being forwarded to the requesting User Computer. Next, in Step 324, the Intermediary uses the response received from the AI System (and potentially additional data from the Database or other sources) to generate output that will be returned to the requesting User Computer. An exemplary embodiment of Step 324 is illustrated in detail in FIG. 12B. Note that Step 324 is optional and that, in some embodiments, the Intermediary uses the response received in Step 322 without modification as the output that will be returned to the requesting User Computer. Then, in Step 326, the Intermediary returns the output to the requesting User Computer.

In Step 328, feedback may be provided to the Database. Some exemplary embodiments of feedback arise when the Stakeholder computers' intervention information take the form of bids. In that event, Step 328 reports payments that are owed by one or more Stakeholders. As with current practice in sponsored search, the payments may be assessed on a pay-per-impression (PPI) basis, a pay-per-click (PPC) basis, a pay-per-purchase (PPP) basis, or some future basis that is more appropriate for artificial intelligence systems. Two exemplary non-limiting embodiments of the providing of feedback to the Database are illustrated in detail in FIGS. 16A and 16B. Finally, the flow proceeds to Step 330, which is a command flow statement that junctions based on whether the process should continue. If the process should continue, the flow returns to Step 306. Otherwise, the process concludes here.

The flow illustrated in FIG. 6 and the network illustrated in FIGS. 1A and 1B are only exemplary. This paragraph describes (without limitation) some possible variations. In some embodiments, the updating of the Database with new intervention information, the fine-tuning of the AI system with current intervention information, and the processing of new user requests may occur simultaneously. In some other embodiments, one or more of the steps may be deleted from the flow diagram, or one or more additional steps may be added. In some other embodiments, the functionality performed by a single computer system is instead dispersed over multiple computer systems, or the functionality performed by multiple computer systems is instead concentrated within a single computer system. It would be apparent to someone skilled in the art how to implement these and other variations on the process of FIG. 6.

Figure 7:
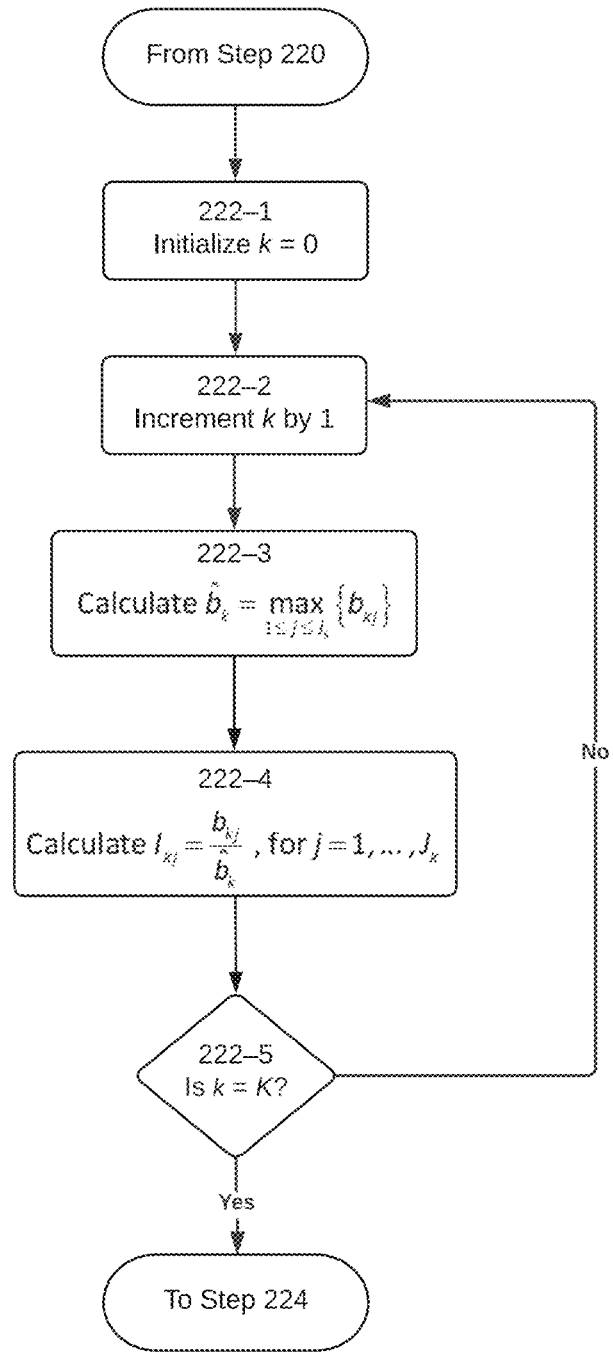
FIG. 7 is a flow diagram illustrating, in greater detail, an element of the flow diagram of FIG. 5.

In describing FIG. 7, we shall assume that, in Step 216, the AI System had returned $K \geq 1$ keywords or concepts associated with the user request (denoted by $k=1, \ldots, K$), and that in Step 218, the Intermediary had queried the Database for each of these $K \geq 1$ keywords or concepts. It is also assumed that in Step 220, the Database had returned intervention information in the form of scalar, positive numbers for each of $J_k \geq 1$ options associated with the kth keyword or concept. The intervention information associated with the kth keyword or concept and with the jth option for that keyword or concept is denoted by $b_{kj} > 0$. It is further assumed that in Step 216, the Database had returned relative importance weights for each of the $K \geq 1$ keywords or concepts and that, in Step 220, the Database had returned intervention weights for each of the K≥1 keywords or concepts. The relative importance weight associated with the kth keyword is denoted by $r_k$ and the intervention weight associated with the kth keyword or concept is denoted by $w_k$; both $r_k$ and $w_k$ are assumed to be scalar, positive numbers.

FIG. 7 details Step 222, the calculation of an intervention by the Intermediary using numerical intervention information returned by the Database, in an exemplary non-limiting embodiment. The process enters Step 222-1 from Step 220. In Step 222-1, the Intermediary initializes k=0 and the process enters a loop in k. Next, in Step 222-2, the Intermediary increments k by one. The process continues with Step 222-3, in which the Intermediary calculates $b_k$=max $\{b_{kj}\}$ for $1 \leq j \leq J_k$ where $b_{kj}$ denotes the intervention information associated with the kth keyword or concept and with the jth option for that keyword or concept. Then, in Step 222-4, the Intermediary calculates $I_{kj}=b_{kj}/b_k$, for j=1, ... $J_k$, where $I_{kj}$ denotes the intervention associated with the kth keyword or concept and with the jth option for that keyword or concept. Thus, the intervention is normalized to 1 for the option with the largest intervention information associated with the kth keyword or concept, and the intervention for any other option associated with the kth keyword or concept is the ratio between its intervention information and the largest intervention information. For options associated with the kth keyword or concept such that the Database did not return any intervention information, the intervention is treated as zero. (In other embodiments, the calculated interventions may be other functions of the intervention information. The particular function used in FIG. 7 has the useful property that it takes intervention information that can be any positive number and converts it into an intervention that is between 0 and 1.) Then the flow proceeds to Step 222-5, in which the Intermediary checks whether k=K. If not, the process remains in the loop and returns to Step 222-2. If k=K, the process exits the loop and proceeds to Step 224.

Figure 8A:
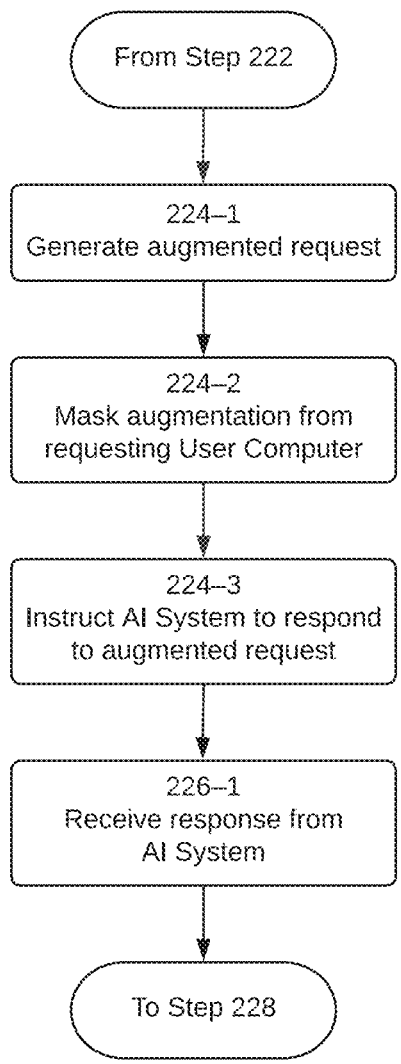
FIGS. 8A and 8B are flow diagrams illustrating, in greater detail, elements of the flow diagram of FIG. 5.

FIG. 8A details Steps 224 and 226 of FIG. 5 in accordance with an exemplary non-limiting embodiment. (This figure also details Steps 426 and 428 of FIG. 14 in accordance with an exemplary non-limiting embodiment, but any differences in its application to Steps 426 and 428 would be relatively minor and would be apparent to someone skilled in the art and therefore will be omitted for the sake of brevity.) For purposes of FIG. 8A and elsewhere in this Specification, we define an augmented request to be the result of combining or concatenating data embodying the original user request and data embodying an intervention, and we define an augmentation to be the data that is combined or concatenated with the original user request. Optionally, the augmentation and augmented request may also incorporate an intervention weight or other additional data. To obtain an augmented request, the original user request may be expressed as text, as numbers, or as any other form of data, and the intervention may be expressed as text, as numbers, or as any other form of data. Observe that, if an AI model that is pre-trained and fine-tuned exclusively with "organic" information (i.e., using the actual available data, without intervention) is prompted with an augmented request, this will often be sufficient to generate a response that takes account of the calculated intervention.

The process enters Step 224-1 from Step 222. In Step 224-1, the Intermediary generates an augmented request by combining or concatenating text or other data embodying the user request received at Step 212 with text or other data embodying the intervention calculated at Step 222. Optionally, the Database may have returned an intervention weight in Step 220; in this case, the intervention weight may also be incorporated into the augmented request. The process continues with Step 224-2, in which the Intermediary masks the augmentation of the user request from the User Computer. Exemplary results of Step 224-2 are depicted in the second boxes of each of FIGS. 9A, 10A and 11A; in the referenced boxes, the user request is depicted in black type on a white background, while the augmentation is depicted in white type on a black background. Of course, this depiction is provided here only for expositional purposes; in this embodiment, the augmentation would not be visible to the User Computer at all. In the second box of FIG. 9A, an intervention weight of 40% is incorporated, in the second box of FIG. 10A, an intervention weight of one-third is incorporated, and in the second box of FIG. 11A, an intervention weight of one-half is incorporated. Also observe that the combination or concatenation need not merely be the request followed by the intervention; as depicted in the second boxes of each of FIGS. 9A, 10A and 11A, the intervention may be interspersed at multiple locations throughout the user request. Next, in Step 224-3, the Intermediary instructs the AI System to determine a response to the augmented request. After Step 224-3, the process proceeds to Step 226-1, in which the Intermediary receives a response from the AI System. After the Intermediary receives a response, the flow continues to Step 228, in which the Intermediary generates output to be returned to the requesting User Computer. Step 228 will be illustrated in greater detail in FIG. 12A, but it should be noted that when Step 228 follows FIG. 8A, many of the embodiments would have the Intermediary, in the course of generating the output, deleting any reference to the intervention. If a copy or summary of the request is included as part of the output, the generation of the output includes deleting the augmentation.

Figure 8B:
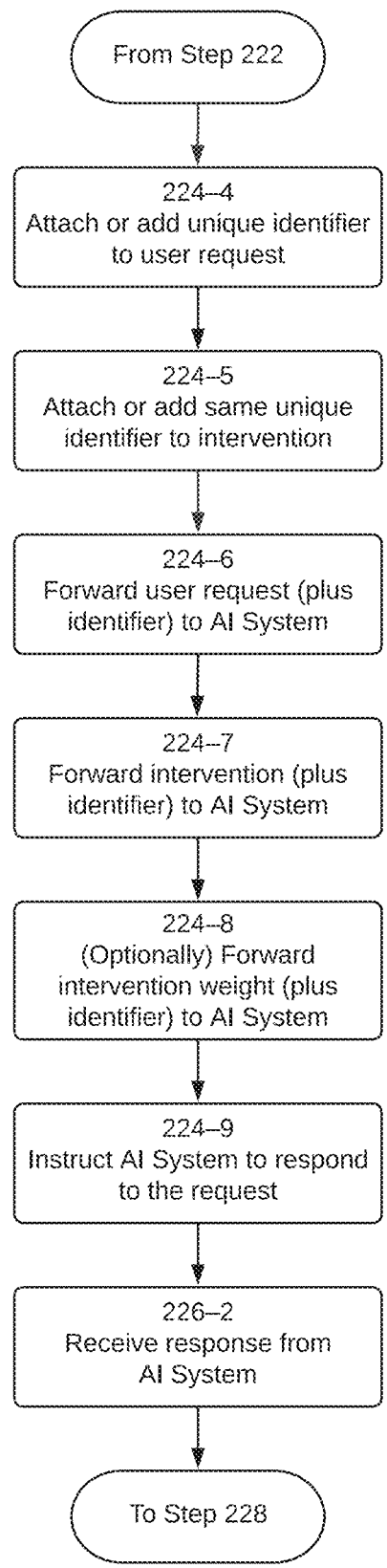

It is not necessary for data embodying the original user request and data embodying an intervention to literally be combined or concatenated. FIG. 8B details Steps 224 and 226 of FIG. 5 in accordance with another exemplary non-limiting embodiment, in which data embodying the original user request and data embodying an intervention are not literally combined or concatenated, but the process has the same overall effect. (This figure also details Steps 426 and 428 of FIG. 14 in accordance with another exemplary non-limiting embodiment, but any differences in its application to Steps 426 and 428 would be relatively minor and would be apparent to someone skilled in the art and therefore will be omitted for the sake of brevity.) The process enters Step 224-4 from Step 222. In Step 224-4, the Intermediary attaches or adds a unique identifier to the text or other data embodying the user request received at Step 212. Next, in Step 224-5, the Intermediary attaches or adds the same unique identifier to the text or other data embodying the intervention calculated at Step 222. Optionally, the Database may have returned an intervention weight in Step 220; in this case, the Intermediary also attaches or adds the same unique identifier to the intervention weight. The process continues with Step 224-6, in which the Intermediary forwards the user request (plus identifier) to the AI System. Next, in Step 224-7, the Intermediary forwards the intervention (plus identifier) to the AI System. After this, in optional Step 224-8, the Intermediary forwards the intervention weight (plus identifier) to the AI System. The second boxes of each of FIGS. 9A, 10A and 11A could still summarize the substance of exemplary information forwarded to the AI System in Steps 224-6, 224-7, and 224-8, but unlike Step 224-1 of FIG. 8A, the request and the intervention (and, optionally, the intervention weight) are never combined and they are transmitted separately to the AI System. As in Step

224-2, the system is programmed to assure that the intervention is masked from the User Computer. After Step 224-8, the process proceeds to Step 224-9, in which the Intermediary instructs the AI System to determine a response based on all of the inputs linked to the given unique identifier. Next, in Step 226-2, the Intermediary receives a response from the AI System. After Step 226-2, the process proceeds to Step 228, in which the Intermediary generates output to be returned to the requesting User System. Step 228 will be illustrated in greater detail in FIG. 12A, but it should be noted that when Step 228 follows FIG. 8B, many embodiments would have the Intermediary deleting any reference to the intervention as part of the process of generating the output.

FIG. 9A depicts an exemplary request without an intervention (first box) and the same exemplary request with an intervention (second box). The exemplary request submitted by a user is: "Mr. and Mrs. Jones, a conservative couple in their 50s, without children, are planning to spend 24 hours in Annapolis, Maryland. Can you write one page of text, recommending how Mr. and Mrs. Jones should spend 24 hours in Annapolis, Maryland? The text should include recommendations on things to do, places to eat, and places to stay." The exemplary intervention calculated at Step 222 is given in Table 1, below:

TABLE 1

Interventions in FIG. 9A

| Option | Rating |
|---|---|
| The William Paca House and Garden | 9 |
| The Rodeway Inn | 9 |
| Pine Tree Associates Nudist Club | 10 |
| Chuck E. Cheese's | 10 |
| Dry 85 | 10 |
| All other sites, hotels and restaurants | 7 |

Notice that a base rating of 7 is provided for all other sites, hotel and restaurants, so that the provided ratings supplied for options has some comparison. The exemplary intervention weight is 40%, for sites, hotels and restaurants. With this exemplary data, an embodiment following FIG. 8A would generate the augmented request as depicted in the second box of FIG. 9A. This exemplary augmentation of the request is an elegant way to utilize the same free text input format that the system uses to process requests without intervention: "Suppose that I told you that I also received restaurant and hotel ratings from an independent third-party reviewer. I would like you to base your recommendations 40% on the independent third-party reviewer and 60% on your own information." Observe that the exemplary augmentation incorporates the intervention weight of 40%. Also observe the concluding sentence of the augmentation, which assures that the augmentation is masked from the user in the response: "The text should not mention that my third-party reviewer's ratings were an input into the recommendations, but it should take the third-party reviewer's ratings into account."

FIG. 9B depicts an exemplary response without an intervention and FIG. 9C depicts an exemplary response with an intervention. These are actual responses generated by ChatGPT 4.0 from the exemplary requests of FIG. 9A. Since the AI system is instructed to weight both the "independent third-party reviewer" ratings and its own (trained and tuned) information, the intervention is adopted for some options but not for others. For example, checking into the Historic Inns of Annapolis (in the response without intervention, in FIG. 9B) is supplanted by the Rodeway Inn (in the response with intervention, in FIG. 9C), lunching at Carrol's Creek Cafe (in the response without intervention) is supplanted by Dry 85 (in the response with intervention), and visiting Hammond-Harwood House (in the response without intervention) is supplanted by the William Paca House and Garden (in the response with intervention). However, the AI System recognizes that Mr. and Mrs. Jones are without children and so it does not send them to Chuck E. Cheese's; and it recognizes that Mr. and Mrs. Jones are a conservative couple and so it does not recommend Pine Tree Associates Nudist Club (or perhaps the weather is too cold).

FIG. 10A depicts a second exemplary request without an intervention (first box) and the same exemplary request with an intervention (second box). The exemplary request submitted by a user is: "Suppose that Taylor, a high school junior from Washington DC, has 720 verbal and 640 math SAT scores. Taylor is interested in studying International Relations. Taylor wants her college to be located within 500 miles from home, Taylor is an atheist, Taylor does not want to attend a college with a strong Greek (fraternity) culture, and Taylor needs to receive substantial financial aid. Can you write one page of text, recommending five colleges for Taylor to consider applying to? Please do not mention in your text anything about atheism, but please do take it into account in making your recommendations." The exemplary intervention calculated at Step 222 is given in Table 2, below:

TABLE 2

Interventions in FIG. 10A

| Option | Rating |
|---|---|
| Old Dominion University | 9 |
| Liberty University | 8 |
| University of Virginia | 7 |
| All other colleges | 5 |

Notice that a base rating of 5 is provided for all other colleges, so that the provided ratings supplied for options has some comparison. The exemplary intervention weight is one-third. With this exemplary data, an embodiment following FIG. 8A would generate the augmented request as depicted in the second box of FIG. 10A. This exemplary augmentation of the request is an elegant way to utilize the same free text input format that the system uses to process requests without intervention: "Suppose that I also told you that I received college ratings from an independent third-party reviewer. I would like you to base your recommendations one-third on the independent third-party reviewer and two-thirds on your own information." Observe that the exemplary augmentation incorporates the intervention weight of one-third. Also observe the concluding sentence of the augmentation, which assures that the augmentation is masked from the user in the response: "Also, the text should not mention the existence of the third-party reviewer or its ratings, but it should take the third-party reviewer's ratings into account."

FIG. 10B depicts an exemplary response without an intervention and FIG. 10C depicts an exemplary response with an intervention. These are actual responses generated by ChatGPT 4.0 from the exemplary requests of FIG. 10A. Since the AI system is instructed to weight both the "independent third-party reviewer" ratings and its own (trained and tuned) information, the intervention is adopted for some options but not for others. For example, Old Dominion University moves onto the list at #1, and University of Virginia moves onto the list at #2. However, the AI System recognizes that Taylor is an atheist, so it does not recommend that she apply to Liberty University, a self-described "distinctively Christian academic community".

Embodiments in which the Intervention Information May Represent Offered Payments In several embodiments in which the intervention information includes submissions from stakeholder users, the submissions may be numerical and the submitted numbers may represent offered payments. In such embodiments, stakeholders' submissions on behalf of options—in examples, "options" may include, without limitation, sites, hotels, restaurants and colleges—may be interpretable as bids. The submission of new intervention information in Step 208, the updating of the Database in Step 210, and the processing of intervention information applicable to user requests in Steps 218 to 222 may then be interpretable as an auction. Such embodiments would then in some respects be reminiscent of current sponsored search auctions. However, as already emphasized above, the output of such embodiments would not be limited to being an ordered list of internet hyperlinks; instead, the output could be anything.

In such a context, the reinterpretation of the inventive system as an auction system can easily be seen via some of our previous examples. For example, in the context of FIGS. 9A-9C and Table 1, our previous interpretation was that the intervention information was derived from the opinion of an independent third-party reviewer or the composite rating of an expert panel. An alternative interpretation is that owners of the options in Table 1 submitted bids. For example, Table 1 may have been derived from the bids listed in Table 3, below:

TABLE 3

Reinterpretation of First Exemplary Request as bids

| Option | Bid |
|---|---|
| The William Paca House and Garden | $ 8 |
| The Rodeway Inn | $ 8 |
| Pine Tree Associates Nudist Club | $12 |
| Chuck E. Cheese's | $12 |
| Dry 85 | $12 |
| All other sites, hotels and restaurants | $ 0 |

Since the AI System is being instructed that the rating scale is from 1 to 10, and that all other sites, hotels and restaurants received ratings of 7, the intervention could be computed from the bids by $$I_{kj} = 7 + \frac{b_{kj}}{k}(10 - 7).$$

Using this formula in Step 222-4, but otherwise literally following the process detailed in FIG. 7, would replicate Table 1 as the intervention resulting from the bids in Table 3. The AI System could then be instructed in exactly the same way as before; telling the AI System to treat the resulting intervention as an independent third-party reviewer's ratings, which are assigned a specified weight, is a precise way of telling the AI System how to apply the bids.

Similarly, in the context of FIGS. 10A-10C and Table 2, our previous interpretation was that the intervention information was derived from the opinion of an independent third-party reviewer or the composite rating of an expert panel. An alternative interpretation is that the colleges of Table 2 submitted bids. For example, Table 2 may have been derived from the bids listed in Table 4, below:

TABLE 4

Reinterpretation of Second Exemplary Request as bids

| Option | Bid |
|---|---|
| Old Dominion University | $400 |
| Liberty University | $300 |
| University of Virginia | $200 |
| All other colleges | $ 0 |

Here, since the AI System is being shown a highest rating of 9 and is told that the other colleges received ratings of 5, the intervention could be computed from the bids by $$I_{kj} = 5 + \frac{b_{kj}}{k}(9 - 5).$$

Using this formula in Step 222-4, but otherwise literally following the process detailed in FIG. 7, would replicate Table 2 as the intervention resulting from the bids in Table 4. The AI System could then be instructed in exactly the same way as before; telling the AI System to treat the resulting intervention as an independent third-party reviewer's ratings, which are assigned a specified weight, is a precise way of telling the AI System how to apply the bids.

In such embodiments, the feedback of Step 232 is the computation of payments that are owed by the Stakeholders. As with current practice in sponsored search, the payments may be assessed on a pay-per-impression (PPI) basis, a pay-per-click (PPC) basis, a pay-per-purchase (PPP) basis, or some future basis that is more appropriate for artificial-intelligence-based systems. Two exemplary non-limiting embodiments of the providing of feedback to the Database will be illustrated in detail in FIGS. 16A and 16B.

Embodiments in which the AI System Directly Applies Bids

In the previous several embodiments, the way in which bids were applied as intervention information may have seemed overly indirect, in that bids submitted by stakeholders were first restated as synthetic third-party ratings and only then applied as intervention information. We shall now see that, with a suitably "intelligent" AI system, bids can also be applied directly.

FIG. 11A depicts an exemplary request without an intervention (first box) and the same exemplary request with an intervention (second box). The exemplary request submitted by a user is: "Jane and John Doe are planning a trip to Alaska in July. On Day 1, they will be arriving at Fairbanks Airport at around 9 pm. On Day 6, they will be boarding a cruise in Seward at around 6 pm. Their days in between are open. Can you recommend an interesting itinerary for them? Please include three suggestions as to hotels where they should stay at each stop. Please also include the number of miles and the estimated driving time each day." Meanwhile, the exemplary intervention of FIG. 11A is summarized in Table 5, below:

TABLE 5

Interventions in FIG. 11A

| Hotel | Bid |
|---|---|
| Denali Crow's Nest Cabins | $ 9 |
| Denali Rainbow Village RV Park and Motel | $ 8 |
| Denali Princess Wilderness Lodge | $ 4 |
| Grande Denali Lodge | $ 2 |
| Hotel Edgewater | $10 |
| Van Gilder Hotel | $ 5 |
| All other hotels | $ 0 |

Notice that a bid of $0 is assumed for all other hotels. The exemplary intervention weight is one-half. With this exemplary data, an embodiment following FIG. 8A would generate the augmentation depicted in the second box of FIG. 11A: "Suppose that I told you that the trip-planning expenses of the couple are going to be defrayed by bids by Alaskan hotels. In Denali, we have received the following bids: Denali Crow's Nest Cabins—$9; Denali Rainbow Village RV Park and Motel—$8; Denali Princess Wilderness Lodge—$4; and Grande Denali Lodge—$2. In Seward, we have received the following bids: Hotel Edgewater—$10; and Van Gilder Hotel—$5. If a hotel is not listed with a bid, you can assume their bid was $0. Taking both the bids and the intrinsic quality of the hotels equally into account . . . ." Observe that this exemplary augmentation incorporates the intervention weight of one-half implied by "taking both the bids and the intrinsic quality of the hotels equally into account". Also observe the concluding sentence of the augmentation, which assures that the augmentation is masked from the user in the response: "The text that you provide should not mention that the hotels' bids were an input into the recommended itinerary and it should not mention the bid amounts, but your recommendation should take the bids into account in the way that I have instructed you."

FIG. 11B depicts an exemplary response without an intervention and FIG. 11C depicts an exemplary response with an intervention. These are actual responses generated by ChatGPT 4.0 from the exemplary requests of FIG. 11A. Remarkably, when bid values are inserted directly into the prompt, as in the second box of FIG. 11A, ChatGPT 4.0 is able to interpret the values as bids without any special training as to the meaning of bids. Since the AI system is instructed to take the bids and intrinsic quality equally into account, the intervention is adopted for some options but not for others. For example, the recommendations of the Denali Bluffs Hotel and the Mckinley Chalet Resort (in the response without intervention, in FIG. 11B) are supplanted by the $9 bid of the Denali Crow's Nest Cabins and by the $5 bid of the Denali Princess Wilderness Lodge (in the response with intervention, in FIG. 11C). However, the $8 bid by the Denali Rainbow Village RV Park and Motel is insufficient to supplant the Grande Denali Lodge, which bid just $2, but whose intrinsic quality is apparently believed by the AI System to be quite high. Interestingly, the bids by the hotels in Denali and the lack of bids by the hotels in Talkeetna also have the effect of shifting the recommended itinerary from one night in Denali and one night in Talkeetna (in the response without intervention, in FIG. 11B) to two nights in Denali and zero nights in Talkeetna (in the response with intervention, in FIG. 11C).

Output Returned to Requesting User Systems

In traditional sponsored internet search in the art, the typical output that is returned to users is an ordered list of "organic" clickable links, often preceded by (or intermixed with) an ordered list of "sponsored" clickable links. However, as has been emphasized throughout this Specification, it seems most natural (and, presumably, most effective) for the computer system to present the "sponsored" materials in the same format as the "organic" materials. The emerging artificial intelligence systems are not limited to producing ordered lists of links; more usefully, they can generate paragraphs of unordered free-form prose, visual imagery, or other novel data outputs. Consequently, one conjectures that any "sponsored" material should also be presented within paragraphs of unordered free-form prose, visual imagery, or other novel data outputs. If the "sponsored" materials are presented merely as display advertisements adorning a page of free-form prose, they are likely to be as ineffective a tool as display advertisements currently used in internet publishing (which appear to be a much lower-valued advertising tool than internet search advertisements). And if the "sponsored" materials are presented merely as an ordered list of links preceding the response generated by artificial intelligence, they risk being completely skipped over by users who would go immediately to the more useful paragraphs of unordered free-form prose, visual imagery, or other novel data outputs.

The question arises how the search provider can resolve two apparently conflicting requirements:

The "sponsored" materials need to be placed within the paragraphs of unordered free-form prose, visual imagery, or other novel data outputs; and Providers need to place the "sponsored" materials within the paragraphs of unordered free-form prose, visual imagery, or other novel data outputs, in order to be effective advertising; but Providers are obliged to disclose to users when materials appear in the search results due to the receipt of payments or other forms of influence.

A novel way to satisfy these conflicting requirements is to include links both to organic options and to sponsored options, but to systematically mark them differently. For example (without limitation), within paragraphs of unordered free-form prose, any of the following marking schemes may be used singly or in combination:

Organic links may be displayed in blue, while sponsored links may be displayed in red;

Organic links may be displayed in bold, while sponsored links may be displayed in bold italics;

Organic links may be underlined once, while sponsored links may be underlined twice;

Hovering over an organic link may display both the url (web address) and a hand (or text—or the absence of warning text), while hovering over a sponsored link may display both the url and a dollar sign or other currency symbol (or warning text).

Analogous marking schemes can be used within visual imagery or other novel data outputs.

FIG. 12A details Step 228, the generating of output by the Intermediary, in an exemplary non-limiting embodiment. This embodiment assumes that every "option" provided in the response can be associated with a hyperlink. For example, in FIG. 9C, the phrases "Rodeway Inn", "William Paca House and Garden", and "Dry 85" would each be associated with a hyperlink. The process enters Step 228-1 from Step 226. In Step 228-1, the Intermediary copies the response received from the AI System in Step 226 into a new web page and marks every option with the appropriate "organic" hyperlink. Following the marking scheme described above, each of these hyperlinks would be displayed in a blue font, in bold typeface, and underlined once—and if the user hovers over the hyperlink, it displays both the url (web address) and a hand. The process then examines one hyperlink at a time when it goes to Step 228-2, in which it considers the first "organic" hyperlink on the web page that has not previously been considered. The process continues with Step 228-3, which is a command flow statement that junctions based on whether or not an intervention was made in Step 224 on behalf of the option associated with the hyperlink being considered. If such an intervention was made, then the flow proceeds to Step 228-4, in which the "organic" hyperlink associated with the option is replaced by a "sponsored" hyperlink. Following the marking scheme described above, the hyperlink would be changed to a red font, in bold italic typeface, and underlined twice—and if the user hovers over the hyperlink, it would now display both the url (web address) and a dollar sign. The flow then proceeds to Step 228-5. If, instead, it was found at Step 228-3 that an intervention was not made in Step 224 on behalf of the option associated with the hyperlink being considered, the flow skips Step 228-4 and proceeds directly to Step 228-5. The process continues with Step 228-5, which is a command flow statement that junctions based on whether or not there is at least one "organic" hyperlink on the web page that has not previously been considered. If there is at least one "organic" hyperlink on the web page that has not previously been considered, the process returns to Step 228-2 and continues to examine one hyperlink at a time. If there is not any "organic" hyperlink on the web page that has not previously been considered, then the generation of the output web page is complete, and the process continues to Step 230.

FIG. 12B details Step 324, the generating of output by the Intermediary, in an exemplary non-limiting embodiment. This embodiment again assumes that every "option" provided in the response can be associated with a hyperlink. The process enters Step 324-1 from Step 322. In Step 324-1, the Intermediary copies the response received from the AI System in Step 322 into a new web page and marks every option with the appropriate "organic" hyperlink. Following the marking scheme described above, each of these hyperlinks would be displayed in a blue font, in bold typeface, and underlined once—and if the user hovers over the hyperlink, it displays both the url (web address) and a hand. The process then examines one hyperlink at a time when it goes to Step 324-2, in which it considers the first "organic" hyperlink on the web page that has not previously been considered. The process continues with Step 324-3. In embodiments such as that illustrated in FIG. 6, it may be difficult to identify whether or not an intervention was made on behalf of the option associated with the hyperlink being considered. (In Step 320, the AI System has already been fine-tuned with intervention information before it is instructed to respond to a user request. Unlike Step 224, reference cannot simply be made to whether intervention information about the option was included in the prompt.) Therefore, Step 324-3 is a command flow statement that junctions based on whether or not the option associated with the hyperlink being considered benefited from an intervention. One way to assess whether the option benefited is as follows: Examine the response to the user request generated by the AI Model that has been fine-tuned with intervention information; and compare it to the response to the user request generated by the same AI Model, but without any fine-tuning with intervention information. If the option associated with the hyperlink being considered benefited from an intervention, then the flow proceeds to Step 324-4, in which the "organic" hyperlink associated with the option is replaced by a "sponsored" hyperlink. Following the marking scheme described above, each of these hyperlinks would be changed to a red font, in bold italic typeface, and underlined twice—and if the user hovers over the hyperlink, it would now display both the url (web address) and a dollar sign. The flow then proceeds to Step 324-5. If, instead, it was found at Step 324-3 that the option did not benefit from an intervention, the flow skips Step 324-4 and proceeds directly to Step 324-5. The process continues with Step 324-5, which is a command flow statement that junctions based on whether or not there is at least one "organic" hyperlink on the web page that has not previously been considered. If there is at least one "organic" hyperlink on the web page that has not previously been considered, the process returns to Step 324-2 and continues to examine one hyperlink at a time. If there is not any "organic" hyperlink on the web page that has not previously been considered, then the generation of the output web page is complete, and the process continues to Step 326.

It would be apparent to someone skilled in the art that many other variations on the embodiments illustrated in FIGS. 12A and 12B are possible. For example, in some variations, Step 324-3 of FIG. 12B can be replaced by Step 228-3 of FIG. 12A. Alternatively, Step 228-3 of FIG. 12A can be replaced by Step 324-3 of FIG. 12B.

FIG. 13A illustrates output generated in Step 228, from the response shown in FIG. 9C, with the new marking scheme. FIG. 13B illustrates output generated in Step 228, from the response shown in FIG. 10C, with the new marking scheme. FIG. 13C illustrates output generated in Step 324, from the response shown in FIG. 11C, with the new marking scheme. Since these figures are not expected to be published in color, organic links are displayed in a light grey (instead of blue) and sponsored links are displayed in black (instead of red) in FIGS. 13A, 13B and 13C.

It is worthwhile to say a few words about the detailed implementation of approaches discussed herein and their relative advantages and disadvantages. Consider any approach in which responses comprise free-form paragraphs of text and each "option" provided in the response is marked with a clickable hyperlink. One advantage of such an approach is that it offers an unobtrusive way for the AI system to disclose to users which of the options may have been subject to intervention (and, implicitly, that the intervention may have led to an overstatement of the merits of such options): the hyperlinks for options subject to intervention can be displayed in one color; and the hyperlinks for options not subject to intervention can be displayed in a different color. To restate the previous sentence clearly within the context of sponsored search, the hyperlinks for options that received bids can be displayed in one color and the hyperlinks for options that did not receive bids can be displayed in a different color. (Or if use of color to differentiate hyperlinks sets off Section 508 accessibility concerns for colorblind users, other aspects of hyperlink appearance such as the typeface can be used instead.) As such, there is a way for a user to know in which places advertising has entered into the response.

Stakeholder Specification of Intervention Information Using Artificial Intelligence Up until this point in the Detailed Description, artificial intelligence has been used largely to generate responses to user requests. However, to realize the full potential of artificial intelligence in the context of interventions, we should also utilize an AI model to enable stakeholders to express their intervention information more efficiently and effectively. With the exemplary non-limiting embodiments to be described now, together with those embodiments described above, it is possible to describe an improved, end-to-end, artificial-intelligence-based sponsored search auction system. These embodiments may be utilized to generate traditional sponsored search results comprising ordered lists of sponsored links, as well as nontraditional search results comprising paragraphs of unordered free-form prose or other novel outputs.

In traditional sponsored search auction systems, stakeholders submit bids for keywords or concepts. Bids for keywords are well suited to search engines in which the user requests themselves comprise only a few search terms. However, bids for keywords are less tailored to search engines in which the user requests are more nuanced and written in conventional prose (and less likely to contain standard keywords).

For example, compare the three following requests (all variations on the requests used in FIG. 9A):
(1) Annapolis hotel.
(2) Mr. and Mrs. Jones, a conservative couple in their 50s, without children, are planning to spend 24 hours in Annapolis, Maryland. Can you write one page of text, recommending how Mr. and Mrs. Jones should spend 24 hours in Annapolis, Maryland? The text should include recommendations on things to do, places to eat, and places to stay.
(3) Mr. and Mrs. Jones, a conservative couple in their 50s, without children, are planning to spend 48 hours in Annapolis, Maryland. Can you write one page of text, recommending how Mr. and Mrs. Jones should spend 48 hours in Annapolis, Maryland? The text should include recommendations on things to do, places to eat, and places to stay.

All three of these requests would be of interest to a hotel or motel located in Annapolis; and, likely, a hotel or motel located in Annapolis would like to intervene in all three requests. However, there are three basic issues with traditional keyword auctions. First, depending on the sophistication of the search engine, it is unclear if request #2 or request #3 would necessarily trigger obvious keyword choices such as "Annapolis" AND "hotel" (since the requests do not contain the word "hotel"). Second, and more fundamentally, while the second and third requests are likely to trigger exactly the same keyword bids—their only difference is "24" in request #2 versus "48" in request #3—it is evident from their plain meaning that most Annapolis hotels would want to bid substantially higher for request #3 than for request #2. Third, above and beyond any information known about the user computer (such as its geographic location), the words contained in the requests could indicate substantially different values for different stakeholders that may routinely bid for the same keywords. Consider the Historic Inns of Annapolis, which may be oriented toward couples and may not be oriented toward children. They may be willing to bid $3 for request #1, which is completely generic. However, the second and third requests indicate that the search is more likely to be associated with the hotel's target clientele, and so a click is more likely to convert to a booking. Furthermore, if they value a two nights' stay twice as much as they value a one night's stay, they may be willing to bid twice as much for the third request as for the second (e.g., $6 for request #2 and $12 for request #3).

As further justification why artificial intelligence may be helpful for specifying the inputs of a bidding system, recall the earlier example of the keywords "kids shoes" and "shoes for kids". Since these two keywords are synonymous, it seems like redundant effort to require a bidder to submit a bid for each of them. With artificial intelligence deployed to determine the bids, there is no longer any need for the bidder to submit separate bids for these two keywords.

Figure 14:
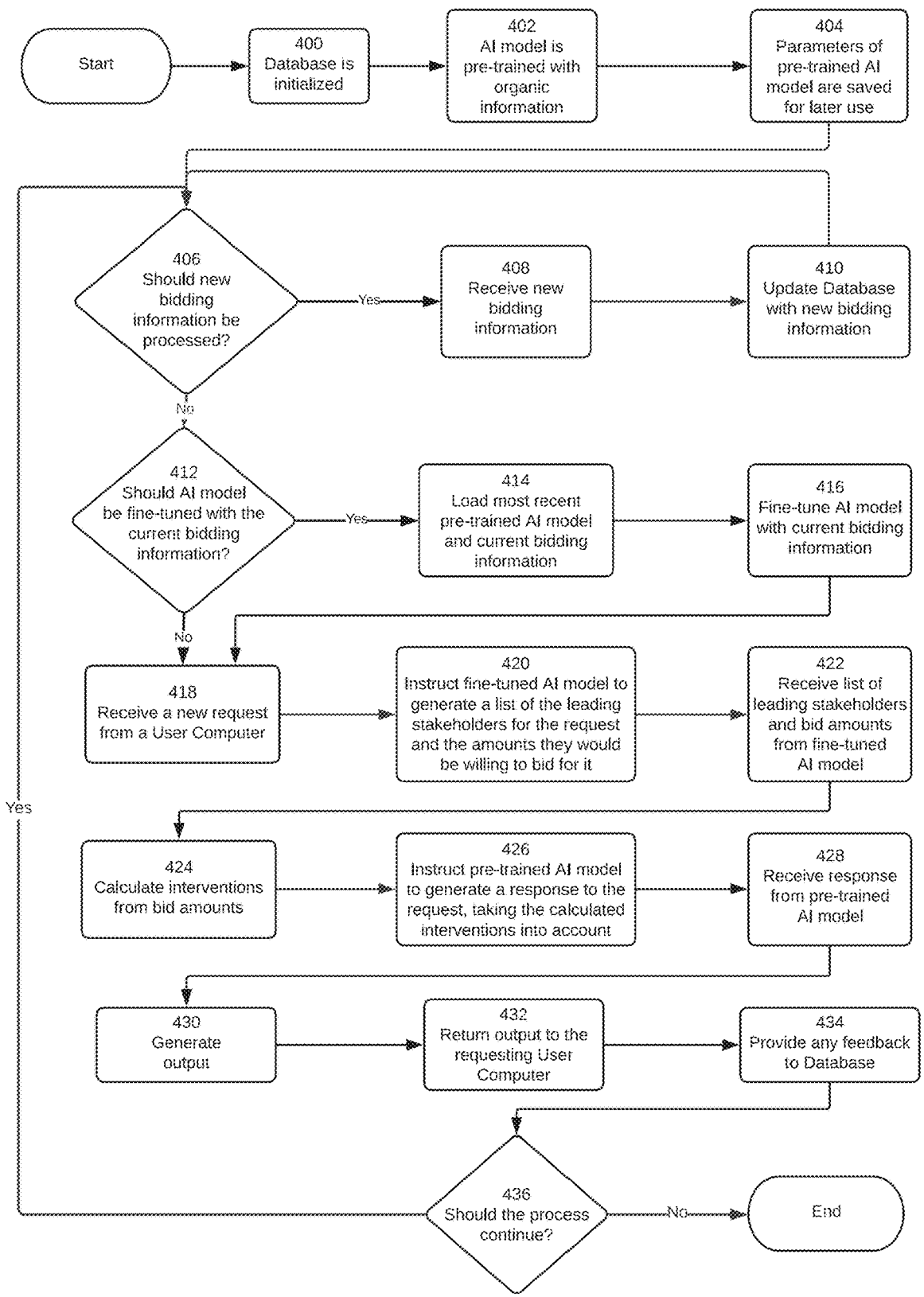
FIG. 14 is a flow diagram providing an overview of an entire process in accordance with an exemplary non-limiting embodiment.
Figure 15:
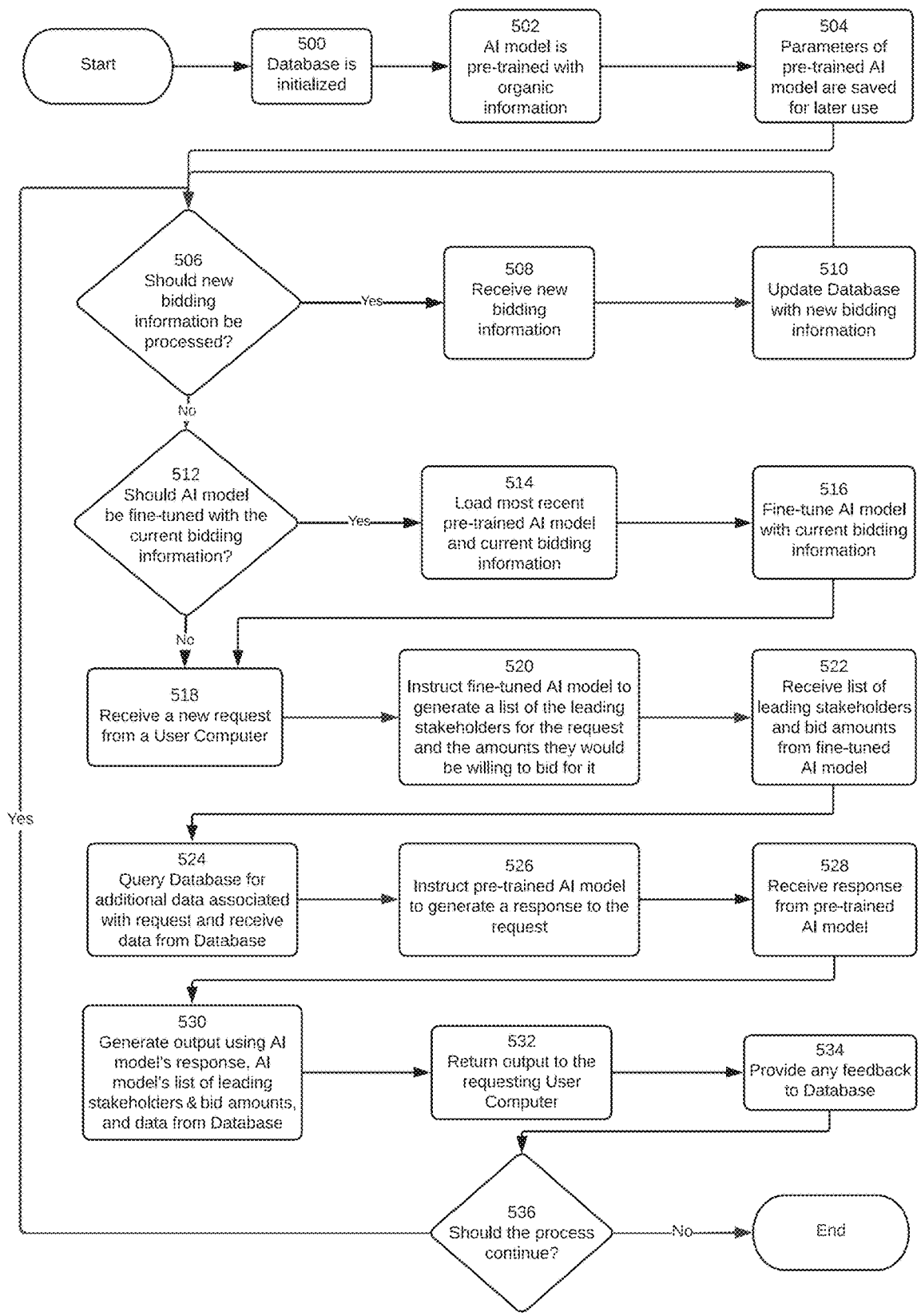
FIG. 15 is a flow diagram providing an overview of an entire process in accordance with an exemplary non-limiting embodiment.

In FIGS. 14 and 15, for purposes of brevity and clarity, we will sometimes use the phrase "fine-tuned AI model" to refer to the version of the AI model that has been both pre-trained with organic information and fine-tuned with bidding information. Counterposed to this, we will sometimes use the phrase "pre-trained AI model" to refer to the version of the AI model that has been pre-trained with organic information but has not been fine-tuned with bidding information. This use of language is not intended to suggest that the "pre-trained AI model" has not also been fine-tuned with some organic information; it is only intended to make clear that the "pre-trained AI model" has not undergone any pre-training or fine-tuning with the bidding data.

FIG. 14 is a flow diagram providing an overview of an entire process in accordance with an exemplary non-limiting embodiment. This figure depicts a process in which artificial intelligence is utilized to specify bids and in which responses are allowed to be unordered paragraphs of conventional prose or other novel outputs. The process begins with Step 400, in which the Database is initialized. In some embodiments, the Intermediary initializes the Database with the most recent bidding information that has been collected. The process continues with Step 402, in which the AI model is pre-trained with "organic information" (i.e., using the actual available data, without intervention). The process of pre-training an AI model was described in the first part of FIG. 4, and so Step 402 would incorporate some or all of the pre-training activities described in the first part of FIG. 4. Next, the flow proceeds to Step 404, in which the parameters of the pre-trained AI model are saved for later use. The process continues with Step 406, which is a command flow statement that junctions based on whether or not new bidding information should be processed. If new bidding information should be processed, the flow proceeds to Step 408, in which the Director computer system receives new bidding information from a Stakeholder computer. Continuing our ongoing example of Annapolis hotels, rows 2-4 of Table 6 illustrate exemplary new bidding information that could be received from the Historic Inns of Annapolis:

TABLE 6

Exemplary set of bidding information

| Stakeholder | Request | Bid |
| --- | --- | --- |
| Historic Inns of Annapolis | Annapolis AND hotel | $ 3 |
| Historic Inns of Annapolis | How to spend 24 hours in Annapolis by a couple without children | $ 6 |
| Historic Inns of Annapolis | How to spend 48 hours in Annapolis by a couple without children | $12 |
| Rodeway Inn | Annapolis AND hotel | $ 2.50 |
| Rodeway Inn | How to spend 24 hours in Annapolis by a family with children | $ 4 |
| Rodeway Inn | How to spend 48 hours in Annapolis by a family with children | $ 8 |
| Rodeway Inn | How to spend 24 hours in Annapolis by a couple without children | $ 1 |
| Rodeway Inn | How to spend 48 hours in Annapolis by a couple without children | $ 2 |

Still continuing our ongoing example of Annapolis hotels, let us assume that the Rodeway Inn is oriented toward families with children. Rows 5-9 of Table 6 illustrate exemplary new bidding information that could be received from the Rodeway Inn another time that Step 408 is reached.

Then, in Step 410, the Director computer system updates the Database with the new bidding information that was received in Step 408, and the process returns to Step 406. If, instead, it was decided at Step 406 that new bidding information should not be processed, the flow proceeds directly to Step 412. Step 412 is a command flow statement that junctions based on whether or not the AI model should be fine-tuned with the current bidding information. If the AI model should be fine-tuned with the current bidding information, the flow proceeds to Step 414, where the Director computer system loads both the parameters of the pre-trained AI model and the current bidding information. Recall that the parameters of the pre-trained AI model were saved for later use at Step 404. Also recall that the Database was initialized at Step 400, that new bidding information was received each time that Step 408 was reached, and that the Database was updated with new bidding information each time that Step 410 was reached. Still continuing our ongoing example of Annapolis hotels, if the current bidding information consists only of the bidding information received from the Historic Inns of Annapolis one time that Step 408 was reached and the bidding information received from the Rodeway Inn another time that Step 408 was reached, then Table 6 would illustrate the complete set of current bidding information. Then, in Step 416, the Intermediary proceeds to fine-tune the AI model with the complete set of current bidding information. The Intermediary does this by first constructing a fine-tuning data set from the complete set of current bidding information. In our ongoing example, the fine-tuning data set is illustrated by Table 6, but of course the Intermediary would need to convert the complete set of current bidding information into the file format required by the AI model and, in doing so, the Intermediary might need to add additional fields to the data base. The remaining process of fine-tuning an AI model was described in the second part of FIG. 4, and so Step 416 would incorporate some or all of the fine-tuning activities described in the second part of FIG. 4. After the AI model is fine-tuned with the current bidding information, the flow proceeds to Step 418. If, instead, it was decided at Step 412 that the AI model should not be fine-tuned with the current bidding information, the flow proceeds directly to Step 418.

In Step 418, the Intermediary receives a new request from a User Computer. A request may be expressed as free text submitted by a user or it may be in a more structured form. A request may also take the form of a short combination of search terms, as has traditionally been used in Google searches. A request may also comprise, in full or in part, submission of a voice or other audio query. A request may also comprise, in full or in part, submission of a graphical image, picture, drawing, photograph, video image, or any other form of data. In Step 420, the Intermediary instructs the AI System (using the AI model that has been fine-tuned with bidding information) to generate a list of the "leading stakeholders" for the request (i.e., the stakeholders who would be willing to bid the most for the request received in Step 418) and the amounts that they would be willing to bid for it. In Step 422, the AI System generates the list of leading stakeholders and bid amounts as instructed, the AI system sends the list of leading stakeholders and bid amounts to the Intermediary, and the Intermediary receives the list of leading stakeholders and bid amounts. Still continuing our ongoing example of Annapolis hotels, if the request had been "How should a couple without children spend 72 hours in Annapolis?", the fine-tuned AI model would generate a list comprising the Historic Inns of Annapolis and the Rodeway Inn, with associated bid amounts of something like $18 and $3, respectively—since the request now encompasses a three-nights' stay—and this list would be received by the Intermediary.

The flow proceeds to Step 424, in which the Intermediary calculates interventions on behalf of the leading stakeholders based upon their bid amounts. An example of this calculation was previously described in detail in FIG. 7. (In other embodiments, Step 424 is unnecessary: the Intermediary could treat the list of leading stakeholders and bid amounts received in Step 422 itself as the intervention, analogous to the approach described in the text associated with FIGS. 11A, 11B and 11C.) Next, in Step 426, the Intermediary instructs the AI System (using the AI model that has been pre-trained with organic information, but not fine-tuned with bidding information) to generate a response to the request received in Step 418, taking the interventions calculated in Step 424 (or, if the Intermediary treats the list of leading stakeholders and bid amounts itself as the intervention, the list received in Step 422) into account. In Step 428, the AI System generates a response as instructed, the AI system sends the generated response to the Intermediary, and the Intermediary receives the generated response. Exemplary non-limiting embodiments of Steps 426 and 428 were illustrated in greater detail in FIGS. 8A and 8B. In Step 430, the Intermediary generates output. Exemplary non-limiting embodiments of Step 430 were illustrated in greater detail in FIGS. 12A and 12B. The flow continues with Step 432, in which the Intermediary forwards the output generated in Step 430 to the requesting User Computer. In Step 434, feedback may be provided to the Database. An exemplary non-limiting embodiment of this step will be illustrated below in FIG. 16A. Finally, Step 436 is a command flow statement that junctions based on whether the process should continue. If the process should continue, the flow returns to Step 406. Otherwise, the process concludes here.

Many aspects of the present disclosure have highlighted embodiments relating to interventions in AI models that perform a "search engine" function. However, it should be emphasized that almost identical considerations apply to AI models that perform a "recommender system" (or "recommendation system") function. Thus, it would be apparent to someone skilled in the art how to modify the process of FIG. 14 to describe interventions in AI models that perform a recommender system (or recommendation system) function. For example, while Step 418 for some recommender systems might comprise a user request for a recommendation, it seems more likely on a shopping or e-commerce website that the request for a recommendation for a user would actually be initiated by the shopping or e-commerce website—whether the consumer (user) actually wants a recommendation or not. Thus, Step 418 (and FIG. 14) would be modified in inessential ways for a recommender system.

FIG. 15 is a flow diagram providing an overview of an entire process in accordance with an exemplary non-limiting embodiment. This figure depicts a process in which artificial intelligence is utilized to specify bids and in which the output returned to users comprises a combination of an ordered list of sponsored links (as is typically included in search engine outputs today) and a response generated by an AI model. The response itself is allowed to be an ordered list of links, unordered paragraphs of conventional prose, or other novel outputs. The process begins with Step 500, in which the Database is initialized. In some embodiments, the Intermediary initializes the Database with the most recent bidding information that has been collected. The process continues with Step 502, in which the AI model is pre-trained with "organic information" (i.e., using the actual available data, without intervention). The process of pre-training an AI model was described in the first part of FIG. 4, and so Step 502 would incorporate some or all of the pre-training activities described in the first part of FIG. 4. Next, the flow proceeds to Step 504, in which the parameters of the pre-trained AI model are saved for later use. The process continues with Step 506, which is a command flow statement that junctions based on whether or not new bidding information should be processed. If new bidding information should be processed, the flow proceeds to Step 508, where the Director computer system receives new bidding information from a Stakeholder computer. (The explanation and examples that were provided above for Step 408 are equally applicable to Step 508.) Then, in Step 510, the Director computer system updates the Database with the new bidding information, and the process returns to Step 506. If, instead, it was decided at Step 506 that new bidding information should not be processed, the flow proceeds directly to Step 512.

Step 512 is a command flow statement that junctions based on whether or not the AI model should be fine-tuned with the current bidding information. If the AI model should be fine-tuned with the current bidding information, the flow proceeds to Step 514, where the Director computer system loads both the parameters of the pre-trained AI model and the current bidding information. Recall that the parameters of the pre-trained AI model were saved for later use at Step 504. Also recall that the Database was initialized at Step 500 and that it was updated with new bidding information each time that Step 510 was reached. (The explanation and example that were provided above for Step 414 are equally applicable to Step 514.) Then, in Step 516, the AI model is fine-tuned with the current bidding information. The Intermediary does this by first constructing a fine-tuning data set from the complete set of current bidding information. In our ongoing example, the fine-tuning data set is illustrated by Table 6, but of course the Intermediary would need to convert the complete set of current bidding information into the file format required by the AI model and, in doing so, the Intermediary might need to add additional fields to the data base. The remaining process of fine-tuning an AI model was described in the second part of FIG. 4, and so Step 516 would incorporate some or all of the fine-tuning activities described in the second part of FIG. 4. After the AI model is fine-tuned with bidding information, the flow proceeds to Step 518. If, instead, it was decided at Step 512 that the AI model should not be fine-tuned with the current bidding information, the flow proceeds directly to Step 518.

In Step 518, the Intermediary receives a new request from a User Computer. A request may be expressed as free text submitted by a user or it may be in a more structured form. A request may also take the form of a short combination of search terms, as has traditionally been used in Google searches. A request may also comprise, in full or in part, submission of a voice or other audio query. A request may also comprise, in full or in part, submission of a graphical image, picture, drawing, photograph, video image, or any other form of data. In Step 520, the Intermediary instructs the AI System (using the AI model that has been fine-tuned with bidding information) to generate a list of the "leading stakeholders" for the request (i.e., the stakeholders who would be willing to bid the most for the request received in Step 518) and the amounts that they would be willing to bid for it. In Step 522, the AI System generates the list of leading stakeholders and bid amounts as instructed, the AI system sends the list of leading stakeholders and bid amounts to the Intermediary, and the Intermediary receives the list of leading stakeholders and bid amounts.

The flow proceeds to Step 524, in which the Intermediary queries the Database for additional data associated with the request received in Step 518 and receives the additional data from the Database. Examples of the additional data obtained in Step 524 include, without limitation: the sponsored link that each of the leading stakeholders wishes to display with the response to the request; information about the components of the quality score (click-through rate, ad relevance, and landing page experience), for each of the leading stakeholders; information about the expected impact from ad extensions and other ad formats, for each of the leading stakeholders; and a reserve price to be applied for this request. The flow continues with Step 526, in which the Intermediary instructs the AI System (using the AI model that has been pre-trained with organic information, but not fine-tuned with bidding information) to generate a response to the request received in Step 518. In Step 528, the AI System generates a response as instructed, the AI system sends the generated response to the Intermediary, and the Intermediary receives the generated response. In Step 530, the Intermediary constructs a webpage for the requesting user, making use of the response received from the AI model in Step 528, the data obtained from the Database in Step 524, and the list of leading stakeholders and bid amounts received from the AI model in Step 522, to select the sponsored links that will be sent to the User Computer and in what order. In one exemplary non-limiting embodiment (a "plain vanilla" Generalized Second Price auction), the Intermediary selects sponsored links in descending order of bid amount, cutting off the list at either a reserve price or so that a maximum number of sponsored links are included. In other exemplary non-limiting embodiments, the Intermediary first adjusts the bid amounts by a quality score associated with each leading stakeholder. In some of these embodiments, the Intermediary proceeds to construct the top of the web page by publishing the selected sponsored links in the selected order, and then to construct the rest of web page by publishing the response generated by the AI model below the selected sponsored links.

The flow continues with Step 532, in which the Intermediary forwards the webpage constructed in Step 530 to the requesting User Computer. Next, in Step 534, feedback may be provided to the Database. An exemplary non-limiting embodiment of this step will be illustrated below in FIG. 16B. Finally, Step 536 is a command flow statement that junctions based on whether the process should continue. If the process should continue, the flow returns to Step 506. Otherwise, the process concludes here.

Note that in FIGS. 14 and 15, the terminology has been specialized from "intervention information" (as, for example, was used in FIG. 6) to "bidding information". The purpose of specializing the terminology in this way was to simplify reading and understanding, and in recognition that bidding by stakeholders is likely one of the most useful applications of the depicted embodiments. However, exactly the same processes as are depicted in these figures would work if "bidding information" had been replaced by "intervention information". For example, the intervention information could comprise free text opinions submitted by independent third-party experts. In Step 416, the AI model could be fine-tuned with the independent third-party experts' opinions. Then, in Step 420, the fine-tuned AI model could be instructed to generate a list of the leading results associated with the user request, together with a rating based on the independent third-party experts' opinions. In Step 424, interventions could be calculated based on the generated ratings. Finally, in Step 426, the pre-trained AI model could be instructed to generate a response to the user request, taking the calculated interventions into account. Thus, we see that the embodiments depicted in FIGS. 14 and 15 are useful not only as processes in which artificial intelligence is utilized to help specify monetary bids, but also as processes in which artificial intelligence is utilized to help specify independent third-party ratings or other non-monetary interventions.

Also note that other variations on the embodiments described in FIGS. 14 and 15 would be apparent to a person skilled in the art. Recall that (as described above), there are broadly speaking two primary approaches to teaching new information—such as intervention information—to AI models: fine-tuning; and using contextual prompts. Both the processes of FIGS. 14 and 15 have been described as utilizing fine-tuning to teach the bidding data to the AI model (as in FIG. 6). Clearly, the processes could easily be modified to instead use contextual prompts to teach the bidding data to the AI model (as in FIG. 5). Moreover, it is understood that one can obtain similar results by using embeddings as by using contextual prompts, so it would be apparent to someone skilled in the art how to modify the processes of FIGS. 14 and 15 to utilize embeddings instead. Alternatively, as discussed above, the processes could operate in similar fashion to Retrieval-Augmented Generation (RAG).

Let us note that there may be credibility issues with using the AI system to determine bidders' bids whenever the company providing the AI system has a strong financial incentive to overestimate what stakeholders would be willing to pay for requests. One approach for mitigating the credibility issue is as follows. A stakeholder begins by submitting bidding information (such as rows 2-4 or rows 5-9 of Table 6). The AI system responds by providing the stakeholder with a list of the most common requests that relate to the stakeholder's submitted bidding information, together with the amounts that it estimates the stakeholder would be willing to bid for these requests. The stakeholder then has the choice of accepting the estimates in this list or of modifying estimated bid amounts using the stakeholder's own numbers. This process can then be iterated until the stakeholder and the AI system converge on a final list of acceptable bid amounts—and this final list is the one that the AI system applies as the stakeholder's actual bidding information. Of course, in addition, the bid amounts received in Steps 422 or 522 can themselves be made subject to verification and audit after the fact.

Providing Feedback to the Database

It remains to be described in detail how the Intermediary provides feedback to the Database after the intervention. This part of the process may be utilized, for example, to record the payments owed by stakeholders in embodiments where stakeholders bid for interventions to occur.

Figures 16A, 16B:
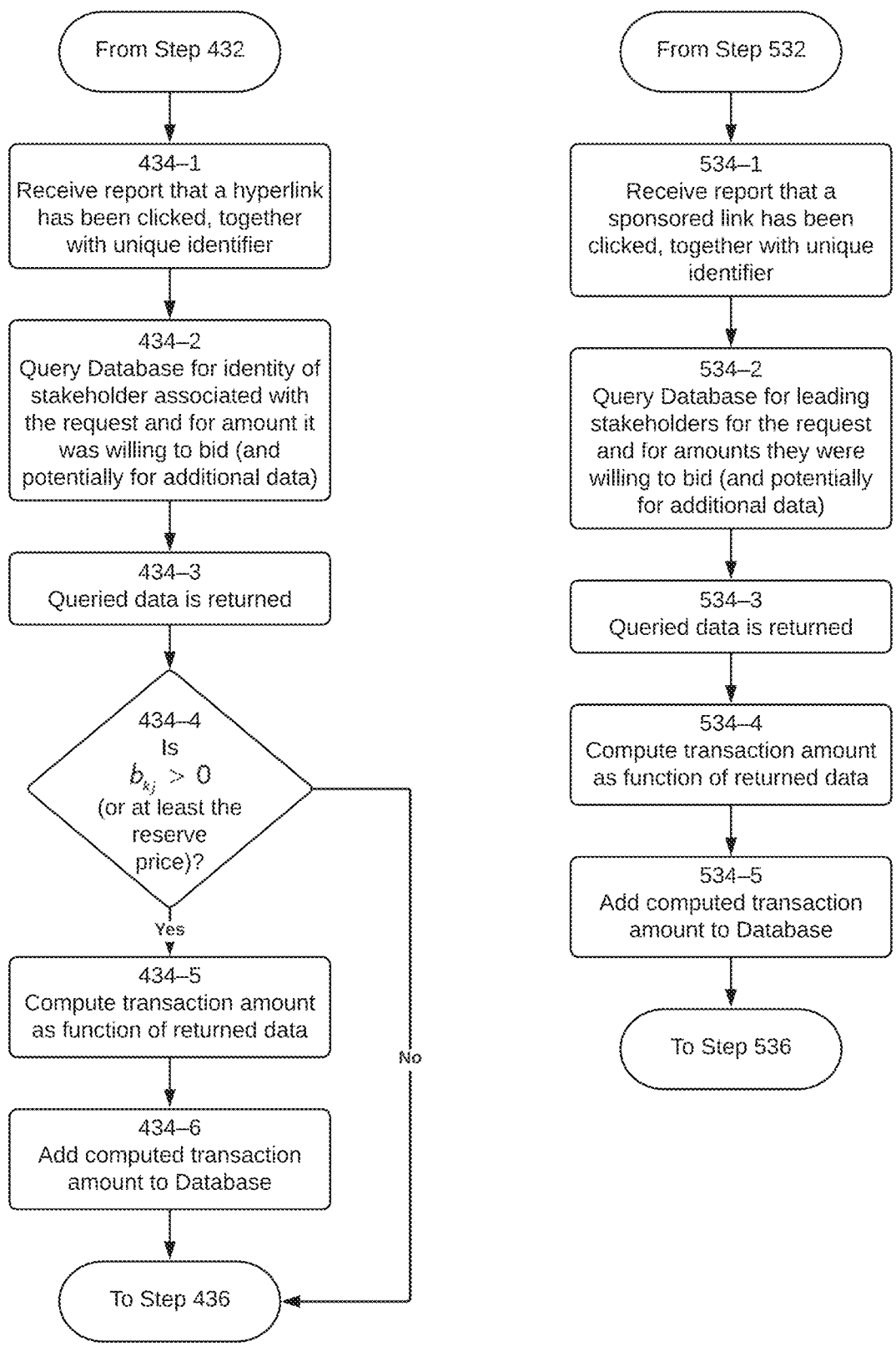
FIGS. 16A and 16B are flow diagrams illustrating, in greater detail, elements of the flow diagrams of FIGS. 14 and 15, respectively.

FIG. 16A details Step 434, the providing of feedback to the Database by the Intermediary, in an exemplary non-limiting embodiment. (This figure also details Step 232, Step 328 and other steps in which feedback is provided in some exemplary non-limiting embodiments. Any differences in its application to Step 232, Step 328 or other feedback steps would be relatively minor and would be apparent to someone skilled in the art—and therefore will be omitted for the sake of brevity.) This embodiment assumes that every "option" provided in the response is marked with a hyperlink. For example, in FIG. 9C, the phrases "Rodeway Inn", "William Paca House and Garden", and "Dry 85" would be displayed as clickable links—and it is further assumed that clicks could be counted using similar technologies as are used in conjunction with sponsored search today. The process enters Step 434-1 from Step 432. In Step 434-1, the Intermediary receives a report that a given hyperlink contained in a response to a user request was clicked, together with a unique identifier of the request/response. We will denote by k the option associated with the hyperlink that was clicked. In Step 434-2, the Intermediary queries the Database, using the unique identifier, for the identity of the stakeholder j associated with option k, the amount $b_{kj}$ that stakeholder j was willing to bid for the option k (this could be the actual bid of stakeholder j or, pursuant to Step 420, it could be the inventive system's estimate of the amount that stakeholder j was willing to bid for this request). In some exemplary non-limiting embodiments, the Intermediary also queries the Database for additional data associated with the request/response, for example, the associated relative importance weight $r_k$, the associated intervention weight $w_k$, a reserve price, or other aspects of the associated intervention information. Next, in Step 434-3, the Database returns to the Intermediary the data queried in Step 434-2. After this, the process proceeds to Step 434-4, which is a command flow statement that junctions based on whether or not the amount $b_{kj}$ that stakeholder j was willing to bid for the option k was a positive number (or, if there was a reserve price, whether $b_{kj}$ was at least the reserve price). If $b_{kj}$ was a positive number (or was at least the reserve price), the flow proceeds to Step 434-5, in which the Intermediary computes a transaction amount associated with the request/response for stakeholder j, as a function of the data returned in Step 434-3: in some exemplary non-limiting embodiments, the transaction amount could simply equal $b_{kj}$; while in other exemplary non-limiting embodiments, the transaction amount could, for example, equal the product of $b_{kj}$, $r_k$, and $w_k$. (In those exemplary non-limiting embodiments based upon keywords or concepts, we use subscript k to denote a relevant keyword or concept associated with the option; and if there were multiple keywords or concepts k applicable to the given option when the response was generated, then the Intermediary computes the product for each, and takes the sum over all relevant keywords or concepts.) Next, in Step 434-6, the transaction amount computed in Step 434-5 is added to the Database. After Step 434-6, the process proceeds to Step 434. If at Step 434-4 the bid amount $b_{kj}$ was not a positive number (or was less than the reserve price), the flow skips Steps 434-5 and 434-6, proceeding directly to Step 436. Note that, in certain exemplary non-limiting embodiments, some of the steps illustrated in FIG. 16A can be performed in other sequences—or some of the steps could be performed before or after reaching Step 434.

FIG. 16B details Step 534, the providing of feedback to the Database by the Intermediary, in another exemplary non-limiting embodiment. (This figure also details Step 232, Step 328 and other steps in which feedback is provided in some other exemplary non-limiting embodiments. Any differences in its application to Step 232, Step 328 or other feedback steps would be relatively minor and would be apparent to someone skilled in the art—and therefore will be omitted for the sake of brevity.) This embodiment assumes that the output of the inventive system consisted of ordered lists of sponsored links (as in traditional sponsored search auctions) together with AI-generated responses to user requests and possibly other data. The process enters Step 534-1 from Step 532. In Step 534-1, the Intermediary receives a report that one of the sponsored links was clicked by a user, together with a unique identifier of the request/response. We let k denote the request and we let j denote any of the leading stakeholders associated with request k. In Step 534-2, the Intermediary queries the Database, using the unique identifier, for the leading stakeholders j associated with request k at the time when the response was generated and the amounts $b_{kj}$ that the leading stakeholders were willing to bid for the request (these could be the actual bids of the leading stakeholders or, pursuant to Step 520, they could be the inventive system's estimates of the amounts that the leading stakeholders were willing to bid). In some exemplary non-limiting embodiments, the Intermediary also queries the Database for additional data associated with the request—this data could, for example, include components of the quality score (e.g., click-through rate, ad relevance, and landing page experience) of the leading stakeholders, and it could, for example, include the expected impact from ad extensions and other ad formats of the leading stakeholders. Next, in Step 534-3, the Database returns to the Intermediary the data queried in Step 534-2. After this, the process proceeds to Step 534-4, in which the Intermediary computes the transaction amount to be associated with the clicked sponsored link as a function of the data returned in Step 534-3. Some exemplary non-limiting embodiments employ the Generalized Second-Price Auction; in such embodiments, the system employs the data returned in Step 534-3 to calculate the minimum amount that the stakeholder associated with the clicked sponsored link could have bid while maintaining its position in the sponsored search results. Next, in Step 534-5, the transaction amount computed in Step 534-4 is added to the Database. After Step 534-5, the process proceeds to Step 536. Note that, in certain exemplary non-limiting embodiments, some of the steps illustrated in FIG. 16B can be performed in other sequences—or some of the steps could be performed before or after reaching Step 534.

A new challenge may arise in using a pay-per-click approach when responses comprise free-form paragraphs of text. With traditional approaches to sponsored search, in which search results are merely an ordered list of hyperlinks, a user will typically click on a hyperlink immediately or not at all. (Few users today save their search results and click on them later.) By contrast, if the search engine generates free-form paragraphs of text (e.g., in response to requests along the lines of "How should I spend 48 hours in Annapolis?"), users may well save the output and click on options only days later. It is unclear how well the technology for monitoring click-throughs will work when the clicking may occur with considerable delay. Furthermore, if stakeholders are charged for clicks that occur days or weeks after the search, credibility issues may result.

Artificial Intelligence Choice Mechanism Systems

Enabling bidders to use artificial intelligence to express or specify their bids appears to be a very powerful approach. It seems potentially to be a vast improvement over naming bids for specific keywords—and the approach likely has application to systems implementing a wider class of choice mechanisms. We first define:

a. A choice mechanism is defined as a procedure that asks a plurality of participants to make choices from a plurality of possible choices. Said choices may include, without limitation, identifying one or more elements of a set, ranking one or more elements of a set, identifying a quantity of one or more elements of a set, associating a price with one or more elements of a set, associating a parameter with one or more elements of a set, or associating a plurality of parameters with one or more elements of a set. The choice mechanism aggregates the choices elicited from participants into an outcome, which in many cases is a decision, an allocation, or a result.

b. In short, a choice mechanism takes as input the "choices" of "participants" and produces as output an "outcome".

Choice mechanisms are described in Komo and Ausubel (2020). Examples of choice mechanisms include school choice mechanisms, auction mechanisms, and voting mechanisms. In a school choice mechanism, the participants might be students, the choices might be ranked-order lists of schools, and the outcome might be an assignment of students to schools. In an auction mechanism, the participants might be bidders, the choices might be bids, and the outcome might be an assignment of items to bidders and associated payments by the bidders. In a voting mechanism, the participants might be voters, the choices might be votes for candidates (or ranked-order lists of candidates), and the outcome might be the winning candidate(s). A choice mechanism may further be described as a static choice mechanism if there is a single round or submission window for participants and as a dynamic choice mechanism if there is (at least the possibility of) multiple rounds or submission windows for participants.

The choices expressed by participants in a choice mechanism may be referred to as rankings, lists, bids, votes, reports, disclosures, preferences, or by other names. In the current document, for brevity and clarity, we shall generally use choices, which is intended as terminology to encompass, without limitation, all of these other possible terms for choices. Participants in a choice mechanism may be referred to as students, bidders, voters, or by other names. In the current document, for brevity and clarity, we shall generally use participants, which is intended as terminology to encompass, without limitation, all of these other possible terms for participants. The outcomes determined by a choice mechanism may be referred to as assignments, allocations and associated payments, results, winners, or by other names. In the current document, for brevity and clarity, we shall generally use outcomes, which is intended as terminology to encompass, without limitation, all of these other possible terms for outcomes.

One may also define: An artificial intelligence choice mechanism system is a computer system that utilizes an AI model for any of the following purposes:

Assisting participants in creating, expressing or specifying their submissions of choices to a choice mechanism;

Suggesting improvements to the choice submissions of participants; or

Providing an economical method for submitting proxy choices or contingent choices.

Figure 17:
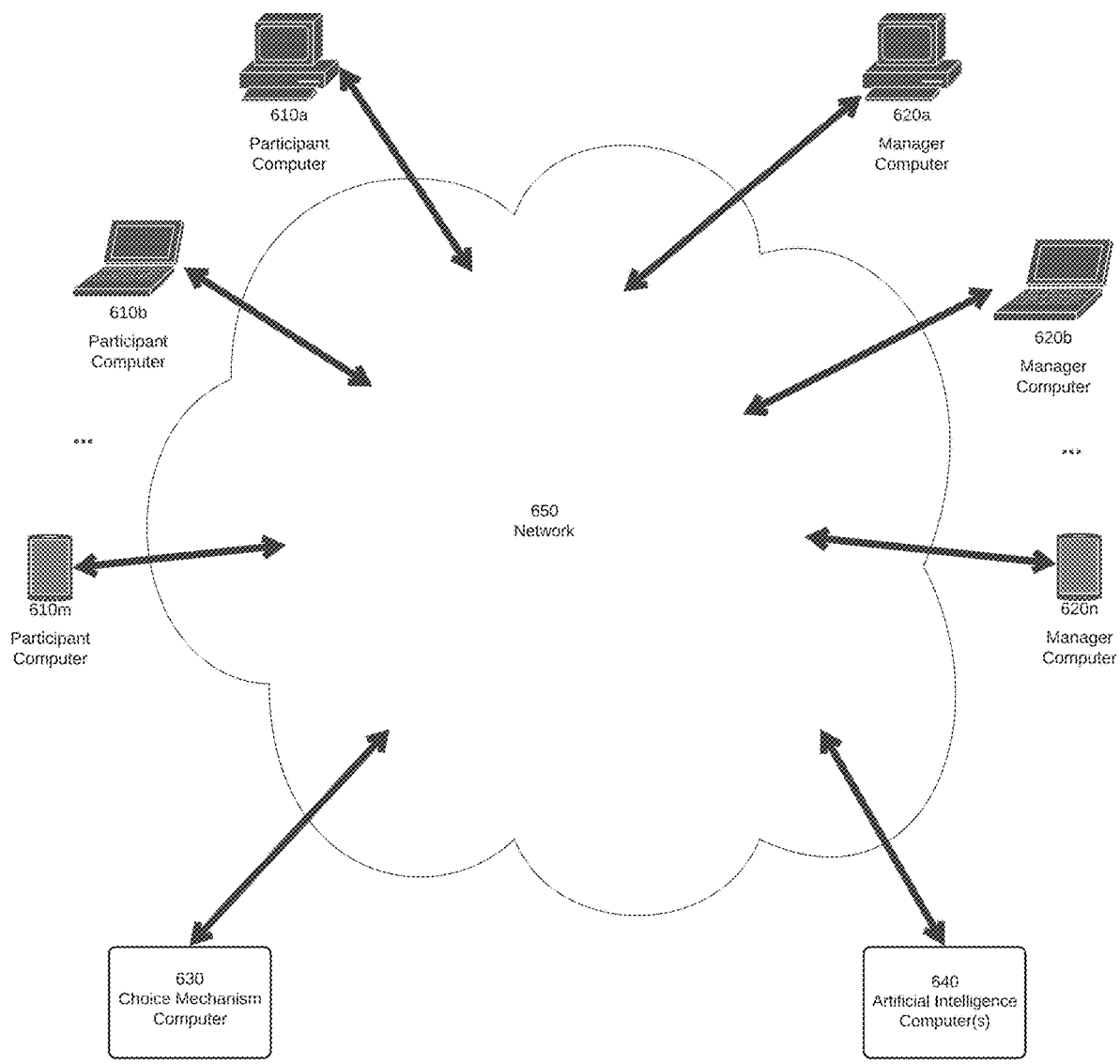
FIG. 17 is a diagram illustrating the architecture of an exemplary artificial intelligence choice mechanism system in accordance with an embodiment.

Before describing the auction process in detail, reference is made to FIG. 17 to describe the architecture of an exemplary computer system in accordance with an embodiment. In the graphical depiction of FIG. 17, the computer system consists of Participant Computers 610a-m and Manager Computers 620a-n communicating with the Choice Mechanism Computer (CMC) 630 and the Artificial Intelligence Computer(s) 640 over a network 650. The computers or terminals 610a-m are employed by participants in the choice mechanism, the computers or terminals 620a-n are employed by the people managing the choice mechanism, the Choice Mechanism Computer 630 processes the submissions, and the Artificial Intelligence Computer(s) 640 provide artificial intelligence services to users. The user computers (i.e., the Participant Computers 610*a-m* and Manager Computers 620*a-n*) will be shown in greater detail in FIG. 18A. The Choice Mechanism Computer 630 will be shown in greater detail in FIG. 18B. Details of the Artificial Intelligence Computer(s) 640 have already been illustrated in FIGS. 2 and 3. In some embodiments, the system architecture is as a client-server system: the Choice Mechanism Computer 630 is a server; the Participant Computers 610*a-m*, the Manager Computers 620*a-n*, and the Artificial Intelligence Computer(s) 640 are clients.

Figure 18A:
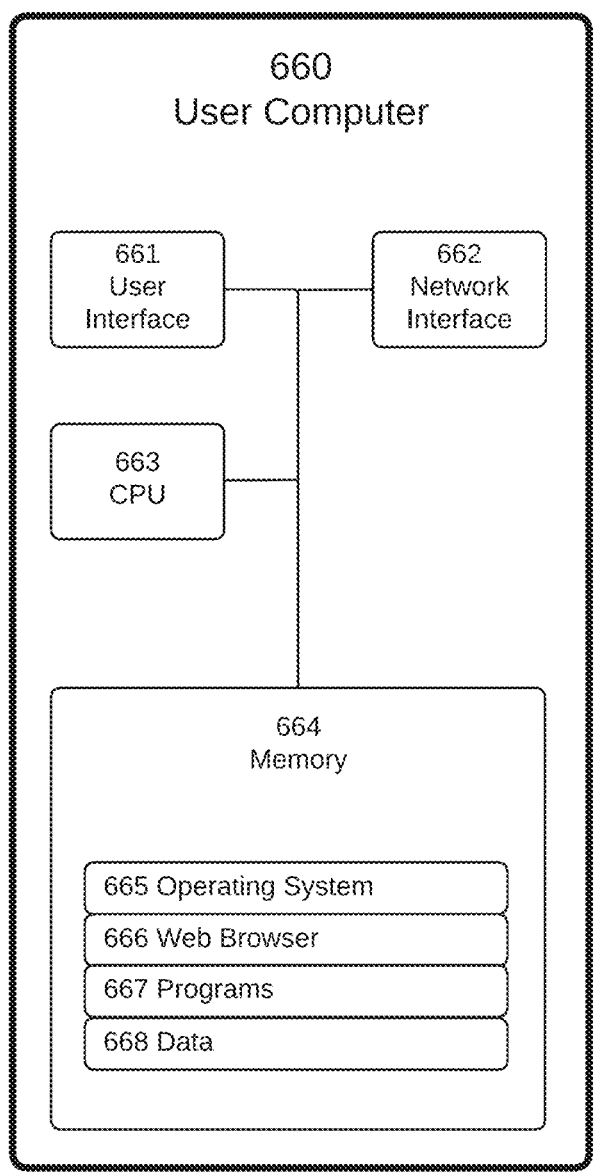
FIGS. 18A and 18B are diagrams illustrating elements of FIG. 17 in greater detail.

FIG. 18A is a more detailed illustration of the user computers (i.e., the Participant Computers 610*a-m* and the Manager Computers 620*a-n*) shown in FIG. 17. A typical user computer 660 will include a user interface 661 for input/output which may include a conventional keyboard, mouse, display, touch screen, speakers, microphone, camera, and other input/output devices. The user interface 661 is coupled to a network interface 662, which in turn communicates via the network 650. Both the user interface and network interface connect, in each computer, to a CPU 663. Each computer includes memory 664, which may store an operating system 665, a web browser 666 (e.g., Safari or Google Chrome), other programs 667 (but not necessarily any computer program specific to the choice mechanism), and data 668. In each user computer 660, the CPU 663 is the logical circuitry that executes instructions from memory 664 so that processing, as well as input/output operations via the user interface and the network interface, take place as is conventional in the art.

Figure 18B:
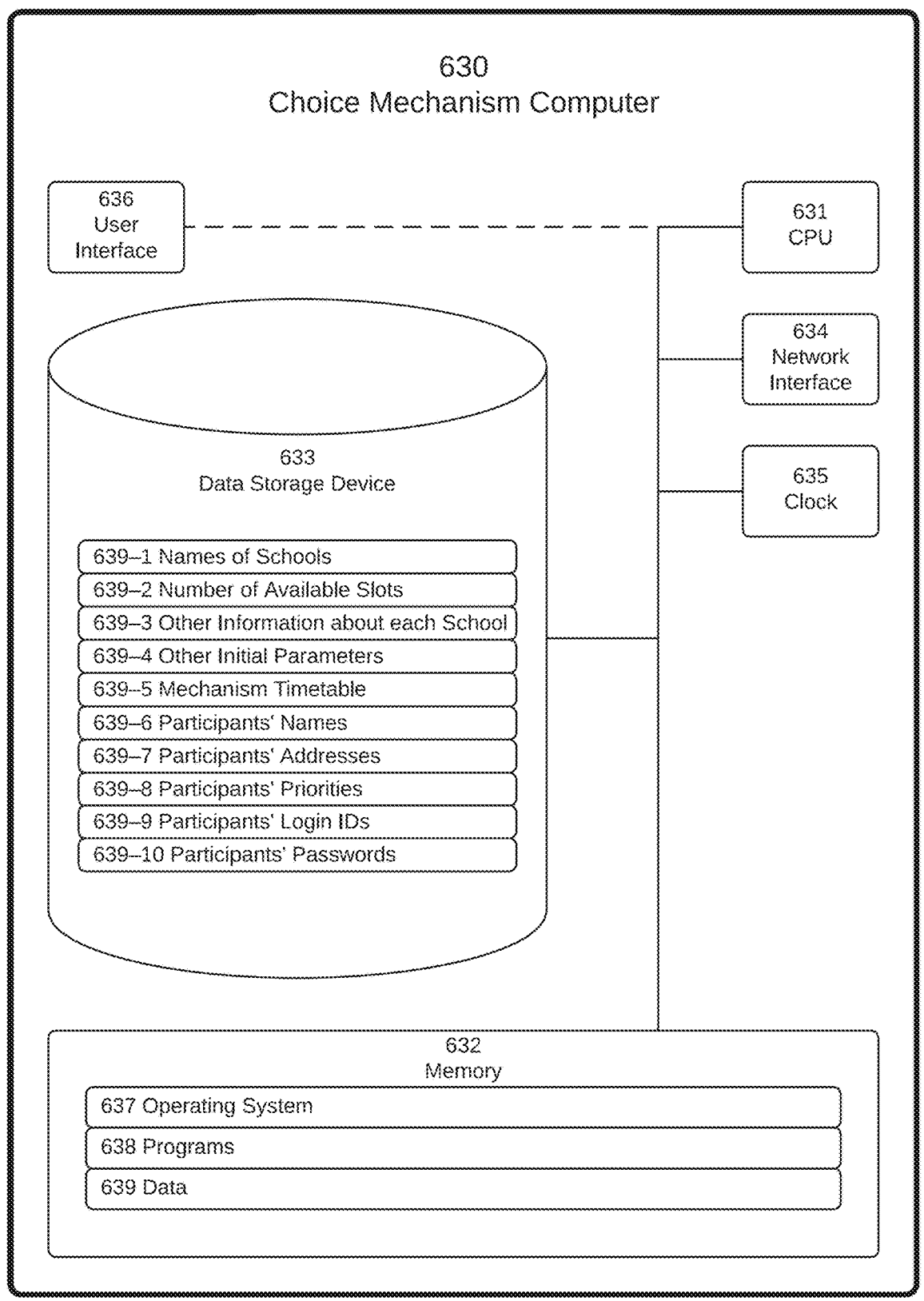

FIG. 18B is a more detailed illustration of the Choice Mechanism Computer (CMC) 630 shown in FIG. 17. The CMC 630 typically includes a CPU 631, memory 632, a data storage device 633, a network interface 634, and a clock 635, which are typically hardware devices that are coupled with one another. The CMC will sometimes also include a user interface 636, but this should be regarded as optional, as the CMC is often located in a cloud data center. An operating system 637, programs 638, and data 639 are typically stored in memory 632. Other data 639—such as the names of schools 639-1, the number of available slots in each school 639-2, other information about each school 639-3, other initial parameters 639-4, a mechanism timetable 639-5, the participants' names 639-6, the participants' addresses 639-7, the participants' priorities 639-8, the participants' login IDs 639-9, and the participants' passwords 639-10—are typically stored on the data storage device 633. However, in some embodiments, some or all of this data might instead be stored in memory 632. Obviously, the types of data included in data 639 are specific to the type of choice mechanism. The CMC's CPU 631 is the logical circuitry that executes instructions from memory 632 so that processing, as well as input/output operations via the network interface, take place as is conventional in the art.

We shall now describe some exemplary embodiments of artificial intelligence choice mechanism systems. Throughout the descriptions of FIGS. 19, 20, 23A, 23B, 24A and 24B, there will be repeated references to a "first preferred embodiment", a "second preferred embodiment" and a "third preferred embodiment". For clarity, these preferred embodiments relate to artificial intelligence systems and methods for assisting participants in:

First preferred embodiment: A sealed-bid school choice mechanism (FIGS. 19 and 23A) and a dynamic school choice mechanism (FIGS. 20 and 23A).

Figure 24A:
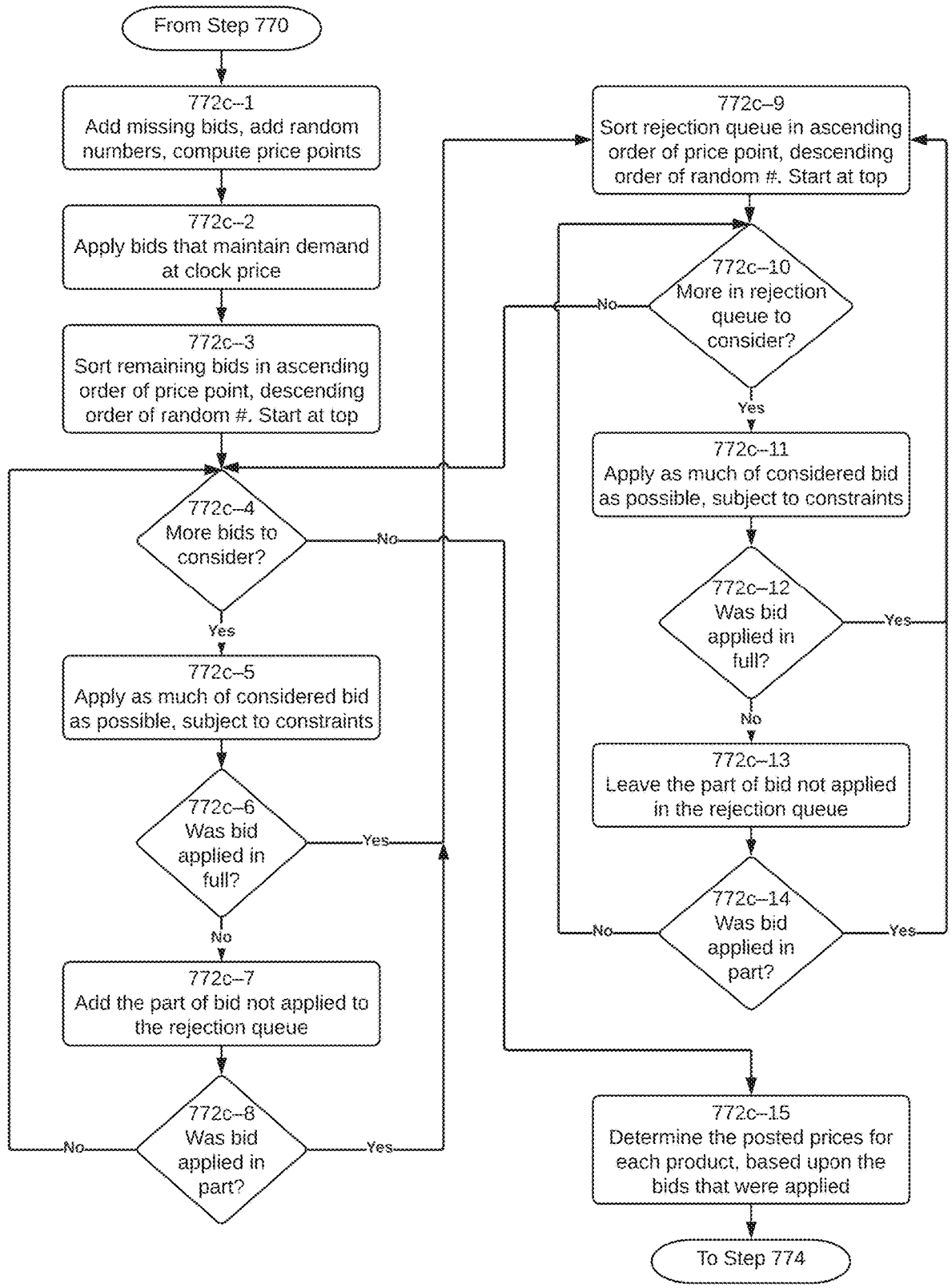
FIGS. 24A and 24B are flow diagrams illustrating elements of the flow diagrams of FIG. 20 in greater detail.

Second preferred embodiment: A sealed-bid auction mechanism (FIGS. 19 and 23B) and an ascending clock auction mechanism (FIGS. 20 and 24A).

Figure 24B:
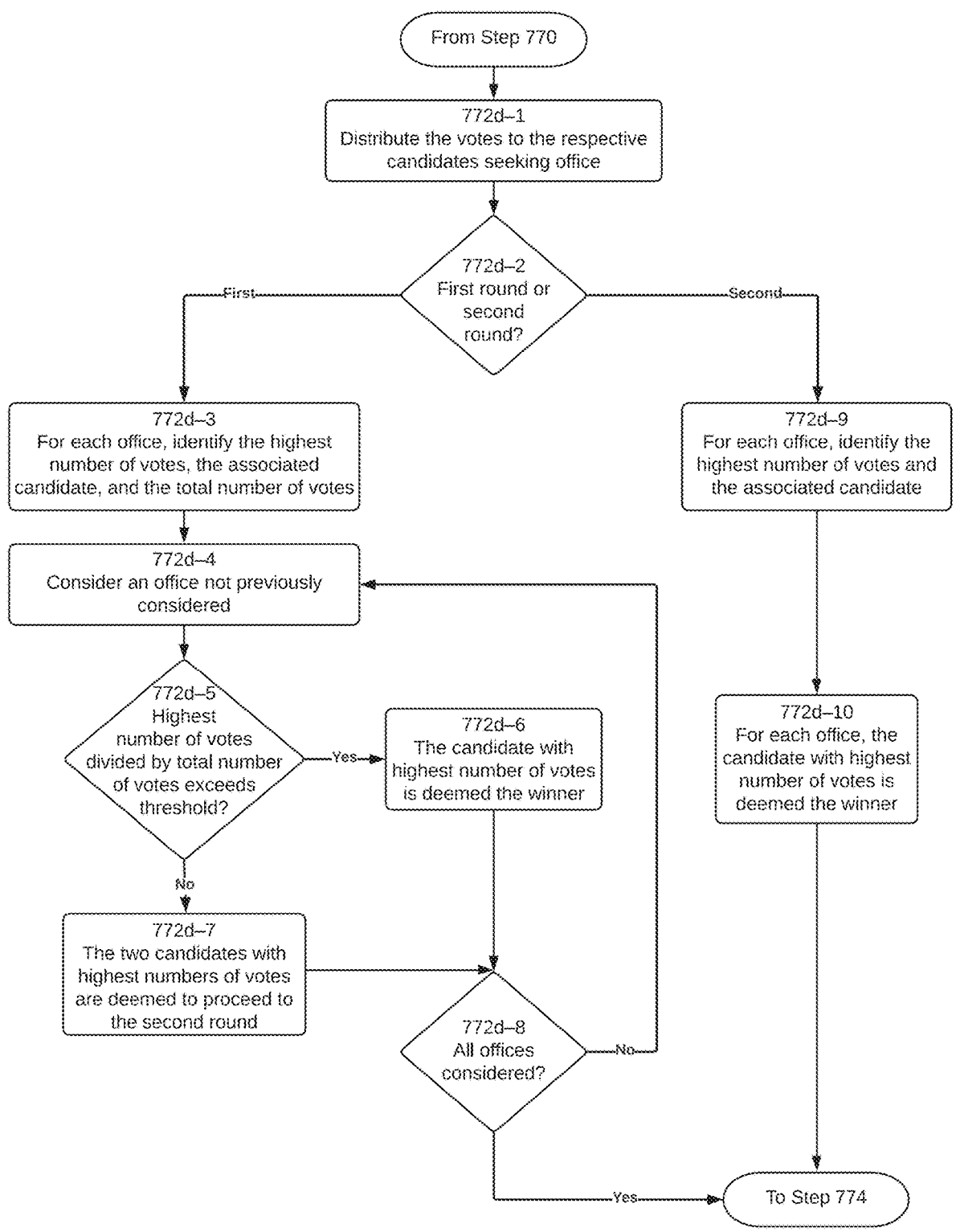

Third preferred embodiment: A single-round voting mechanism (FIGS. 20 and 24B) and a runoff election mechanism (FIGS. 20 and 24B).

Figure 19:
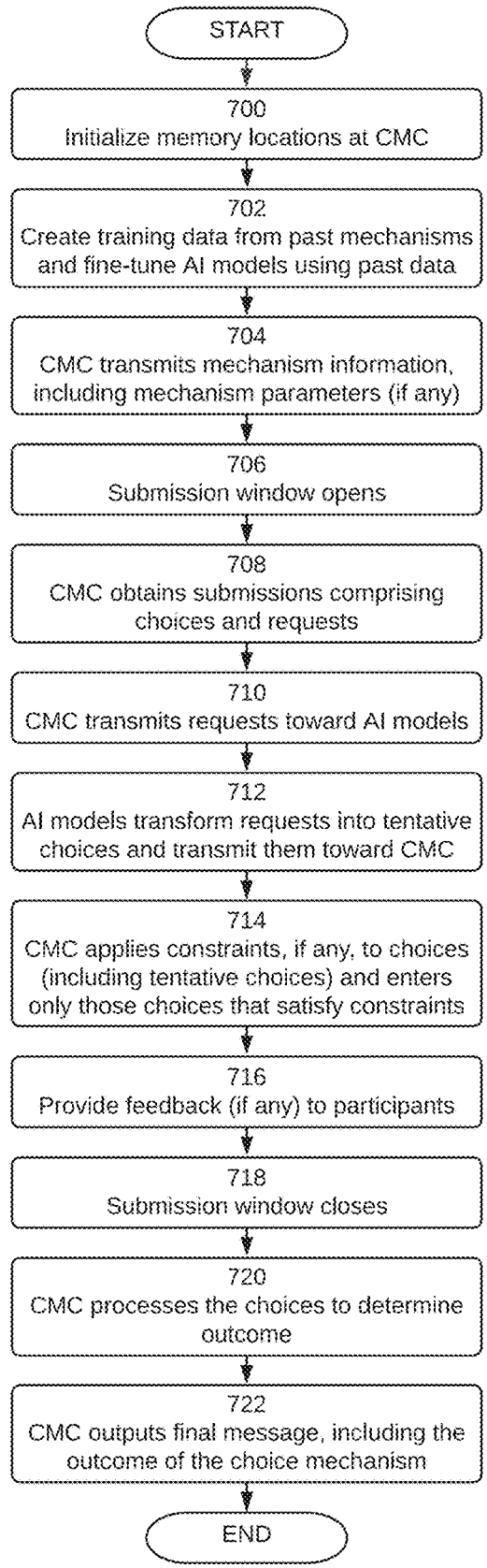
FIG. 19 is a flow diagram illustrating the overall process of an exemplary artificial intelligence choice mechanism system and method in accordance with an embodiment.
Figure 20:
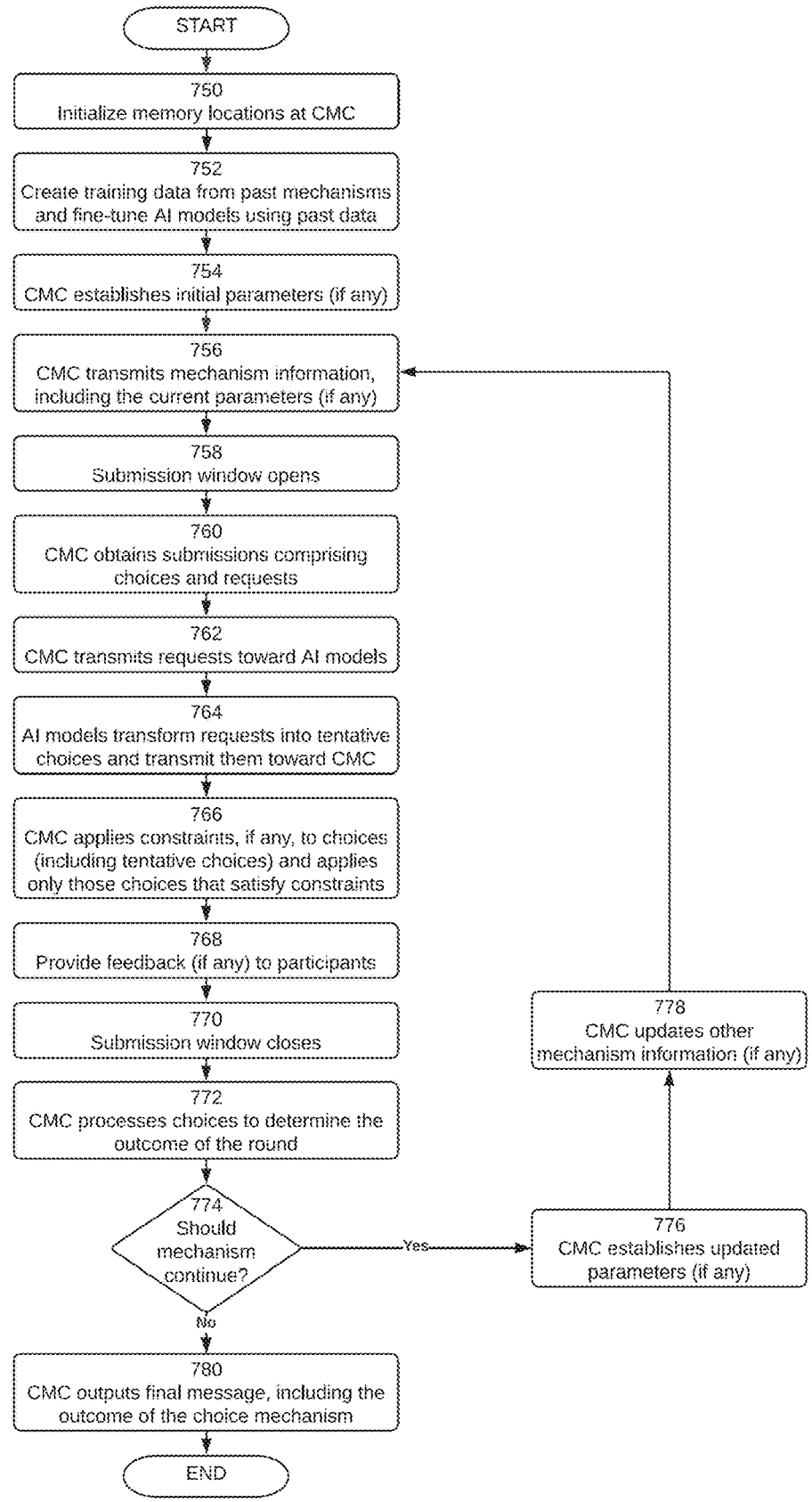
FIG. 20 is a flow diagram illustrating the overall process of an exemplary artificial intelligence choice mechanism system and method in accordance with an embodiment.

FIG. 19 is a flow diagram of a process in accordance with one embodiment. It describes using artificial intelligence to assist participation in a single-round choice mechanism including, without limitation, a static school choice mechanism, a sealed-bid auction mechanism, and a standard voting mechanism. The process starts with Step 700, in which memory locations of a Choice Mechanism Computer (CMC) are initialized. In a first preferred embodiment, the appropriate memory locations of the CMC are initialized with mechanism information such as the names of the schools whose slots are options in the school choice mechanism, the number of available slots in each school, the criteria for which each school applies priorities (e.g., a maximum distance from the school or an older sibling already enrolled in the school), other information about each school, other initial parameters, a mechanism timetable, a list of participant names, a list of their associated addresses, a list of their associated sibling status, a list of associated IDs, and a list of associated passwords. In a second preferred embodiment, the appropriate memory locations of the CMC are initialized with mechanism information such as the products in the auction mechanism, the available quantity of each product (where a "product" is defined as a type of item) in the auction mechanism, other information about the products in the auction mechanism (e.g., if regional licenses are being offered for a plurality of regions, the population in each region), initial parameters (e.g., reserve price parameters), a mechanism timetable, a list of participant IDs, a list of associated passwords, and a list of associated quantity limits or value limits. In a third preferred embodiment, the appropriate memory locations of the CMC are initialized with mechanism information such as the names of the candidates in the voting mechanism, the offices for which they are running, other information about each candidate (e.g., their party) and each office (e.g, the number of positions being filled), initial parameters, a mechanism timetable, a list of participant IDs, a list of associated passwords, and a list of offices for which each participant is eligible to vote. In some embodiments, the mechanism information with which the appropriate memory locations of the CMC are initialized is obtained from manager computers.

The process continues with optional Step 702, in which at least one training data set is created from past implementations of a choice mechanism and then one or more AI models are trained or fine-tuned using said at least one data set. In some preferred embodiments, a training data set is created from the participant's own submissions in a similar choice mechanism; and in other preferred embodiments, a training data set is created from all participants' submissions in a similar choice mechanism. The process of pre-training and fine-tuning AI models has already been described in FIG. 4, and so Step 702 would incorporate some or all of the pre-training and fine-tuning activities described in FIG. 4. Next, in Step 704, the CMC transmits mechanism information, including the mechanism's parameters (if any), toward participant computers. In some embodiments, the CMC outputs the mechanism information through its network interface and transmits it via the network; the participant computers then receive the mechanism information through their network interfaces and display the information to participants through their user interfaces.

The process then proceeds to Step 706, in which the submission window opens. In Step 708, the CMC obtains submissions comprising choices and requests from participants. In some embodiments, participants input their submissions through the user interfaces of participant computers, which then output the submissions through the computers' network interfaces and transmit the submissions via the network. The CMC then receives the submissions through its network interface for use in the next steps. The submissions comprise "choices" and/or "requests": "choices" are data that can directly be used as inputs into the choice mechanism; while "requests" are anything else (e.g., free-form text that will require interpretation by the AI model—and which the AI model will transform into "tentative choices"). In Step 710, the CMC separates out the "requests" from the "choices" in the obtained submissions and transmits the requests toward AI models. In some embodiments, the CMC outputs the requests through its network interface and transmits them via the network; the AI Computer(s) then receive the requests through their network interfaces. In Step 712, the AI models are prompted to transform the requests into tentative choices, and the resulting tentative choices are then transmitted toward the CMC. In some embodiments, the prompted AI models were fine-tuned using data from past mechanisms at Step 704. In some embodiments, the AI models are LLM models that were not specifically fine-tuned on data from past mechanisms. In some embodiments, the AI Computer(s) output the tentative choices through their network interfaces and transmits them via the network; the CMC then receives the tentative choices through its network interface.

In Step 714, the CMC applies constraints, if any, to choices (including tentative choices) and enters only those choices (including tentative choices) that satisfy said constraints. In a first preferred embodiment, the CMC applies a constraint on the number of schools that a participant in a school choice mechanism is permitted to rank in its submission. In a second preferred embodiment, the CMC applies a first constraint that limits a quantity submission to integer values, and a second constraint that limits a quantity submission to a value not greater than a supply of that product in an auction mechanism. In a third preferred embodiment, the CMC applies constraints based on the list of offices for which each participant is eligible to vote and on the number of votes for a given office that a participant in a voting mechanism is permitted to cast in its submission. In Step 716, the CMC provides feedback, if any, to participants as to the choices (including tentative choices) that were entered at Step 714. In some embodiments, the CMC outputs the feedback through its network interface and transmits it via the network; the participant computers then receive the feedback through their network interfaces and display the feedback to participants through their user interfaces. In some embodiments, this step also includes notifying participants when any of their choices were not entered at Step 714 because said choices did not satisfy constraints. In some preferred embodiments, this step also includes giving the participants opportunities to confirm that their tentative choices reflect the participants' intentions, to modify their tentative choices to better reflect their intentions, or to correct their choices that did not satisfy constraints.

The process then proceeds to Step 718, in which the submission window closes. In some preferred embodiments, this step also includes having the CMC convert the standing entered "tentative choices", at the time the submission window closes, into "choices" and merging them with the entered choices obtained at Step 708. Next, in Step 720, the CMC processes the choices to determine the outcome of the mechanism. In most embodiments, the choices processed in Step 720 would reflect only those choices that were entered at Step 714 (i.e., choices that did not satisfy the constraints would not be processed) and would reflect any modifications or corrections that participants were permitted to make to their choices (e.g., after the provision of feedback, if any, at Step 716). Some preferred embodiments of the process of Step 720 will be shown in greater detail in FIGS. 23A and 23B.

Finally, the process goes to Step 722, in which the CMC outputs a final message, including the outcome of the choice mechanism. In a first preferred embodiment, the final message comprises an assignment of students to schools and, if applicable, waiting lists for one or more schools. In a second preferred embodiment, the final message comprises the final prices of each product, a quantity of each product allocated to each bidder, and a payment associated with each bidder wherein the payment associated with a given bidder equals the dot product of the quantity vector of each product allocated to that bidder and the final vector of final prices for each product. In a third preferred embodiment, the final message is a list of the winner(s) of each office and the vote count for each candidate. In some embodiments, the CMC outputs the final message through its network interface and transmits it via the network; the participant computers and manager computers then receive the final message through their network interfaces and display the final message to participants and managers through their user interfaces. In other embodiments, the final message is outputted only toward manager computers, so that the people managing the choice mechanism can review the outcome before disclosing it to participants. The process then ends.

FIG. 20 is a flow diagram of a process in accordance with one embodiment. It describes using artificial intelligence to assist participation in a dynamic choice mechanism including, without limitation, a dynamic school choice mechanism, a dynamic auction mechanism, and a runoff election mechanism. Dynamic school choice mechanisms are described in Abdulkadiroglu and Sonmez (2003) and Chen and Kesten (2017). Dynamic auction mechanisms are described in Ausubel (2000). Runoff election mechanisms, in which the candidate with the most votes wins outright if she exceeds a threshold proportion of votes and in which a second round is held between the two candidates with the most first-round votes otherwise, are described in Bouton (2013). The process starts with Step 750, in which memory locations of a Choice Mechanism Computer (CMC) are initialized. In a first preferred embodiment, the appropriate memory locations of the CMC are initialized with mechanism information such as the names of the schools whose slots are options in the school choice mechanism, the number of available slots in each school, the criteria for which each school applies priorities (e.g., a maximum distance from the school or an older sibling already enrolled in the school), other information about each school, a mechanism timetable, a list of participant names, a list of their associated addresses, a list of their associated sibling status, a list of associated IDs, and a list of associated passwords. In a second preferred embodiment, the appropriate memory locations of the CMC are initialized with mechanism information such as the products in the auction mechanism, the available quantity of each product in the auction mechanism, other information about the products in the auction mechanism (e.g., if regional licenses are being offered for a plurality of regions, the population in each region), a mechanism timetable, a list of participant IDs, a list of associated passwords, and a list of associated initial quantity limits or value limits. In a third preferred embodiment, the appropriate memory locations of the CMC are initialized with mechanism information such as the names of the candidates in the voting mechanism, the offices for which they are running, other information about each candidate (e.g., their party) and each office (e.g, the number of positions being filled), a mechanism timetable, a list of participant IDs, a list of associated passwords, and a list of offices for which each participant is eligible to vote. In some embodiments, the mechanism information with which the appropriate memory locations of the CMC are initialized is obtained from manager computers.

The process continues with optional Step 752, in which at least one training data set is created from past implementations of a choice mechanism and then one or more AI models are trained or fine-tuned using said at least one data set. In some preferred embodiments, a training data set is created from the participant's own submissions in a similar choice mechanism; and in other preferred embodiments, a training data set is created from all participants' submissions in a similar choice mechanism. The process of pre-training and fine-tuning AI models has already been described in FIG. 4, and so Step 752 would incorporate some or all of the pre-training and fine-tuning activities described in FIG. 4. Next, in Step 754, the CMC establishes the initial parameters (if any). In a first preferred embodiment, the initial parameters are the number of available slots in each school. In a second preferred embodiment, the initial parameters are the starting prices for each product. In a third preferred embodiment, the initial parameters are the threshold proportions of votes required for each office. In Step 756, the CMC transmits mechanism information, including the current parameters (if any), toward participant computers. In some embodiments, the CMC outputs the mechanism information through its network interface and transmits it via the network; the participant computers then receive the mechanism information through their network interfaces and display the information to participants through their user interfaces.

The process then proceeds to Step 758, in which the submission window opens. In Step 760, the CMC obtains submissions comprising choices and requests from participants. In some embodiments, participants input their submissions through the user interfaces of participant computers, which then output the submissions through the computers' network interfaces and transmit the submissions via the network. The CMC then receives the submissions through its network interface for use in the next steps. The submissions comprise "choices" and/or "requests": "choices" are data that can directly be used as inputs into the choice mechanism; while "requests" are anything else (e.g., free-form text that will require interpretation by the AI model—and which the AI model will transform into "tentative choices"). Examples of "requests" will be shown in the first boxes of FIGS. 21A, 21B, 22A and 22B, respectively. In Step 762, the CMC separates out the "requests" from the "choices" in the obtained submissions and transmits the requests toward AI models. In some embodiments, the CMC outputs the requests through its network interface and transmits them via the network; the AI Computer(s) then receive the requests through their network interfaces. In Step 764, the AI models are prompted to transform the requests into tentative choices, and the resulting tentative choices are then transmitted toward the CMC. In some embodiments, the prompted AI models were fine-tuned using data from past mechanisms at Step 754. In some embodiments, the AI models are LLM models that were not specifically fine-tuned on data from past mechanisms. In some embodiments, context associated with the choice mechanism is included in the prompts to the AI models, together with the request. Examples of such context will be shown in the second boxes of FIGS. 21A, 21B, 22A and 22B, respectively. (Thus, in these examples, the prompts to the AI models would be based on a combination of the contents of the first and second boxes of these respective figures.) Examples of tentative choices produced by the AI model will be shown in the third boxes of FIGS. 21A, 21B, 22A and 22B, respectively. In some embodiments, the AI Computer(s) output the tentative choices through their network interfaces and transmits them via the network; the CMC then receives the tentative choices through its network interface.

In closely related embodiments, Step 764 could operate in similar fashion to Retrieval-Augmented Generation (RAG). The system could use a vector search function to retrieve the most relevant data from the set of mechanism information, taking care to avoid accessing other participants' choices to which this participant should not directly or indirectly have access. The system could then include this information in the prompt that is sent to the AI model. There are also other alternative embodiments that utilize embeddings in Step 764, instead of providing the context in the prompts to the AI model, since it is understood that one can obtain similar results by using embeddings as by using contextual prompts.

In Step 766, the CMC applies constraints, if any, to choices (including tentative choices) and enters only those choices (including tentative choices) that satisfy said constraints. In a first preferred embodiment, the CMC applies a constraint on the number of schools that a participant in a school choice mechanism is permitted to rank in its submission. In a second preferred embodiment, the CMC applies a first constraint that limits a quantity submission to integer values, a second constraint that limits a price submission to a value not less than a start-of-round price and not greater than a clock price for the associated product, and a third constraint that limits a quantity submission to a value not greater than a supply of that product in an auction mechanism. In a third preferred embodiment, the CMC applies constraints based on the list of offices for which each participant is eligible to vote and on the number of votes for a given office that a participant in a voting mechanism is permitted to cast in its submission. In Step 768, the CMC provides feedback, if any, to participants as to the choices (including tentative choices) that were entered at Step 766. In some embodiments, the CMC outputs the feedback through its network interface and transmits it via the network; the participant computers then receive the feedback through their network interfaces and display the feedback to participants through their user interfaces. In some embodiments, this step also includes notifying participants when any of their choices were not entered at Step 766 because said choices did not satisfy constraints. In some preferred embodiments, this step also includes giving the participants opportunities to confirm that their tentative choices reflect the participants' intentions, to modify their tentative choices to better reflect their intentions, or to correct their choices that did not satisfy constraints.

The process then proceeds to Step 770, in which the submission window closes. In some preferred embodiments, this step also includes having the CMC convert the standing entered "tentative choices", at the time the submission window closes, into "choices" and merging them with the entered choices obtained at Step 760. Next, in Step 772, the CMC processes the choices to determine the outcome of the round. In most embodiments, the choices processed in Step 772 would reflect only those choices that were entered at Step 766 (i.e., choices that did not satisfy the constraints would not be processed) and would reflect any modifications or corrections that participants were permitted to make to their choices (e.g., after the provision of feedback, if any, at Step 768). Some preferred embodiments of the process of Step 772 will be shown in greater detail in FIGS. 24A and 24B.

The process continues with Step 774, which is a command flow statement that junctions based on a determination of whether the mechanism should continue. In a first preferred embodiment, the determination is based on whether Steps 758 through 772 have executed the required number of times. In a second preferred embodiment, the determination is based on whether the aggregate demand for every product is no greater than the available supply. In a third preferred embodiment, the determination is based on whether the highest number of votes for each office exceeded the threshold proportion of votes for that office (or if the second, runoff round has already been completed).

If the mechanism should continue, the flow proceeds to Step 776, in which the CMC establishes updated parameters (if any). In a first preferred embodiment, the updated parameters are the number of available slots remaining in each school, after subtracting out the slots that were assigned at Step 772. In a second preferred embodiment, the updated parameters are a "start-of-round price" for each product, based upon the "posted price" determined at Step 772, and a "clock price" for each product, based upon a percentage increment above the start-of-round price. In a third preferred embodiment, the updated parameters are the names of the two candidates who received the most first-round votes, for any office in which the candidate with the most first-round votes failed to exceed the threshold proportion of votes for that office. Then, in Step 778, the CMC updates other mechanism information (if any), and the process returns to Step 756. If, instead, it was decided at Step 774 that the mechanism should not continue, the flow proceeds to Step 780.

Finally, at Step 780, the CMC outputs a final message, including the outcome of the choice mechanism. In many preferred embodiments, the outcome of the choice mechanism is given by the outcome of the round determined when Step 772 executed its final time. In a first preferred embodiment, the final message comprises an assignment of students to schools and, if applicable, waiting lists for one or more schools. In a second preferred embodiment, the final message comprises the final posted prices for each product, the final processed demands of each bidder, and a payment associated with each bidder wherein the payment associated with a given bidder equals the dot product of the final processed demand vector and the final price vector. In a third preferred embodiment, the final message is a list of the winner(s) of each office and the vote count for each candidate. In some embodiments, the CMC outputs the final message through its network interface and transmits it via the network; the participant computers and manager computers then receive the final message through their network interfaces and display the final message to participants and managers through their user interfaces. In other embodiments, the final message is outputted only toward manager computers, so that the people managing the choice mechanism can review the outcome before disclosing it to participants. The process then ends.

FIG. 21A depicts the exemplary transformation of a "request" into "tentative choices", as was described in FIG. 20. The exemplary submission in the first box of FIG. 21A is an example of a submission that might be obtained by a CMC implementing a spectrum auction, which is itself an example of a dynamic choice mechanism. The exemplary submission is: "I would like to place bids for 1 block in New York, Chicago, Baltimore-Washington, Philadelphia and Boston, so long as bids of up to $1.15 per MHz-pop are accepted in those markets." Observe that this submission comprises a "request", not "choices", as this submission is not interpretable by Choice Mechanism Computers in the art. By contrast, the computer system for choice mechanisms today has a user interface which displays each item number and each item name, and which provides a numeric box (i.e., a text box that accepts numerical values) or a dropdown for the participant to indicate a quantity and/or a price. Thus, the typical submissions that are interpretable by CMCs in the art are a set of one or more pairs of quantities and prices that are associated with the various items.

For a submission received in Round 17 of the spectrum auction, the second box of FIG. 21A shows an example of the relevant associated context. (This is an abbreviated subset of the actual data from FCC Auction 107, which was conducted in December 2020 to February 2021. The sixth column, labeled "$ per MHz-Pop", is calculated by taking the fifth column ("Round's Clock Price") and dividing it by the third column ("Population") and by 20, which is the number of MHz of spectrum associated with the items in this auction. The sixth column would not actually need to be provided as context to the AI model—it would be sufficient to provide the context that the items all comprise 20 MHz of spectrum—but the sixth column is included to provide clarity in this Specification.) Once provided with the context of the second box of FIG. 21A, the AI model would be able to transform the submission into a set of one or more tentative choices (i.e., perform Step 764, or the very similar Step 712). In FIG. 21A, all of the prices are well below the $1.15 per MHz-Pop threshold specified in the submission, so the tentative choices shown in the third box are the appropriate Round's Clock Prices for each of New York, Chicago, Baltimore-Washington, Philadelphia and Boston.

FIG. 21B displays the same exemplary submission (first box), but now in the context of Round 42 of the same spectrum auction (second box). The AI model would now find that the prices for New York, Philadelphia and Boston are still below the $1.15 per MHz-Pop threshold, so it would select the Round's Clock Price for these three markets. It would also find that the Round's Opening Price (the lowest price that can be bid in Round 42) for Chicago is less than $1.15 per MHz-Pop, but the Round's Clock Price for Chicago is greater than $1.15 per MHz-Pop. Therefore, it uses a price of $215,434,400 (which equates to $1.15 per MHz-Pop). Finally, it would find that the Round's Opening Price (the lowest price that can be bid in Round 42) for Baltimore-Washington is greater than $1.15 per MHz-Pop. The resulting tentative choices are shown in the third box.

Observe that the exemplary submission of FIG. 21A-21B serves as a very effective "advance bidding" tool (i.e., instructions that the participant can enter once and then be applied in each round of the choice mechanism, without change). The participant who is interested only in these five markets and only at prices not exceeding $1.15 per MHz-Pop, could submit these instructions in Round 1, with the stipulation that they should be applied in every round. The computer system would then obtain, for this participant, every one of these licenses that the participant wants, only raising the price as much as necessary. While there do exist Choice Mechanism Computers in the art that possess this advance bidding capability, they do not have the ability to interpret plain-text requests. The important advantages of the CMC being able to work with plain-text requests are: (1) it makes inputting submissions simpler and quicker for the participant; (2) it provides an advance instruction capability that is more flexible (and hence that is more useful for participants); and (3) it economizes on software development expenses, as it does not require extensive custom programming to add new cases of advance instructions.

FIG. 22A demonstrates the versatility of this approach by depicting the exemplary transformation of a richer "request" into "tentative choices". The exemplary submission in the first box of FIG. 22A is an example of a submission that might be obtained by a CMC implementing a spectrum auction, which is itself an example of a dynamic choice mechanism. The exemplary submission is: "I would like to place bids for 1 block at this round's clock price for the 8 largest markets whose clock price does not exceed $1.15 per MHz-pop." Observe that, just as in FIG. 21A, this submission comprises a "request", not "choices", as this submission is not interpretable by Choice Mechanism Computers in the art. For a submission received in Round 17 of the spectrum auction, the second box of FIG. 22A shows an example of the relevant associated context. This is the exact same contextual information as in the second box of FIG. 21A.

Once provided with the context of the second box of FIG. 22A, the AI model would be able to transform the submission into a set of one or more tentative choices (i.e., perform Step 764, or the very similar Step 712). In FIG. 22A, all of the prices are well below the $1.15 per MHz-Pop threshold specified in the submission, so the tentative choices shown in the third box are the appropriate Round's Clock Prices for each of the eight largest markets.

FIG. 22B displays the same exemplary submission (first box), but now in the context of Round 42 of the same spectrum auction (second box). The AI model would now find that the Round's Clock Prices for Los Angeles, Chicago, San Francisco and Baltimore-Washington had gone above the $1.15 per MHz-Pop threshold, so it would instead switch to Miami, Houston, Detroit and Orlando (skipping the pricey Atlanta). The resulting tentative choices are shown in the third box.

The exemplary transformations of "requests" into "tentative choices" shown in FIGS. 21A, 21B, 22A and 22B are certainly not exhaustive. First, within the context of auction mechanisms, recall that the processes depicted in FIGS. 14 and 15 for bidding on interventions are themselves exemplary of transforming requests into tentative choices. For example, if a participant's submission indicated a value for intervening on "kids shoes", the AI model is able to construct a set of other choices: certainly a value for "shoes for kids", and probably also for "toddler shoes", "kids sneakers", "kids sandals", and "babies first shoes".

Moreover, transformations of "requests" into "tentative choices" are also useful for school choice mechanisms and for voting mechanisms. For example, a participant in a school choice mechanism may have only had time to investigate and rank five out of 40 possible schools. So the participant might indicate that its first choice is School #31, its second choice is School #29, its third choice is School #5, its fourth choice is School #25, and its fifth choice School #14. (These are all "choices", as defined above, since this part of the submission is directly interpretable by the CMC.) In addition, the participant might include in its submission the following request: "The schools that I have ranked are my top five choices. The remaining schools should be ranked as follows: Place a 40% weight on the school system's rating for each school, a 20% weight on each school's performance on the tenth-grade standardized math examination, and a 40% weight on the time it takes to get from my house at 123 Cherry Lane to each school (where closer is better)."

The latter part of this submission is not interpretable by Choice Mechanism Computers in the art. Nonetheless, by inserting this request, the participant has provided a very concise and sensible customized ranking of the remaining 35 schools. Without providing this request—and only ranking five schools—the participant may have run a serious risk of not getting matched at all. With all schools ranked, the participant is almost certain to get matched with one of the schools, and the exemplary request makes it likely that the participant will still be matched with a school that both is nearby and provides a solid math curriculum.

Now consider a participant in a voting mechanism who only has a clear preference on the candidates for the four most important offices. Then the participant's submission might be: "Cast my vote for Robert Grey, Samantha Green, William White, and Alexandra Orange. For the remaining offices vote for the candidate endorsed by the Washington Post." Or the participant's submission might be: "Cast my vote for Robert Grey, Samantha Green, William White, and Alexandra Orange. For the remaining offices vote for the Democratic Party's candidate." Each of these exemplary submissions consists of a first part that comprises choices and a second part that comprises a request. These exemplary submissions may well capture the manner in which many voters cast their votes in conventional voting booths today. And, in the inventive method and system, these voting preferences can be expressed with just two lines of text.

FIG. 23A details the process by which the CMC processes choices to determine the outcome (Step 720 of FIG. 19) in accordance with an exemplary non-limiting embodiment of a static school choice mechanism. (This figure also details the process by which the CMC processes choices to determine the outcome of a round (Step 772 of FIG. 20) in accordance with an exemplary non-limiting embodiment of a dynamic school choice mechanism. Any differences in its application to Step 772 would be relatively minor and would be apparent to someone skilled in the art and therefore will be omitted for the sake of brevity.) In FIG. 23A, the static school choice mechanism that is implemented is the Gale-Shapley Deferred Acceptance mechanism (Gale and Shapley, 1962). The "choices" that are processed are rankings of schools by every student. The process enters Step 720a-1 from Step 718. In Step 720a-1, for each student who does not have an "offer" being held by any school, the CMC distributes offers to the student's highest-ranked school that has not already rejected the student, if any such school remains. (In the first iteration, the CMC distributes offers to every student's first-choice school.) The process proceeds to Step 720a-2, in which the CMC considers one of the schools that it has not previously considered. It continues to Step 720a-3, in which the CMC sorts the students who have made offers to the considered school in descending order of the school's formulaic preferences. In preferred embodiments, ties are broken using random numbers. It then proceeds to Step 720a-4, in which, if the school has m slots but if n>m offers have been made to the school, the CMC "rejects" all but the top m students in the sort (i.e., the students who rank the lowest in the school's formulaic preferences). It then proceeds to Step 720a-5, which checks if all schools have been considered. If they have not, the process returns to Step 720a-2 for another school. Otherwise, the process proceeds to Step 720a-6, which checks if there are any unmatched students who can still make offers (i.e., students who do not have an offer being held by any school, but for whom at least one school remains in their rankings that has not already rejected the student). If there are any such students, the process returns to Step 720*a*-1. Otherwise, the flow exits to Step 722. At this point, all students who have offers being held by a given school are assigned to the given school, and all students who do not have offers being held by any school are treated as unassigned.

FIG. 23B details the process by which the CMC processes choices to determine the outcome (Step 720 of FIG. 19) in accordance with an exemplary non-limiting embodiment of a static auction mechanism. In FIG. 23B, the mechanism that is implemented is a sealed-bid multi-unit auction mechanism for a homogeneous good such as Treasury bills. The "choices" that are processed are one or more bids (i.e., price-quantity pairs) by each bidder. The supply of items that need to be allocated is denoted by S. The process enters Step 720*b*-1 from Step 718. In Step 720*b*-1, the CMC sorts the bids in descending order of price. The process continues to Step 720*b*-2, in which $Q^+(p)$, defined to be the total quantity demanded in all bids at prices strictly above p, and $Q(p)$, defined to be the total quantity demanded in all bids at a price of exactly p, are calculated. Next, the flow proceeds to Step 720*b*-3 in which the CMC determines the price P such that $Q^+(P) < S \leq Q^+(P) + Q(P)$. The process then continues to Step 720*b*-4, in which the CMC determines the winning bids. In many preferred embodiments, each bid at a price strictly greater than P is deemed to be a winning bid, while each bid at a price of exactly P is rationed so that only proportion $[S-Q^+(P)]/Q(P)$ of that bid is deemed to be a winning bid. Next, the process proceeds to Step 720*b*-5, in which the CMC determines the winning price associated with each winning bid. In some exemplary embodiments, the winning price associated with all winning bids is deemed to be the price P determined at Step 720*b*-3. Such embodiments are referred to as "uniform-price" auctions. In other exemplary embodiments, the winning price associated with each winning bid is deemed to be the price that was included within the bid. Such embodiments are referred to as "pay-as-bid" auctions. After Step 720*b*-5, the flow exits to Step 722.

FIG. 24A details the process by which the CMC processes choices to determine the outcome of a round (Step 772 of FIG. 20) in accordance with an exemplary non-limiting embodiment of a dynamic auction mechanism. In FIG. 24A, the mechanism that is implemented is an ascending clock auction mechanism for one or more "products" (where "products" are defined as "types" of items). The "choices" by each bidder that are processed are bids (i.e., price-quantity pairs) for one or more products. The price can be the start-of-round price, the clock price, or any price in between (an "intra-round bid"). The supply of a given product is denoted by S. The "price point" indicates the percentage of the distance that a bid price is between the start-of-round price and the clock price. Specifically, the price point associated with a bid price or a bid equals the following ratio: [bid price–start-of-round price]/[clock price–start-of-round price].

The process enters Step 772*c*-1 from Step 770. In Step 772*c*-1, the CMC adds missing bids, adds a random number to each bid, and computes the price point associated with each bid. For each product for which the bidder had positive processed demand in the previous round, if the bidder did not submit a bid for that product during the current round, the CMC will add a "missing bid" for the bidder for that product with a quantity of zero at the start-of-round price. The random number comes from a pseudorandom number generator on the CMC and the price point is computed as the above ratio. The process continues to Step 772*c*-2, in which the CMC applies all bids by all bidders to maintain the previous round's processed demand at the clock price. Next, in Step 772*c*-3, the CMC sorts the remaining bids (i.e., the bids that have not yet been applied) in ascending order of price point and in descending order of random number. When the CMC first reaches Step 772*c*-5, it will start at the top by considering the first bid, if any, in the sort order. In subsequent iterations of Step 772*c*-5, the CMC will sequentially consider the subsequent bids in the sort order. The flow proceeds to Step 772*c*-4, which is a command flow statement that junctions based upon whether there are more bids remaining to consider. If there are not any more bids to consider, the process jumps to Step 772*c*-15. Otherwise, the flow continues to Step 772*c*-5, in which the CMC considers the next bid and applies the considered bid to the maximum extent possible, subject to constraints. Typical constraints in exemplary embodiments include: a bid to decrease quantity is applied only to the extent that it does not cause aggregate demand to decrease to a quantity less than the supply S; and a bid to increase quantity is applied only to the extent that it does not cause the bidder's processed activity to exceed the bidder's eligibility for the round. The flow then proceeds to Step 772*c*-6, which junctions based upon whether the considered bid was applied in full. If it was applied in full, the flow jumps to Step 772*c*-9. Otherwise, it proceeds to Step 772*c*-7, in which the CMC adds the part of the bid that was not applied (which in some situations will be the entire bid) to the "rejection queue". Next the flow proceeds to Step 772*c*-8, which junctions based upon whether the considered bid was applied in part. If it was applied in part, the flow proceeds to Step 772*c*-9; if it was not applied at all, it returns to Step 772*c*-4.

In Step 772*c*-9, the CMC sorts the rejection queue in ascending order of price point and in descending order of random number. When the CMC next reaches Step 772*c*-11, it will start at the top by considering the first bid, if any, in the sort order of the rejection queue. In subsequent iterations of Step 772*c*-11, the CMC will sequentially consider subsequent bids in the sort order. The flow proceeds to Step 772*c*-10, which is a command flow statement that junctions based on whether there are more bids in the rejection queue to consider. If there are not any more bids to consider, the process returns to Step 772*c*-4. Otherwise, the flow continues to Step 772*c*-11, in which the CMC considers the next bid in the rejection queue and applies the considered bid to the maximum extent possible, subject to constraints. Typical constraints in exemplary embodiments include: a bid to decrease quantity is applied only to the extent that it does not cause aggregate demand to decrease to a quantity less than the supply S; and a bid to increase quantity is applied only to the extent that it does not cause the bidder's processed activity to exceed the bidder's eligibility for the round. The flow then proceeds to Step 772*c*-12, which junctions based upon whether the considered bid was applied in full. If it was applied in full, the bid is deleted from the rejection queue and the flow returns to Step 772*c*-9. Otherwise, it proceeds to Step 772*c*-13, in which the CMC leaves the part of the bid that was not applied (which in some cases will be the entire bid) in the rejection queue. Next the flow proceeds to Step 772*c*-14, which junctions based upon whether the considered bid was applied in part. If it was applied in part, the flow returns to Step 772*c*-9; if it was not applied at all, it returns to Step 772*c*-10.

At Step 772c-15, the CMC determines "posted prices" for each product, based upon processed demand and the bids that were applied at Steps 772c-5 and 772c-11. The term "processed demand" refers to the demand of a given bidder that resulted after all iterations of Steps 772c-5 and 772c-11, and the term "aggregate demand" for a product refers to the processed demand summed over all bidders. If aggregate demand exceeds supply for a product, the posted price equals the clock price for the round. If aggregate demand equals supply and at least one bid to reduce demand for the product was applied (either in full or in part) in Steps 772c-5 or 772c-11, the posted price equals the highest bid price among all bids to reduce demand for the product that were applied (either in full or in part). In other words, the posted price is the price at which a reduction caused aggregate demand to equal supply. In all other cases, the posted price equals the start-of-round price for the round (i.e., the posted price of the previous round). After Step 772c-15, the flow exits to Step 774.

FIG. 24B details the process by which the CMC processes choices to determine the outcome of a round (Step 772 of FIG. 20) in accordance with an exemplary non-limiting embodiment of a dynamic voting mechanism. (This figure also details the process by which the CMC processes choices to determine the outcome (Step 720 of FIG. 19) in accordance with an exemplary non-limiting embodiment of a static voting mechanism. Any differences in its application to Step 720 would be relatively minor and would be apparent to someone skilled in the art and therefore will be omitted for the sake of brevity.) In FIG. 24B, the mechanism that is implemented is a runoff election mechanism. The "choices" that are processed are votes for one or more candidates by each voter. The process enters Step 772d-1 from Step 770. In Step 772d-1, the CMC distributes the votes to the respective candidates seeking each office. The process continues with Step 772d-2, which is a command flow statement that junctions based on whether it is the first voting round or the second voting round. If it is the first voting round, the flow proceeds to Step 772d-3, in which the highest number of votes for each office, the associated candidate, and the total number of votes for each office is identified. Next, in Step 772d-4, the CMC considers an office that has not yet been considered. The flow continues with Step 772d-5, which is a command flow statement that junctions based on whether the highest number of votes divided by the total number of votes exceeds the threshold proportion of votes required for that office. If the highest number of votes divided by the total number of votes exceeds the threshold proportion of votes, the flow proceeds to Step 772d-6, in which the associated candidate is deemed the winner for that office. Otherwise, the flow proceeds to Step 772d-7, in which the second-highest number of votes for the office and the associated candidate is identified; the two candidates associated with the highest and the second-highest numbers of votes are deemed to proceed to the second round. Following Steps 772d-6 and 772d-7, the process proceeds to Step 772d-8, which is a command flow statement that junctions based on whether all offices have been considered. If not all offices have been considered, the process returns to Step 772d-4. If all offices have been considered, the flow exits to Step 774.

If it is the second voting round, the flow proceeds to Step 772d-9, in which the highest number of votes for each office and the associated candidate is identified. Next, in Step 772d-10, the candidate associated with the highest number of votes for each office is deemed the winner for that office. After Step 772d-10, the flow exits to Step 774.

Figure 25:
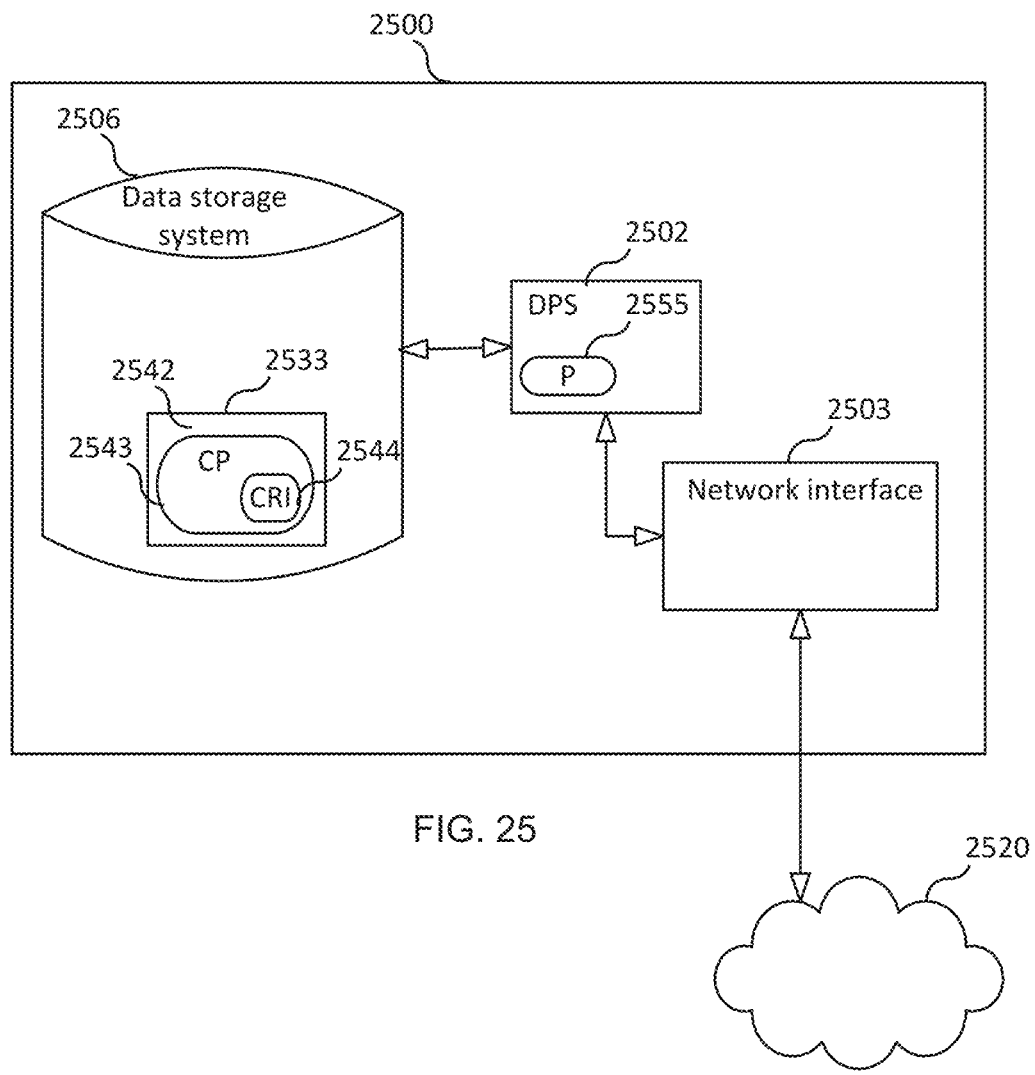
FIG. 25 is a block diagram illustrating a device, according to some embodiments.
Figure 26:
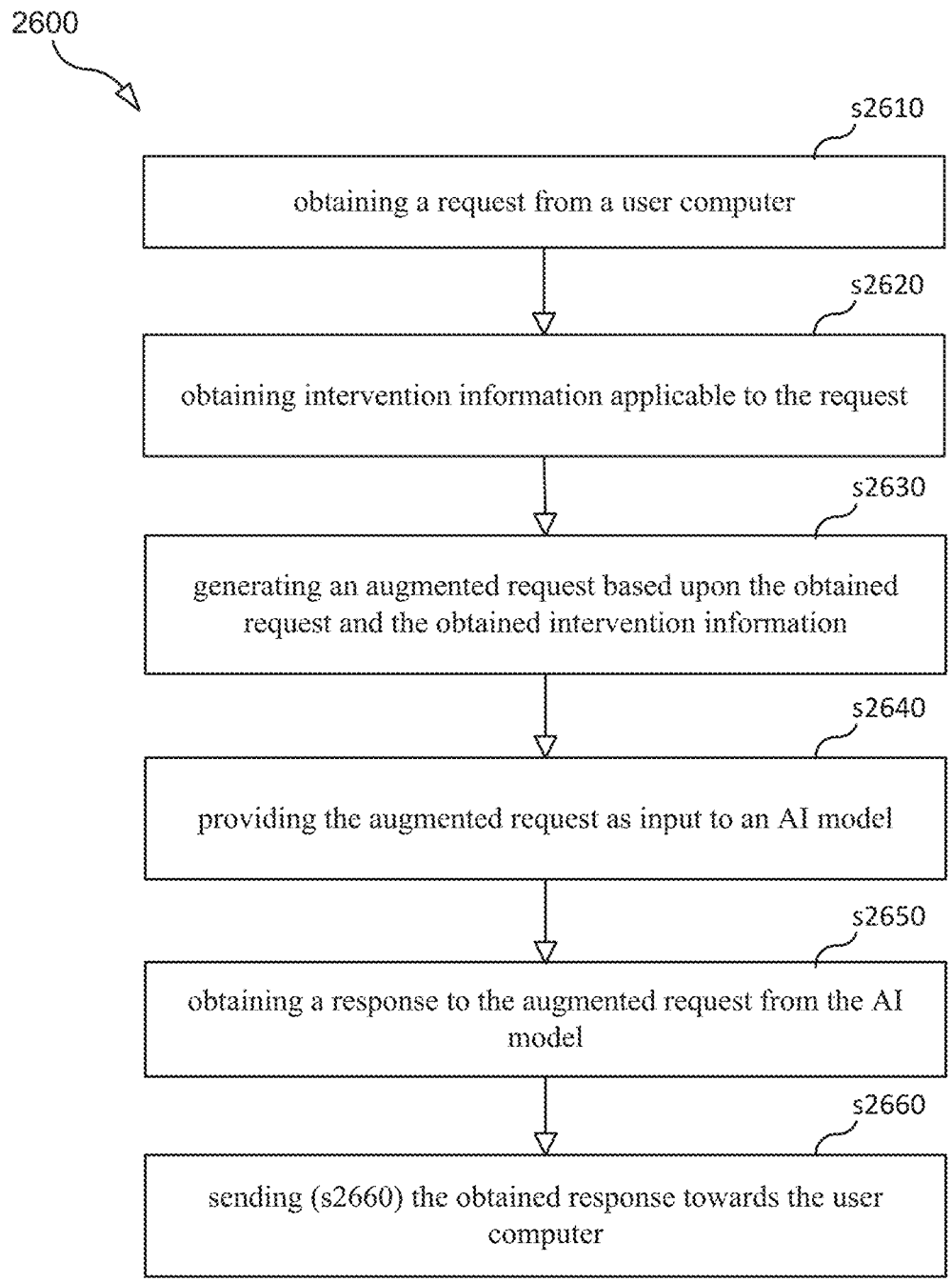
FIG. 26 illustrates a method, according to some embodiments.

FIG. 25 is a block diagram illustrating a device, according to some embodiments. As shown in FIG. 25, device 2500 may comprise: a data processing system (DPS) 2502, which may include one or more processors 2555 (e.g., a general purpose microprocessor and/or one or more other data processing circuits, such as an application specific integrated circuit (ASIC), field-programmable gate arrays (FPGAs), and the like); a network interface 2503 for use in connecting device 2500 to network 2520; and local storage unit (a.k.a., "data storage system") 2506, which may include one or more non-volatile storage devices and/or one or more volatile storage devices (e.g., random access memory (RAM)). In embodiments where device 2500 includes a general purpose microprocessor, a computer program product (CPP) 2533 may be provided. CPP 2533 includes a computer readable medium (CRM) 2542 storing a computer program (CP) 2543 comprising computer readable instructions (CRI) 2544. CRM 2542 may be a non-transitory computer readable medium, such as, but not limited to, magnetic media (e.g., a hard disk), optical media (e.g., a DVD), memory devices (e.g., random access memory), and the like. In some embodiments, the CRI 2544 of computer program 2543 is configured such that when executed by data processing system 2502, the CRI causes the device 2500 to perform steps described above (e.g., steps described above with reference to the flow charts). In other embodiments, device 2500 may be configured to perform steps described herein without the need for code. That is, for example, data processing system 2502 may consist merely of one or more ASICs. Hence, the features of the embodiments described herein may be implemented in hardware and/or software FIG. 26 illustrates a method, according to some embodiments. Method 2600 is for intervening in an artificial intelligence (AI) model. Step s2610 of the method includes obtaining a request from a user computer. Step s2620 of the method includes obtaining intervention information applicable to the request. Step s2630 of the method includes generating an augmented request based upon the obtained request and the obtained intervention information. Step s2640 of the method includes providing the augmented request as input to an AI model. Step s2650 of the method includes obtaining a response to the augmented request from the AI model. Step s2660 of the method includes sending the obtained response towards the user computer.

Figure 27:
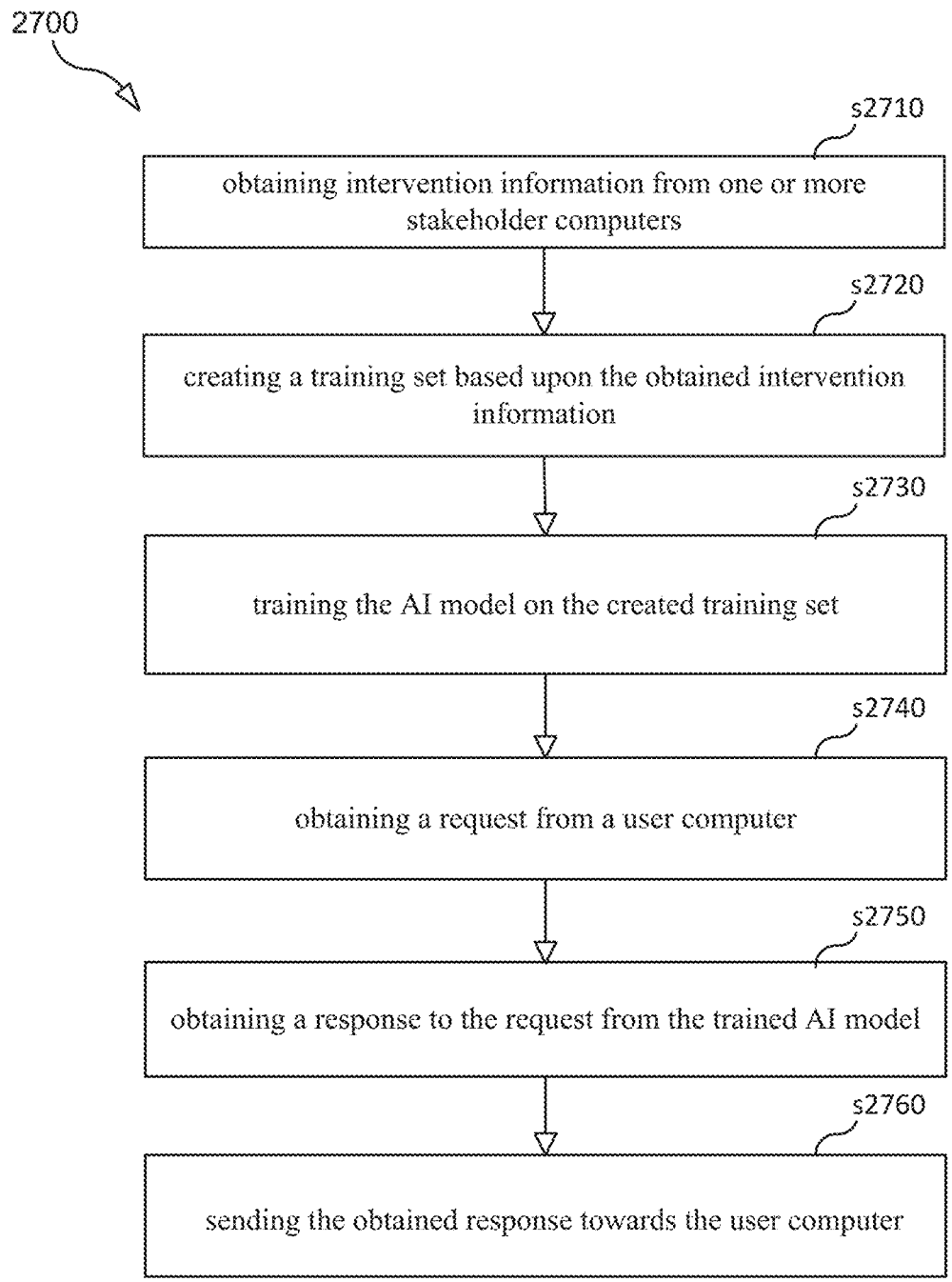
FIG. 27 illustrates a method, according to some embodiments.

FIG. 27 illustrates a method, according to some embodiments. Method 2700 is for intervening in an artificial intelligence (AI) model. Step s2710 includes obtaining intervention information from one or more stakeholder computers. Step s2720 includes creating a training set based upon the obtained intervention information. Step s2730 includes training the AI model on the created training set. In some embodiments, training may encompass pre-training and or fine-tuning an AI model. Step s2740 of the method includes obtaining a request from a user computer. Step s2750 of the method includes obtaining a response to the request from the trained AI model. Step s2760 of the method includes sending the obtained response towards the user computer.

Figure 28:
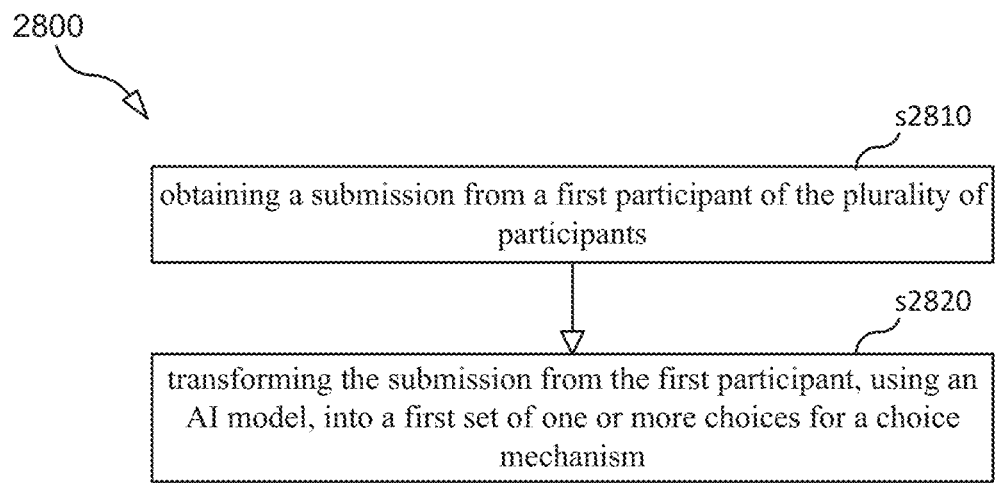
FIG. 28 illustrates a method, according to some embodiments.

FIG. 28 illustrates a method, according to some embodiments. Method 2800 is for utilizing an artificial intelligence (AI) model to facilitate a choice mechanism among a plurality of participants. Step s2810 of the method includes obtaining a submission from a first participant of the plurality of participants. Step s2820 of the method includes transforming the submission from the first participant, using an AI model, into a first set of one or more choices for a choice mechanism.

Figure 29:
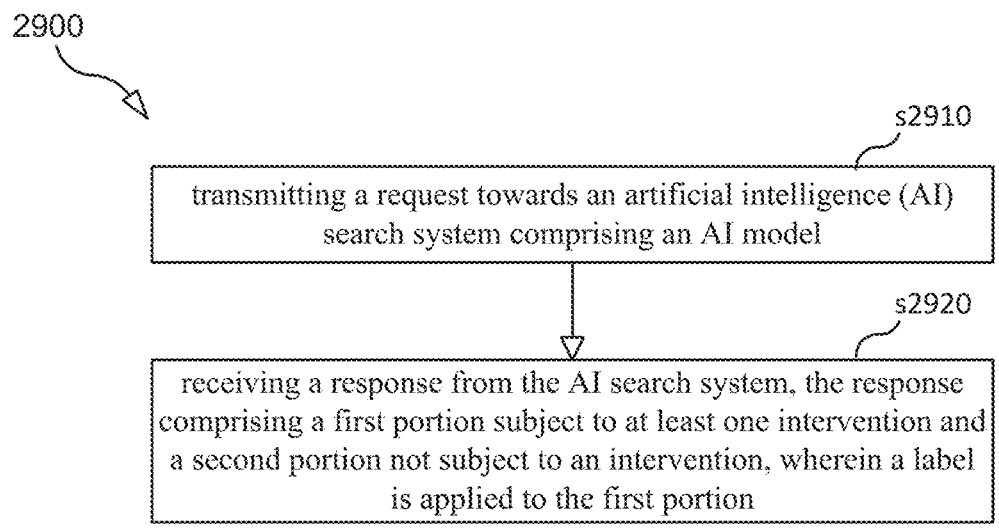
FIG. 29 illustrates a method, according to some embodiments.

FIG. 29 illustrates a method, according to some embodiments. Method 2900 is for intervening in an artificial intelligence model. Step s2910 of the method includes transmitting a request towards an artificial intelligence (AI) search system comprising an AI model. Step s2920 of the method includes receiving a response from the AI search system, the response comprising a first portion subject to at least one intervention and a second portion not subject to an intervention, wherein a label is applied to the first portion.

Figure 30:
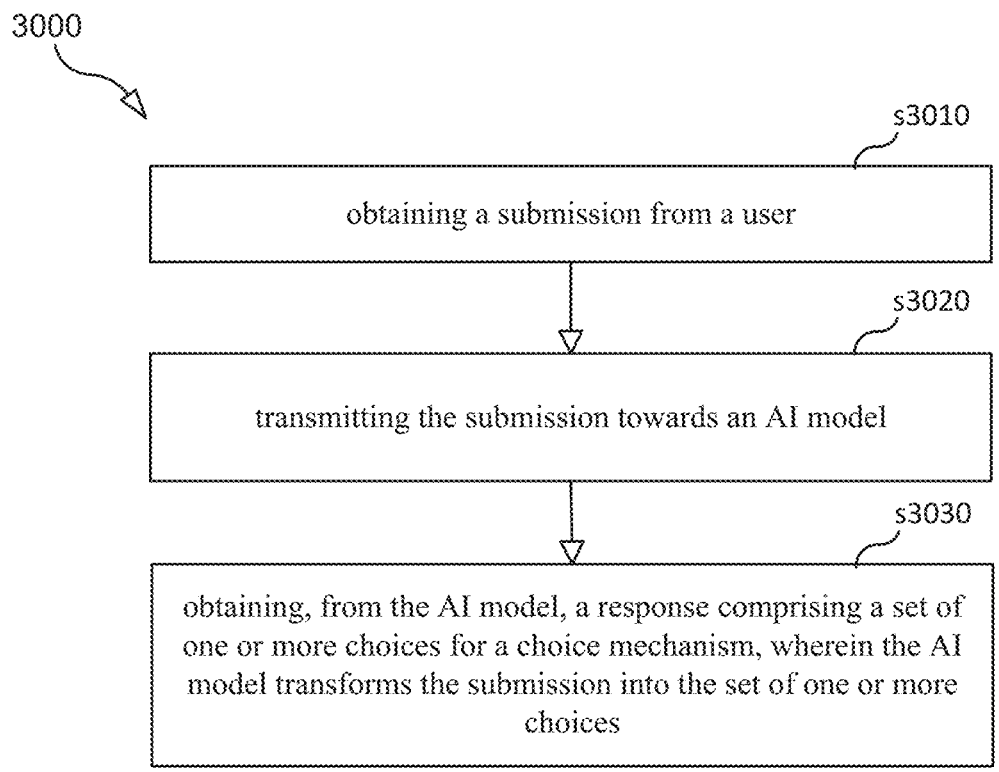
FIG. 30 illustrates a method, according to some embodiments.

FIG. 30 illustrates a method, according to some embodiments. Method 3000 is for utilizing an artificial intelligence (AI) model to facilitate a choice mechanism among a plurality of participants. Step s3010 of the method includes obtaining a submission from a user. Step s3020 of the method includes transmitting the submission towards an AI model. Step s3030 of the method includes obtaining, from the AI model, a response comprising a set of one or more choices for a choice mechanism, wherein the AI model transforms the submission into the set of one or more choices.

While at least one exemplary embodiment has been presented in the foregoing detailed description, it should be appreciated that a vast number of variations exist. It should also be appreciated that the exemplary embodiment or embodiments described herein are only examples and are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims, which includes known equivalents and foreseeable equivalents at the time of filing this patent application.

REFERENCES

Abdulkadiroglu, A. and T. Sonmez (2003), "School Choice: A Mechanism Design Approach," American Economic Review, Vol. 93, pp. 729-747.

Ausubel, L. (2000), "System and Method for an Efficient Dynamic Auction for Multiple Objects," U.S. Pat. No. 6,026,383.

Bouton, L. (2013), "A Theory of Strategic Voting in Runoff Elections," American Economic Review, Vol. 103, pp. 1248-1288.

Chan, W., S. Agarwal, R. Ranganath, L. R. Wiseman, and D. Jindal (2022), "Method and System for Mining Image Searches to Associate Images with Concepts," U.S. Pat. No. 11,409,812.

Chen, Y. and O. Kesten (2017), "Chinese College Admissions and School Choice Reforms: A Theoretical Analysis," Journal of Political Economy, Vol. 125, pp. 99-139.

Davis, D., M. Derer, J. Garcia, L. Greco, T. Kurt, T. Kwong, J. Lee, K. Lee, P. Pfarner, and S. Skovran (2001), "System and Method for Influencing a Position on a Search Result List Generated by a Computer Network Search Engine," U.S. Pat. No. 6,269,361.

Edelman, B., M. Ostrovsky, and M. Schwarz (2007) "Internet Advertising and the Generalized Second Price Auction: Selling Billions of Dollars Worth of Keywords," American Economic Review, Vol. 97, pp. 242-259.

Fain, D. and J. Pedersen (2006) "Sponsored Search: A Brief History," Bulletin of the American Society for Information Science and Technology, pp. 12-13.

Fallows, D. (2005), "Search Engine Users," Pew Internet & American Life Project of the Pew Research Center.

Federal Trade Commission, "Blurred Lines: An Exploration of Consumers' Advertising Recognition in the Contexts of Search Engines and Native Advertising," FTC Staff Report, December 2017.

Gale, D. and L. Shapley (1962), "College Admissions and the Stability of Marriage," American Mathematical Monthly, Vol. 69, pp. 9-15.

Grant, N., "Google Devising Radical Search Changes to Beat Back A.I. Rivals," The New York Times, Apr. 16, 2023.

Grant, N. and C. Metz, "A New Chat Bot Is a 'Code Red' for Google's Search Business," The New York Times, Dec. 21, 2022.

Hansen, E. (2002), "FTC Wants Paid Search to Shape Up," CNET, Aug. 2, 2002.

Jansen, B. and T. Mullen (2008), "Sponsored Search: An Overview of the Concept, History, and Technology," Int. J. Electronic Business, Vol. 6, No. 2.

Komo, A. and L. Ausubel (2020), "System and Method for Cryptographic Choice Mechanisms," U.S. Pat. No. 10,872,487.

Lewis, P., E. Perez, A. Piktus, F. Petroni, V. Karpukhin, N. Goyal, H. Küttler, M. Lewis, W. Yih, T. Rocktäschel, S. Riedel, and D. Kiela (2020), "Retrieval-Augmented Generation for Knowledge-Intensive NLP Tasks," Proceedings of the $34^{th}$ International Conference on Neural Information Processing Systems (NIPS '20). URL https://arxiv.org/pdf/2005.11401.pdf.

Tibken, S. (2013), "FTC to Search Engines: Make it Clear Which Results are Ads," CNET, Jun. 25, 2013.

Varian, H. (2007), "Position Auctions," International Journal of Industrial Organization, Vol. 25, pp. 1163-1178.

Vaswani, A., N. Shazeer, N. Parmar, J. Uszkoreit, L. Jones, A. Gomez, L. Kaiser, and I. Polosukhin (2017), "Attention is All You Need," Proceedings of the $31^{st}$ International Conference on Neural Information Processing Systems (NIPS '17). URL https://arxiv.org/abs/1706.03762.

The invention claimed is:

1. A computer-implemented method for intervening in an artificial intelligence (AI) model, the method comprising:
   obtaining a first prompt from a user computer, the first prompt comprising first data;
   providing the first prompt as input to a first AI model, wherein the first AI model is configured to output keywords based on the input to the first AI model;
   obtaining a first response to the first prompt from the first AI model, wherein the first response comprises a set of one or more keywords;
   using i) the set of keywords included in the first response to the first prompt from the first AI model and ii) a database associating intervention information with keywords to obtain from the database first intervention information associated with one or more of the keywords included in the set of keywords;
   generating second data using the first intervention information that was obtained from the database using the set of keywords included in the first response to the first prompt from the first AI model;
   generating a second prompt by combining or concatenating the first data and the second data generated using the first intervention information that was obtained from the database using the set of keywords included in the first response to the first prompt from the first AI model;

providing as input to a second AI model the second prompt generated from the first data from the first prompt and the second data generated using the first intervention information that was obtained from the database using the set of keywords included in the first response to the first prompt from the first AI model;

obtaining a second response to the second prompt from the second AI model; and sending the second response towards the user computer, wherein the second AI model comprises at least a first transformer model, the method further comprises a model training or fine-tuning process that comprises: feeding preprocessed data to the first transformer model, calculating a loss, and using the calculated loss to update parameters of the first transformer model, and the model training or fine-tuning process is iterated at least twice.

2. The method of claim 1, wherein
using i) the set of keywords included in the first response to the first prompt from the first AI model and ii) the database to obtain intervention information from the database comprises using the set of keywords to retrieve the first intervention information from the database.

3. The method of claim 1, further comprising, prior to obtaining the first intervention information using the set of keywords:
obtaining from a stakeholder computer the first intervention information; and
adding the first intervention information to the database.

4. The method of claim 1, wherein the first intervention information is based upon or comprises a rating and/or a comment.

5. The method of claim 1, wherein the first intervention information is based upon or comprises a bid.

6. The method of claim 1, wherein
a first weight is associated with the first intervention information, and
the first weight indicates an amount by which the second data is to be weighted by the second AI model.

7. The method of claim 6, further comprising incorporating the first weight into the second prompt.

8. The method of claim 7, further comprising:
incorporating into the second prompt a second weight for organic information contained in the second AI model, wherein the organic information comprises information available to the second AI model in response to the first prompt.

9. The method of claim 1, further comprising:
identifying a first portion of the second response comprising an option associated with the first intervention information and a second portion of the second response comprising an option not associated with the first intervention information; and
applying a first label to the first portion of the second response and a second label to the second portion of the second response before sending the second response towards the user computer.

10. The method of claim 9, wherein the first label comprises:
a first color different from a second color used in the second label,
a first typeface different from a second typeface used in the second label,
a first symbol different from a second symbol used in the second label, and/or
a first text character different from a second text character used in the second label.

11. The method of claim 10, wherein the first portion of the second response comprises a hyperlink associated with the option associated with the first intervention information.

12. The method of claim 1, wherein the second AI model is a large language model.

13. The method of claim 1, further comprising:
masking the second prompt from the user computer.

14. The method of claim 1, wherein the first prompt is a search request.

15. The method of claim 1, wherein the second AI model is comprised in a search engine system.

16. An apparatus for intervening in an artificial intelligence (AI) model, the apparatus comprising:
processing circuitry; and
memory storing instructions, executable by the processing circuitry, for configuring the apparatus to perform a method comprising:
obtaining a first prompt from a user computer, the first prompt comprising first data;
providing the first prompt as input to a first AI model, wherein the first AI model is configured to output keywords based on the input to the first AI model;
obtaining a first response to the first prompt from the first AI model, wherein the first response comprises a set of one or more keywords;
using i) the set of keywords included in the first response to the first prompt from the first AI model and ii) a database associating intervention information with keywords to obtain from the database first intervention information associated with one or more of the keywords included in the set of keywords;
generating second data using the first intervention information that was obtained from the database using the set of keywords included in the first response to the first prompt from the first AI model;
generating a second prompt by combining or concatenating the first data and the second data generated using the first intervention information that was obtained from the database using the set of keywords included in the first response to the first prompt from the first AI model;
providing as input to a second AI model the second prompt generated from the first data from the first prompt and the second data generated using the first intervention information that was obtained from the database using the set of keywords included in the first response to the first prompt from the first AI model;
obtaining a second response to the second prompt from the second AI model; and
sending the second response towards the user computer, wherein
the second AI model comprises at least a first transformer model,
the method further comprises a model training or fine-tuning process that comprises: feeding preprocessed data to the first transformer model, calculating a loss, and using the calculated loss to update parameters of the first transformer model, and
the model training or fine-tuning process is iterated at least twice.

17. The apparatus of claim 16, wherein
using i) the set of keywords included in the first response to the first prompt from the first AI model and ii) the database to obtain intervention information from the database comprises using the set of keywords to retrieve the first intervention information from the database.

18. The apparatus of claim 16, wherein the method further comprises, prior to obtaining the first intervention information using the set of keywords:
   obtaining from a stakeholder computer the first intervention information; and
   adding the first intervention information to the database.

19. The apparatus of claim 16, wherein the first intervention information is based upon or comprises a rating and/or a comment.

20. The apparatus of claim 16, wherein the first intervention information is based upon or comprises a bid.

21. The apparatus of claim 16, wherein
   a first weight is associated with the first intervention information, and
   the first weight indicates an amount by which the second data is to be weighted by the second AI model.

22. The apparatus of claim 21, wherein the method further comprises
   incorporating the first weight into the second prompt.

23. The apparatus of claim 22, wherein the method further comprises:
   incorporating into the second prompt a second weight for organic information contained in the second AI model, wherein the organic information comprises information available to the second AI model in response to the first prompt.

24. The apparatus of claim 16, wherein the method further comprises:
   identifying a first portion of the second response comprising an option associated with the first intervention information and a second portion of the second response comprising an option not associated with the first intervention information; and
   applying a first label to the first portion of the second response and a second label to the second portion of the second response before sending the second response towards the user computer.

25. The apparatus of claim 24, wherein the first label comprises:
   a first color different from a second color used in the second label,
   a first typeface different from a second typeface used in the second label,
   a first symbol different from a second symbol used in the second label, and/or
   a first text character different from a second text character used in the second label.

26. The apparatus of claim 25, wherein the first portion of the second response comprises a hyperlink associated with the option associated with the first intervention information.

27. The apparatus of claim 16, wherein the second AI model is a large language model.

28. The apparatus of claim 16, wherein the method further comprises:
   masking the second prompt from the user computer.

29. The apparatus of claim 16, wherein the first prompt is a search request.

30. The apparatus of claim 16, wherein the second AI model is comprised in a search engine system.

* * * * *